(12) United States Patent
Singh et al.

(10) Patent No.: US 9,961,099 B2
(45) Date of Patent: May 1, 2018

(54) SYSTEMS AND METHODS FOR DETECTING AND TRACKING ADVERSARY TRAJECTORY

(71) Applicant: Acalvio Technologies, Inc., Cupertino, CA (US)

(72) Inventors: Satnam Singh, Bangalore (IN); Mohammad Waseem, Bangalore (IN); Suril Desai, Bangalore (IN); Venkata Babji Sama, Bangalore (IN); Rajendra Gopalakrishna, Bangalore (IN)

(73) Assignee: ACALVIO TECHNOLOGIES, INC., Cupertino, CA (US)

( * ) Notice: Subject to any disclaimer, the term of this patent is extended or adjusted under 35 U.S.C. 154(b) by 42 days.

(21) Appl. No.: 15/426,346

(22) Filed: Feb. 7, 2017

(65) Prior Publication Data
US 2017/0302691 A1   Oct. 19, 2017

Related U.S. Application Data

(60) Provisional application No. 62/324,256, filed on Apr. 18, 2016.

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *H04L 29/06* | (2006.01) |

(52) U.S. Cl.
CPC ...... *H04L 63/1425* (2013.01); *H04L 63/0272* (2013.01); *H04L 63/1458* (2013.01); *H04L 63/1491* (2013.01)

(58) Field of Classification Search
CPC ........................................ H04L 63/14-63/1491
USPC ..................................................... 726/22-25
See application file for complete search history.

(56) References Cited

U.S. PATENT DOCUMENTS

| | | | | |
|---|---|---|---|---|
| 7,814,546 B1 * | 10/2010 | Strayer | ............... | H04L 63/1416 726/23 |
| 7,890,869 B1 * | 2/2011 | Mayer | ................... | G06F 21/577 709/224 |
| 8,087,083 B1 * | 12/2011 | Norris | ................... | G06F 21/554 709/206 |

(Continued)

*Primary Examiner* — Trong Nguyen
(74) *Attorney, Agent, or Firm* — Kilpatrick Townsend & Stockton LLP

(57) ABSTRACT

This disclosure is related to using network flow information of a network to determine the trajectory of an attack. In some examples, an adjacency data structure is generated for a network. The adjacency data structure can include a machine of the network that has interacted with another machine of the network. The network can further include one or more deception mechanisms. The deception mechanisms can indicate that an attack is occurring when a machine interacts with one of the deception mechanisms. When the attack is occurring, attack trajectory information can be generated by locating in the adjacency data structure the machine that interacted with the deception mechanism. The attack trajectory information can correlate the information from the interaction with the deception mechanism, the interaction information of the network, and machine information for each machine to determine a possible trajectory of an adversary.

17 Claims, 38 Drawing Sheets

(56) References Cited

U.S. PATENT DOCUMENTS

| | | | |
|---|---|---|---|
| 2006/0021048 A1* | 1/2006 | Cook | H04L 63/1433 726/25 |
| 2015/0249676 A1* | 9/2015 | Koyanagi | H04L 63/1425 726/22 |
| 2016/0078365 A1* | 3/2016 | Baumard | G06F 21/552 706/12 |
| 2016/0099953 A1* | 4/2016 | Hebert | H04L 63/1433 726/23 |
| 2016/0277439 A1* | 9/2016 | Rotter | H04L 63/0861 |

* cited by examiner

SYSTEMS AND METHODS FOR DETECTING AND TRACKING ADVERSARY TRAJECTORY

CROSS REFERENCES TO RELATED APPLICATIONS

This application claims the benefit under 35 U.S.C. § 119 of U.S. Provisional Application No. 62/324,256, filed on Apr. 18, 2016, which is incorporated herein by reference in its entirety.

BACKGROUND

Information security attacks can threaten a network. For example, an attack can attempt to destroy, expose, alter, disable, steal, or gain unauthorized access to or make unauthorized use of a resource of a network. However, locating such an attack can be difficult. Therefore, there is a need in the art to better locate an attack on a network.

BRIEF SUMMARY

Provided are methods, including computer-implemented methods or methods implemented by a network device, devices including network devices, and computer-program products for detecting and tracking a trajectory of an adversary. By tracking the trajectory of an adversary, a system can locate weaknesses in machines on a network, even on machines that an adversary did not trigger an alarm on. In particular, an attack trajectory can identify a path that an adversary took through a network. For example, the attack trajectory can reveal that an adversary accessed another machine prior to the network determining that the adversary was in fact attacking the network.

In some examples, a method includes receiving machine information for machines associated with a network. The machine information can include information that identifies a particular machine. The method can further include receiving interaction information associated with the machines. The interaction information can include information associated with interactions between the machines. The method can further include determining the interactions between the machines. Determining the interactions can include analyzing the interaction information and the machine information. The method can further include generating an adjacency data structure using the interactions. Generating the adjacency data structure can include correlating the interactions. Correlating the interactions can include associating a machine of the machines with one or more other machines that are determined to be an interaction with the machine.

In some examples, the method further includes receiving new interaction information associated with the machines. The new interaction information can include information associated with new interactions between the machines. In some examples, the new interactions can occur after the interaction information is received. The method can further include determining one or more new interactions between the machines. Determining the one or more new interactions can include analyzing the new interaction information and the machine information. The method can further include updating the adjacency data structure. The updated adjacency data structure can incorporate the one or more new interactions.

In some examples, the method further includes deploying a deception mechanism in the network. The deception mechanism can be added to the network to attract an attacker of the network. In some examples, the deception mechanism can emulate a service on a port of the deception mechanism. The method can further include receiving a request for an interaction by a machine associated with the network. In some examples, the request can be received at a port of the deception mechanism. The method can further include receiving deception mechanism interaction information. The deception mechanism interaction information can include machine information associated with the machine and information associated with the interaction between the machine and the deception mechanism. The method can further include identifying the machine in the adjacency data structure. The method can further include generating an attack trajectory data structure. The attack trajectory data structure can be generated by determining one or more machines that are connected, either directly or indirectly, with the machine in the adjacency data structure. The method can further include determining an attack trajectory path in the attack trajectory data structure. The attack trajectory path can include a path using the attack trajectory data structure from the machine to the one or more machines.

In some examples, the method further includes generating an attack graph. The attack graph can be a visual representation of the attack trajectory data structure. Each node of the attack graph can be associated with a machine of the plurality of machines. Each edge of the attack graph can be an interaction between two machines of the plurality of machines. The method can further include highlighting the trajectory path on the attack graph. In some examples, the method further includes computing a probability that a portion of the attack trajectory path on the attack graph is an adversary. Computing the probability can include using network flow information and authentication logs.

In the following description, for the purposes of explanation, specific details are set forth in order to provide a thorough understanding of examples of the disclosure. However, it will be apparent that various examples may be practiced without these specific details. The figures and description are not intended to be restrictive.

The ensuing description provides examples only, and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the spirit and scope of the disclosure as set forth in the appended claims.

BRIEF DESCRIPTION OF THE DRAWINGS

Illustrative examples are described in detail below with reference to the following figures.

DETAILED DESCRIPTION

Figure 1:
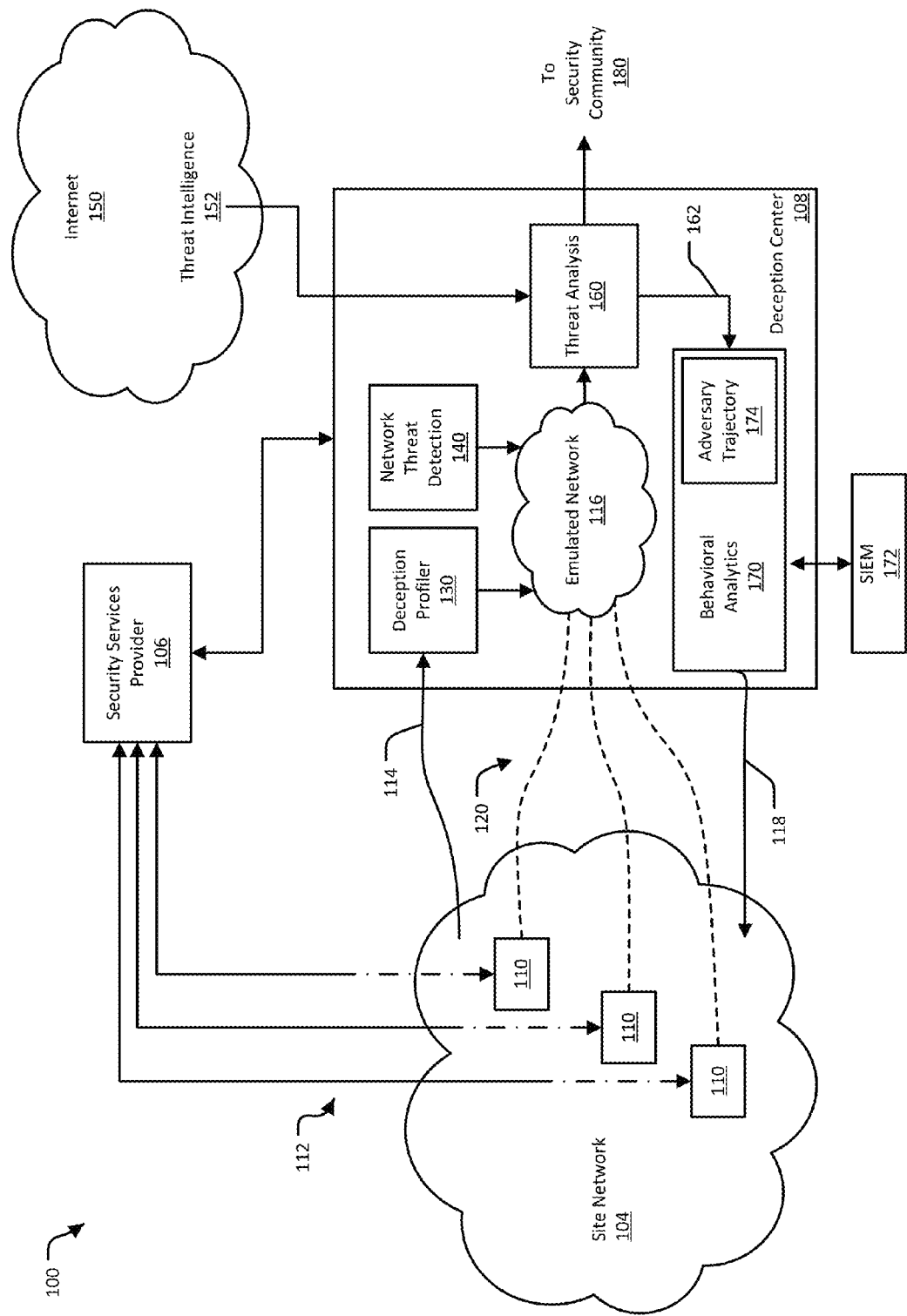
FIG. 1 illustrates an example of a network threat detection and analysis system, in which various implementations of a deception-based security system can be used.

Network deception mechanisms, often referred to as "honeypots," "honey tokens," and "honey nets," among others, defend a network from threats by distracting or diverting the threat. Honeypot-type deception mechanisms can be installed in a network for a particular site, such as a business office, to act as decoys in the site's network. Honeypot-type deception mechanisms are typically configured to be indistinguishable from active, production systems in the network. Additionally, such deception mechanisms are typically configured to be attractive to a network threat by having seemingly valuable data and/or by appearing vulnerable to infiltration. Though these deception mechanisms can be indistinguishable from legitimate parts of the site network, deception mechanisms are not part of the normal operation of the network, and would not be accessed during normal, legitimate use of the site network. Because normal users of the site network would not normally use or access a deception mechanism, any use or access to the deception mechanism is suspected to be a threat to the network.

"Normal" operation of a network generally includes network activity that conforms with the intended purpose of a network. For example, normal or legitimate network activity can include the operation of a business, medical facility, government office, education institution, or the ordinary network activity of a private home. Normal network activity can also include the non-business-related, casual activity of users of a network, such as accessing personal email and visiting websites on personal time, or using network resources for personal use. Normal activity can also include the operations of network security devices, such as firewalls, anti-virus tools, intrusion detection systems, intrusion protection systems, email filters, adware blockers, and so on. Normal operations, however, exclude deceptions mechanisms, in that deception mechanisms are not intended to take part in business operations or casual use. As such, network users and network systems do not normally access deceptions mechanisms except perhaps for the most routine network administrative tasks. Access to a deception mechanism, other than entirely routine network administration, may thus indicate a threat to the network.

Threats to a network can include active attacks, where an attacker interacts or engages with systems in the network to steal information or do harm to the network. An attacker may be a person, or may be an automated system. Examples of active attacks include denial of service (DoS) attacks, distributed denial of service (DDoS) attacks, spoofing attacks, "man-in-the-middle" attacks, attacks involving malformed network requests (e.g. Address Resolution Protocol (ARP) poisoning, "ping of death," etc.), buffer, heap, or stack overflow attacks, and format string attacks, among others. Threats to a network can also include self-driven, self-replicating, and/or self-triggering malicious software. Malicious software can appear innocuous until activated, upon which the malicious software may attempt to steal information from a network and/or do harm to the network. Malicious software is typically designed to spread itself to other systems in a network. Examples of malicious software include ransomware, viruses, worms, Trojan horses, spyware, keyloggers, rootkits, and rogue security software, among others.

In the information security industry, it is difficult to determine where an attack might have occurred on a network. And even when the attack is discovered, it is even more difficult to determine the trajectory of the attack. This disclosure is related to using network flow information of a network to determine the trajectory of an attack. In some examples, an adjacency data structure can be generated for a network. The adjacency data structure can include a machine of the network that has interacted with another machine of the network. In the adjacency data structure, a machine can be associated with other machines when an interaction has occurred between the machine and the other machine. The adjacency data structure can be updated as new interactions occur on the network.

In some examples, the network can further include one or more deception mechanisms. A deception mechanism can emulate one or more services on one or more ports. A deception mechanism can indicate that an attack is occurring when a machine interacts with the deception mechanism. When the attack has occurred, an attack trajectory data structure can be generated. An attack trajectory path can be determined in the attack trajectory data structure. If there are multiple possible trajectories, a probability can be computed for a trajectory to determine the likelihood that the trajectory is associated with the adversary. It should be recognized that an attack can be recognized by a system other than a deception mechanism (e.g., an intrusion detection system, an intrusion prevention system, a security information and event manager, or the like).

I. Deception-Based Security Systems

FIG. 1 illustrates an example of a network threat detection and analysis system 100, in which various implementations of a deception-based security system can be used. The network threat detection and analysis system 100, or, more briefly, network security system 100, provides security for a site network 104 using deceptive security mechanisms, a variety of which may be called "honeypots." The deceptive security mechanisms may be controlled by and inserted into the site network 104 using a deception center 108 and sensors 110, which may also be referred to as deception sensors, installed in the site network 104. In some implementations, the deception center 108 and the sensors 110 interact with a security services provider 106 located outside of the site network 104. The deception center 108 may also obtain or exchange data with sources located on the Internet 150.

Security mechanisms designed to deceive, sometimes referred to as "honeypots," may also be used as traps to divert and/or deflect unauthorized use of a network away from the real network assets. A deception-based security mechanism may be a computer attached to the network, a process running on one or more network systems, and/or some other device connected to the network. A security mechanism may be configured to offer services, real or emulated, to serve as bait for an attack on the network. Deception-based security mechanisms that take the form of data, which may be called "honey tokens," may be mixed in with real data in devices in the network. Alternatively or additionally, emulated data may also be provided by emulated systems or services.

Deceptive security mechanisms can also be used to detect an attack on the network. Deceptive security mechanisms are generally configured to appear as if they are legitimate parts of a network. These security mechanisms, however, are not, in fact, part of the normal operation of the network. Consequently, normal activity on the network is not likely to access the security mechanisms. Thus any access over the network to the security mechanism is automatically suspect.

The network security system 100 may deploy deceptive security mechanisms in a targeted and dynamic fashion. Using the deception center 108 the system 100 can scan the site network 104 and determine the topology of the site network 104. The deception center 108 may then determine devices to emulate with security mechanisms, including the type and behavior of the device. The security mechanisms may be selected and configured specifically to attract the attention of network attackers. The security mechanisms may also be selected and deployed based on suspicious activity in the network. Security mechanisms may be deployed, removed, modified, or replaced in response to activity in the network, to divert and isolate network activity related to an apparent attack, and to confirm that the network activity is, in fact, part of a real attack.

The site network 104 is a network that may be installed among the buildings of a large business, in the office of a small business, at a school campus, at a hospital, at a government facility, or in a private home. The site network 104 may be described as a local area network (LAN) or a group of LANS. The site network 104 may be one site belonging to an organization that has multiple site networks 104 in one or many geographical locations. In some implementations, the deception center 108 may provide network security to one site network 104, or to multiple site networks 104 belonging to the same entity.

The site network 104 is where the networking devices and users of the an organizations network may be found. The site network 104 may include network infrastructure devices, such as routers, switches hubs, repeaters, wireless base stations, and/or network controllers, among others. The site network 104 may also include computing systems, such as servers, desktop computers, laptop computers, tablet computers, personal digital assistants, and smart phones, among others. The site network 104 may also include other analog and digital electronics that have network interfaces, such as televisions, entertainment systems, thermostats, refrigerators, and so on.

The deception center 108 provides network security for the site network 104 (or multiple site networks for the same organization) by deploying security mechanisms into the site network 104, monitoring the site network 104 through the security mechanisms, detecting and redirecting apparent threats, and analyzing network activity resulting from the apparent threat. To provide security for the site network 104, in various implementations the deception center 108 may communicate with sensors 110 installed in the site network 104, using network tunnels 120. As described further below, the tunnels 120 may allow the deception center 108 to be located in a different sub-network ("subnet") than the site network 104, on a different network, or remote from the site network 104, with intermediate networks (possibly including the Internet 150) between the deception center 108 and the site network 104.

In some implementations, the network security system 100 includes a security services provider 106. In these implementations, the security services provider 106 may act as a central hub for providing security to multiple site networks, possibly including site networks controlled by different organizations. For example, the security services provider 106 may communicate with multiple deception centers 108 that each provide security for a different site network 104 for the same organization. In some implementations, the security services provider 106 is located outside the site network 104. In some implementations, the security services provider 106 is controlled by a different entity than the entity that controls the site network. For example, the security services provider 106 may be an outside vendor. In some implementations, the security services provider 106 is controlled by the same entity as that controls the site network 104.

In some implementations, when the network security system 100 includes a security services provider 106, the sensors 110 and the deception center 108 may communicate with the security services provider 106 in order to be connected to each other. For example, the sensors 110, which may also be referred to as deception sensors, may, upon powering on in the site network 104, send information over a network connection 112 to the security services provider 106, identifying themselves and the site network 104 in which they are located. The security services provider 106 may further identify a corresponding deception center 108 for the site network 104. The security services provider 106 may then provide the network location of the deception center 108 to the sensors 110, and may provide the deception center 108 with the network location of the sensors 110. A network location may take the form of, for example, an Internet Protocol (IP) address. With this information, the deception center 108 and the sensors 110 may be able to configure tunnels 120 to communicate with each other.

In some implementations, the network security system 100 does not include a security services provider 106. In these implementations, the sensors 110 and the deception center 108 may be configured to locate each other by, for example, sending packets that each can recognize as coming for the other. Using these packets, the sensors 110 and deception center 108 may be able to learn their respective locations on the network. Alternatively or additionally, a network administrator can configure the sensors 110 with the network location of the deception center 108, and vice versa.

In various implementations, the sensors 110 are a minimal combination of hardware and/or software, sufficient to form a network connection with the site network 104 and a tunnel 120 with the deception center 108. For example, a sensor 110 may be constructed using a low-power processor, a network interface, and a simple operating system. In various implementations, the sensors 110 provide the deception center 108 with visibility into the site network 104, such as for example being able to operate as a node in the site network 104, and/or being able to present or project deceptive security mechanisms into the site network 104, as described further below. Additionally, in various implementations, the sensors 110 may provide a portal through which a suspected attack on the site network 104 can be redirected to the deception center 108, as is also described below.

In various implementations, the deception center 108 may be configured to profile the site network 104, deploy deceptive security mechanisms for the site network 104, detect suspected threats to the site network 104, analyze the suspected threat, and analyze the site network 104 for exposure and/or vulnerability to the supposed threat.

To provide the site network 104, the deception center 108 may include a deception profiler 130. In various implementations, the deception profiler may 130 derive information 114 from the site network 104, and determine, for example, the topology of the site network 104, the network devices included in the site network 104, the software and/or hardware configuration of each network device, and/or how the network is used at any given time. Using this information, the deception profiler 130 may determine one or more deceptive security mechanisms to deploy into the site network 104.

In various implementations, the deception profiler may configure an emulated network 116 to emulate one or more computing systems. Using the tunnels 120 and sensors 110, the emulated computing systems may be projected into the site network 104, where they serve as deceptions. The emulated computing systems may include address deceptions, low-interaction deceptions, and/or high-interaction deceptions. In some implementations, the emulated computing systems may be configured to resemble a portion of the network. In these implementations, this network portion may then be projected into the site network 104.

In various implementations, a network threat detection engine 140 may monitor activity in the emulated network 116, and look for attacks on the site network 104. For example, the network threat detection engine 140 may look for unexpected access to the emulated computing systems in the emulated network 116. The network threat detection engine 140 may also use information 114 extracted from the site network 104 to adjust the emulated network 116, in order to make the deceptions more attractive to an attack, and/or in response to network activity that appears to be an attack. Should the network threat detection engine 140 determine that an attack may be taking place, the network threat detection engine 140 may cause network activity related to the attack to be redirected to and contained within the emulated network 116.

In various implementations, the emulated network 116 is a self-contained, isolated, and closely monitored network, in which suspect network activity may be allowed to freely interact with emulated computing systems. In various implementations, questionable emails, files, and/or links may be released into the emulated network 116 to confirm that they are malicious, and/or to see what effect they have. Outside actors can also be allowed to access emulated system, steal data and user credentials, download malware, and conduct any other malicious activity. In this way, the emulated network 116 not only isolated a suspected attack from the site network 104, but can also be used to capture information about an attack. Any activity caused by suspect network activity may be captured in, for example, a history of sent and received network packets, log files, and memory snapshots.

In various implementations, activity captured in the emulated network 116 may be analyzed using a targeted threat analysis engine 160. The threat analysis engine 160 may examine data collected in the emulated network 116 and reconstruct the course of an attack. For example, the threat analysis engine 160 may correlate various events seen during the course of an apparent attack, including both malicious and innocuous events, and determine how an attacker infiltrated and caused harm in the emulated network 116. In some cases, the threat analysis engine 160 may use threat intelligence 152 from the Internet 150 to identify and/or analyze an attack contained in the emulated network 116. The threat analysis engine 160 may also confirm that suspect network activity was not an attack. The threat analysis engine 160 may produce indicators that describe the suspect network activity, including indicating whether the suspect activity was or was not an actual threat. The threat analysis engine 160 may share these indicators with the security community 180, so that other networks can be defended from the attack. The threat analysis engine 160 may also send the indicators to the security services provider 106, so that the security services provider 106 can use the indicators to defend other site networks.

In various implementations, the threat analysis engine 160 may also send threat indicators, or similar data, to a behavioral analytics engine 170. The behavioral analytics engine 170 may be configured to use the indicators to probe 118 the site network 104, and see whether the site network 104 has been exposed to the attack, or is vulnerable to the attack. For example, the behavioral analytics engine 170 may search the site network 104 for computing systems that resemble emulated computing systems in the emulated network 116 that were affected by the attack. In some implementations, the behavioral analytics engine 170 can also repair systems affected by the attack, or identify these systems to a network administrator. In some implementations, the behavioral analytics engine 170 can also reconfigure the site network's 104 security infrastructure to defend against the attack.

The behavioral analytics engine 170 can include an adversary trajectory engine 172 that may be used to analyze a site network for an attack or suspected attack. The adversary trajectory engine 172 may analyze the various ways in which an attack may have occurred in a site network. Using this information, the adversary trajectory engine 172 may trace the possible path of a specific incident in the site network. This path may point to network devices in the site network that could have been affected by the incident. These network devices can be checked to determine whether they have, in fact, been affected.

Using the adversary trajectory engine 172, the behavioral analytics engine 170 may produce a network analysis 118. The network analysis 118 may indicate, for example, whether the site network has been exposed to a particular attack, which (if any) network devices may have been affected by the attack, how the network devices were affected by the attack, and/or how the site network's security can be improved. The network analysis 118 can be used to scrub the effects of an attack from the site network, and/or to increase the security of the site network.

The behavioral analytics engine 170 can work in conjunction with a Security Information and Event Management (SIEM) 172 system. In various implementations, SIEM includes software and/or services that can provide real-time analysis of security alerts generates by network hardware and applications. In various implementations, the deception center 108 can communicate with the SIEM 172 system to obtain information about computing and/or networking systems in the site network 104.

Using deceptive security mechanisms, the network security system 100 may thus be able to distract and divert attacks on the site network 104. The network security system 100 may also be able to allow, using the emulated network 116, and attack to proceed, so that as much can be learned about the attack as possible. Information about the attack can then be used to find vulnerabilities in the site network 104. Information about the attack can also be provided to the security community 180, so that the attack can be thwarted elsewhere.

II. Customer Installations

The network security system, such as the deception-based system described above, may be flexibly implemented to accommodate different customer networks. FIGS. 2A-2D provide examples of different installation configurations 200a-200d that can be used for different customer networks 202. A customer network 202 may generally be described as a network or group of networks that is controlled by a common entity, such as a business, a school, or a person. The customer network 202 may include one or more site networks 204. The customer network's 202 site networks 204 may be located in one geographic location, may be behind a common firewall, and/or may be multiple subnets within one network. Alternatively or additionally, a customer network's 202 site networks 204 may be located in different geographic locations, and be connected to each other over various private and public networks, including the Internet 250.

Different customer networks 202 may have different requirements regarding network security. For example, some customer networks 202 may have relatively open connections to outside networks such as the Internet 250, while other customer networks 202 have very restricted access to outside networks. The network security system described in FIG. 1 may be configurable to accommodate these variations.

Figure 2A:
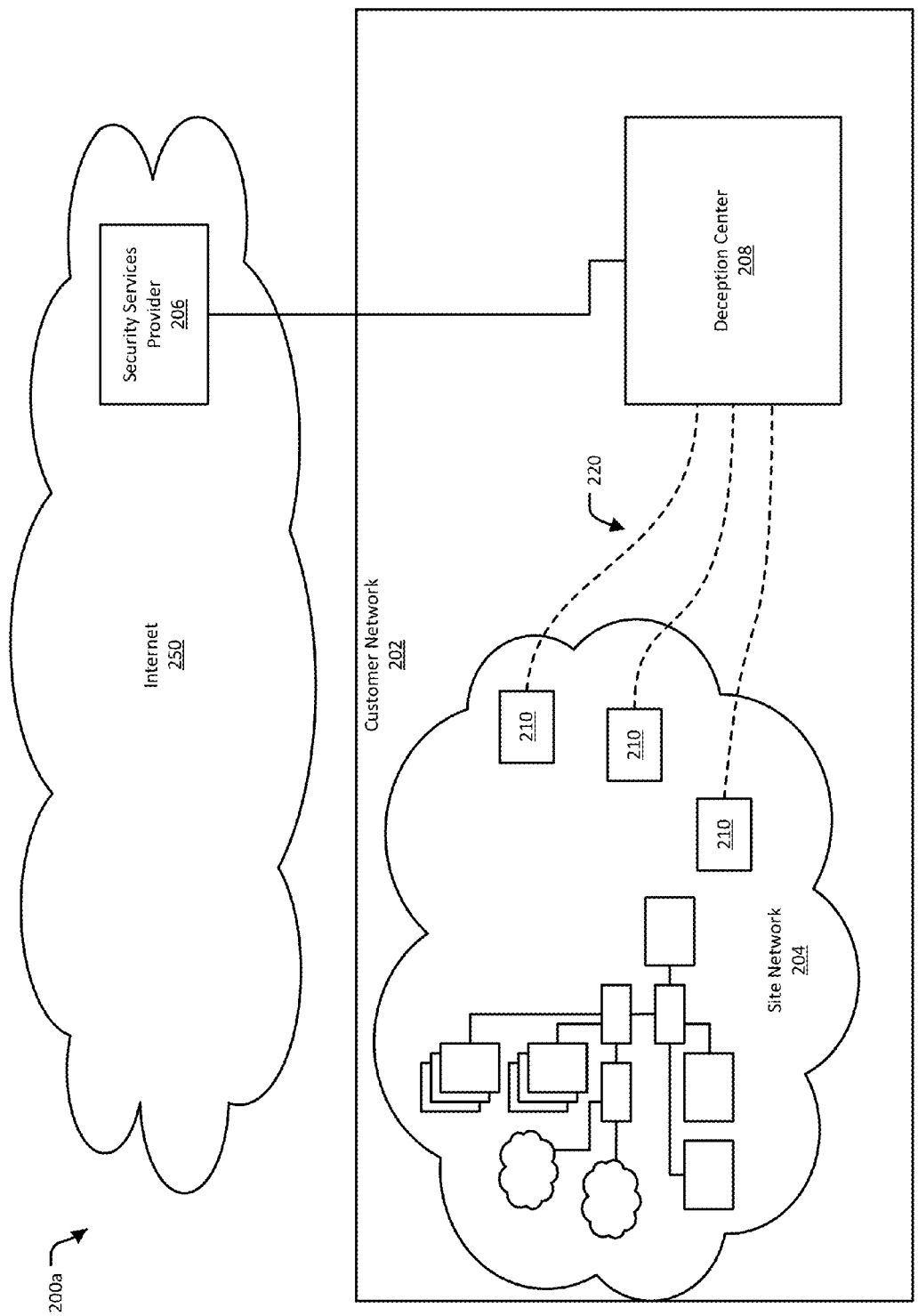
FIGS. 2A-2D provide examples of different installation configurations that can be used for different customer networks.

FIG. 2A illustrates one example of an installation configuration 200a, where a deception center 208 is located within the customer network 202. In this example, being located within the customer network 202 means that the deception center 208 is connected to the customer network 202, and is able to function as a node in the customer network 202. In this example, the deception center 208 may be located in the same building or within the same campus as the site network 204. Alternatively or additionally, the deception center 208 may be located within the customer network 202 but at a different geographic location than the site network 204. The deception center 208 thus may be within the same subnet as the site network 204, or may be connected to a different subnet within the customer network.

In various implementations, the deception center 208 communicates with sensors 210, which may also be referred to as deception sensors, installed in the site network over network tunnels 220 In this example, the network tunnels 220 may cross one or more intermediate within the customer network 202.

In this example, the deception center 208 is able to communicate with a security services provider 206 that is located outside the customer network 202, such as on the Internet 250. The security services provider 206 may provide configuration and other information for the deception center 208. In some cases, the security services provider 206 may also assist in coordinating the security for the customer network 202 when the customer network 202 includes multiple site networks 204 located in various geographic areas.

Figure 2B:
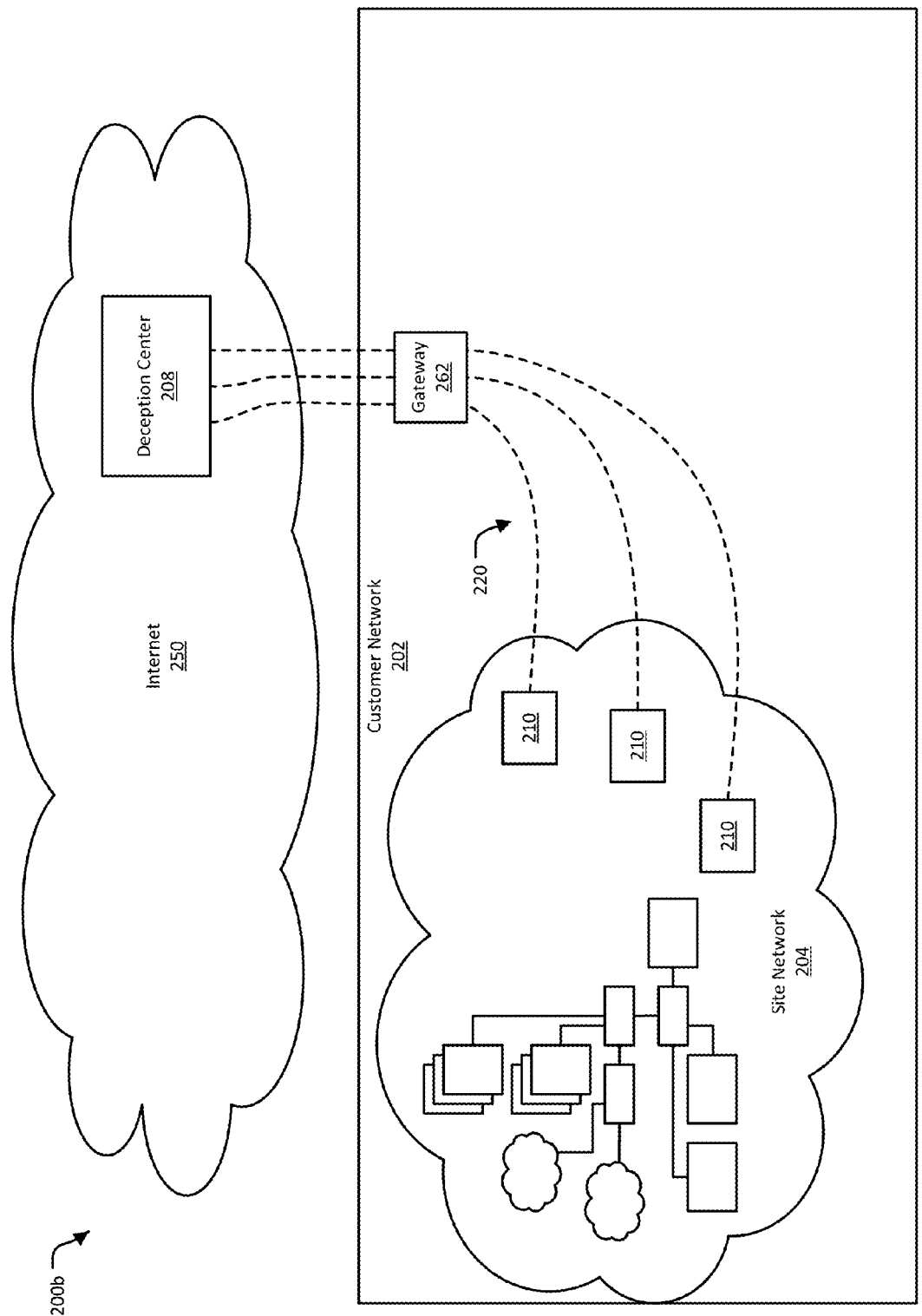

FIG. 2B illustrates another example of an installation configuration 200b, where the deception center 208 is located outside the customer network 202. In this example, the deception center 208 may connected to the customer network 202 over the Internet 250. In some implementations, the deception center 208 may be co-located with a security services provider, and/or may be provided by the security services provider.

In this example, the tunnels 220 connect the deception center 208 to the sensors 210 through a gateway 262. A gateway is a point in a network that connects the network to another network. For example, in this example, the gateway 262 connects the customer network 202 to outside networks, such as the Internet 250. The gateway 262 may provide a firewall, which may provide some security for the customer network 202. The tunnels 220 may be able to pass through the firewall using a secure protocol, such as Secure Socket Shell (SSH) and similar protocols. Secure protocols typically require credentials, which may be provided by the operator of the customer network 202.

Figure 2C:
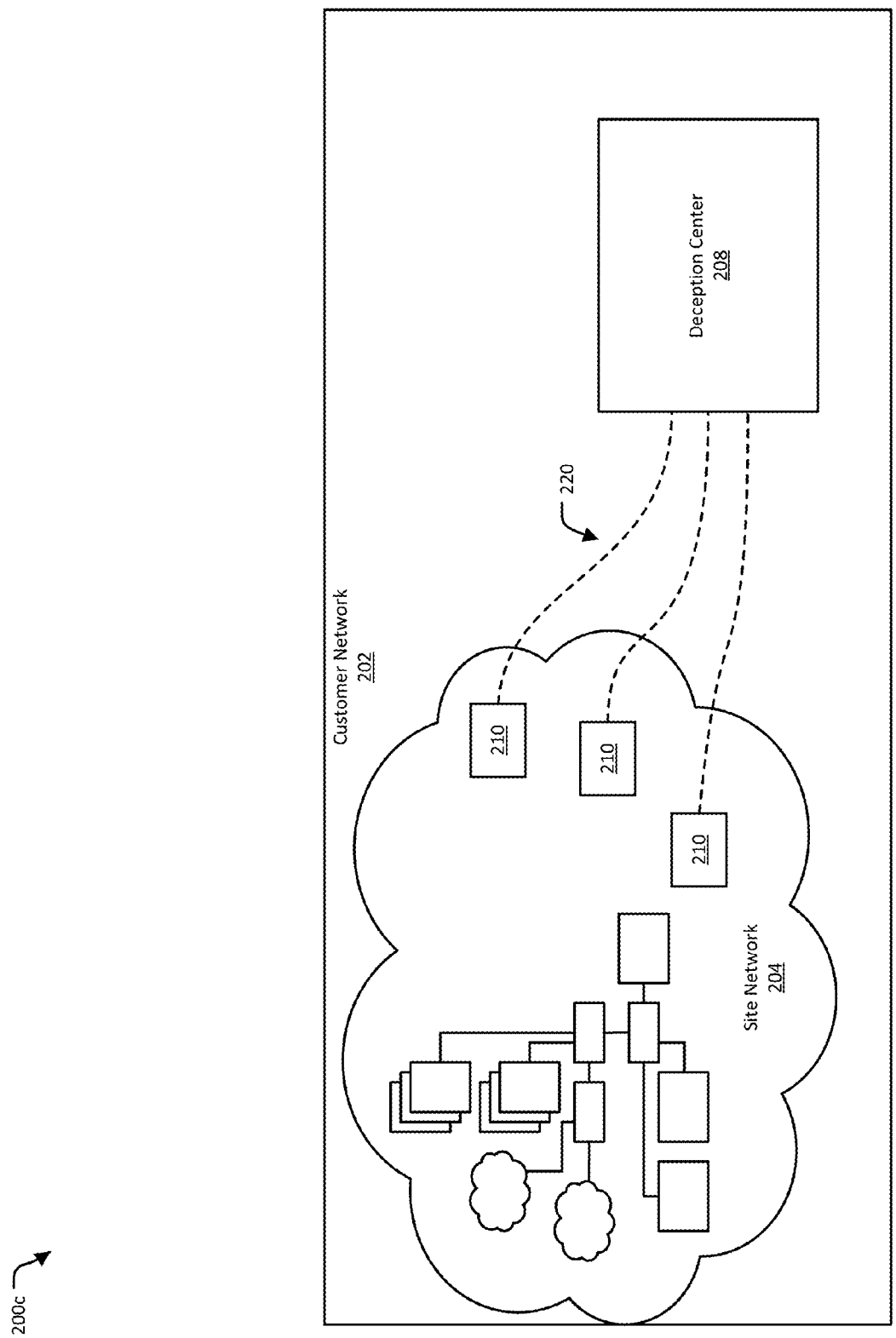

FIG. 2C illustrates another example of an installation configuration 200c, where the deception center 208 is located inside the customer network 202 but does not have access to outside networks. In some implementations, the customer network 202 may require a high level of network security. In these implementations, the customer network's 202 connections to the other networks may be very restricted. Thus, in this example, the deception center 208 is located within the customer network 202, and does not need to communicate with outside networks. The deception center 208 may use the customer networks 202 internal network to coordinate with and establish tunnels 220 to the sensors 210. Alternatively or additionally, a network administrator may configure the deception center 208 and sensors 210 to enable them to establish the tunnels 220.

Figure 2D:
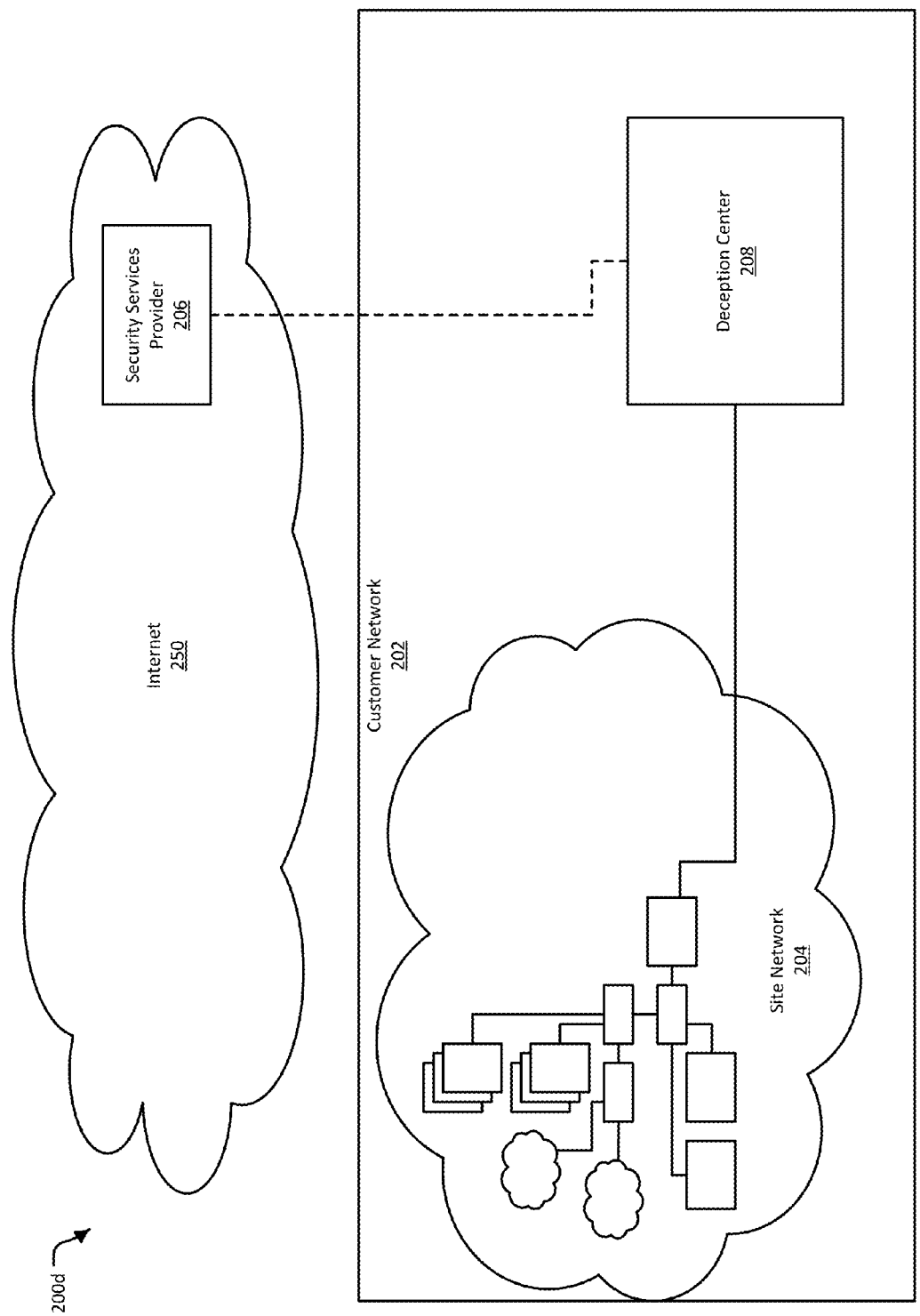

FIG. 2D illustrates another example of an installation configuration 200d. In this example, the deception center 208 is located inside the customer network 202, and further is directly connected to the site network 204. Directly connected, in this example, can mean that the deception center 208 is connected to a router, hub, switch, repeater, or other network infrastructure device that is part of the site network 204. Directly connected can alternatively or additionally mean that the deception center 208 is connected to the site network 204 using a Virtual Local Area Network (VLAN). For example, the deception center 208 can be connected to VLAN trunk port. In these examples, the deception center 208 can project deceptions into the site network 204 with or without the use of sensors, such as are illustrated in FIGS. 2A-2C.

In the example of FIG. 2D, the deception center 208 can also optionally be connected to an outside security services provider 206. The security services provider 206 can manage the deception center 208, including providing updated security data, sending firmware upgrades, and/or coordinating different deception centers 208 for different site networks 204 belonging to the same customer network 202. In some implementations, the deception center 208 can operate without the assistances of an outside security services provider 206.

III. Customer Networks

The network security system, such as the deception-based system discussed above, can be used for variety of customer networks. As noted above, customer networks can come in wide variety of configurations. For example, a customer network may have some of its network infrastructure "in the cloud." A customer network can also include a wide variety of devices, including what may be considered "traditional" network equipment, such as servers and routers, and non-traditional, "Internet-of-Things" devices, such as kitchen appliances. Other examples of customer networks include established industrial networks, or a mix of industrial networks and computer networks.

Figure 3A:
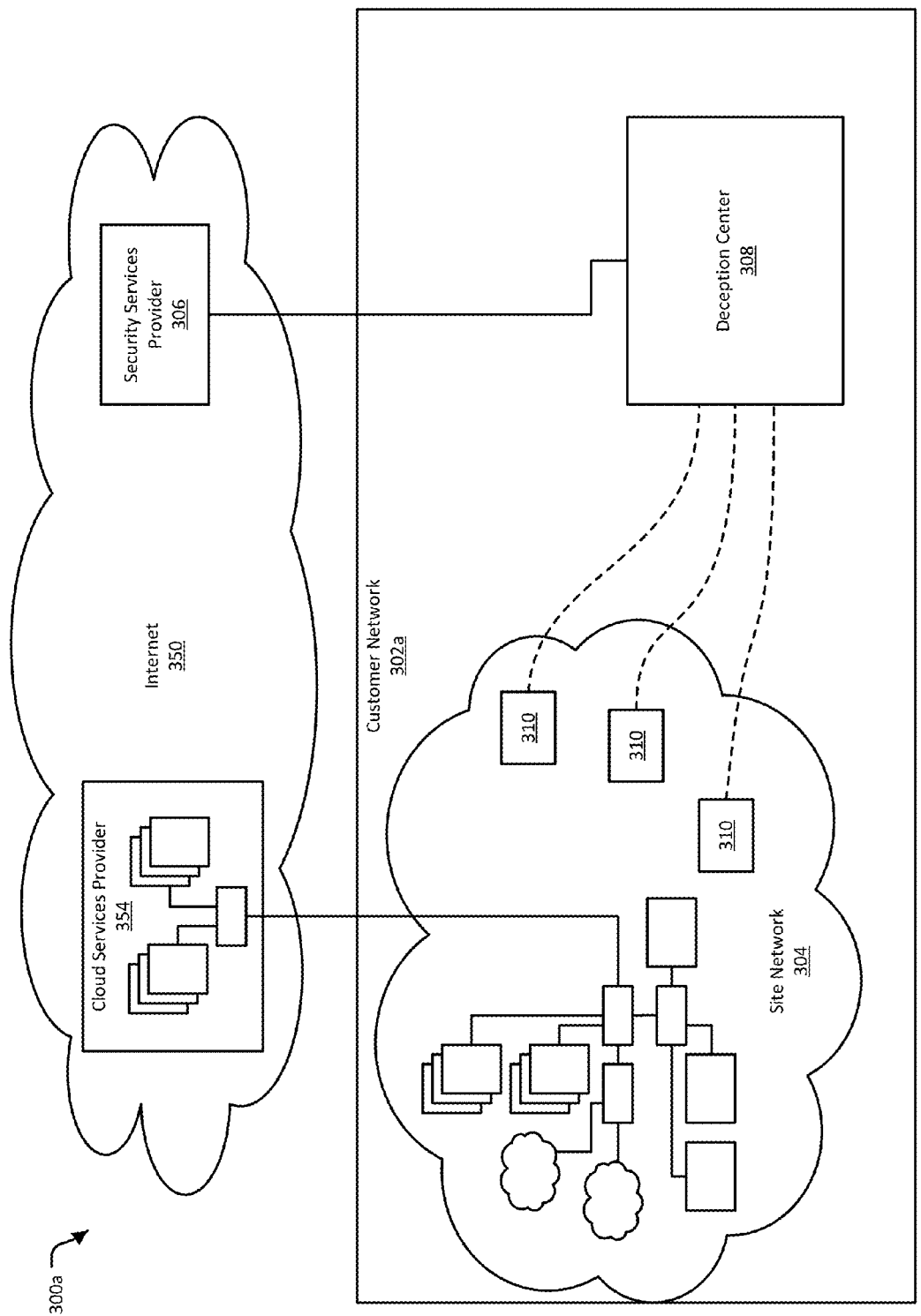
FIG. 3A-3B illustrate examples of customer networks where some of the customer networks' network infrastructure is "in the cloud," that is, is provided by a cloud services provider.
Figure 3B:
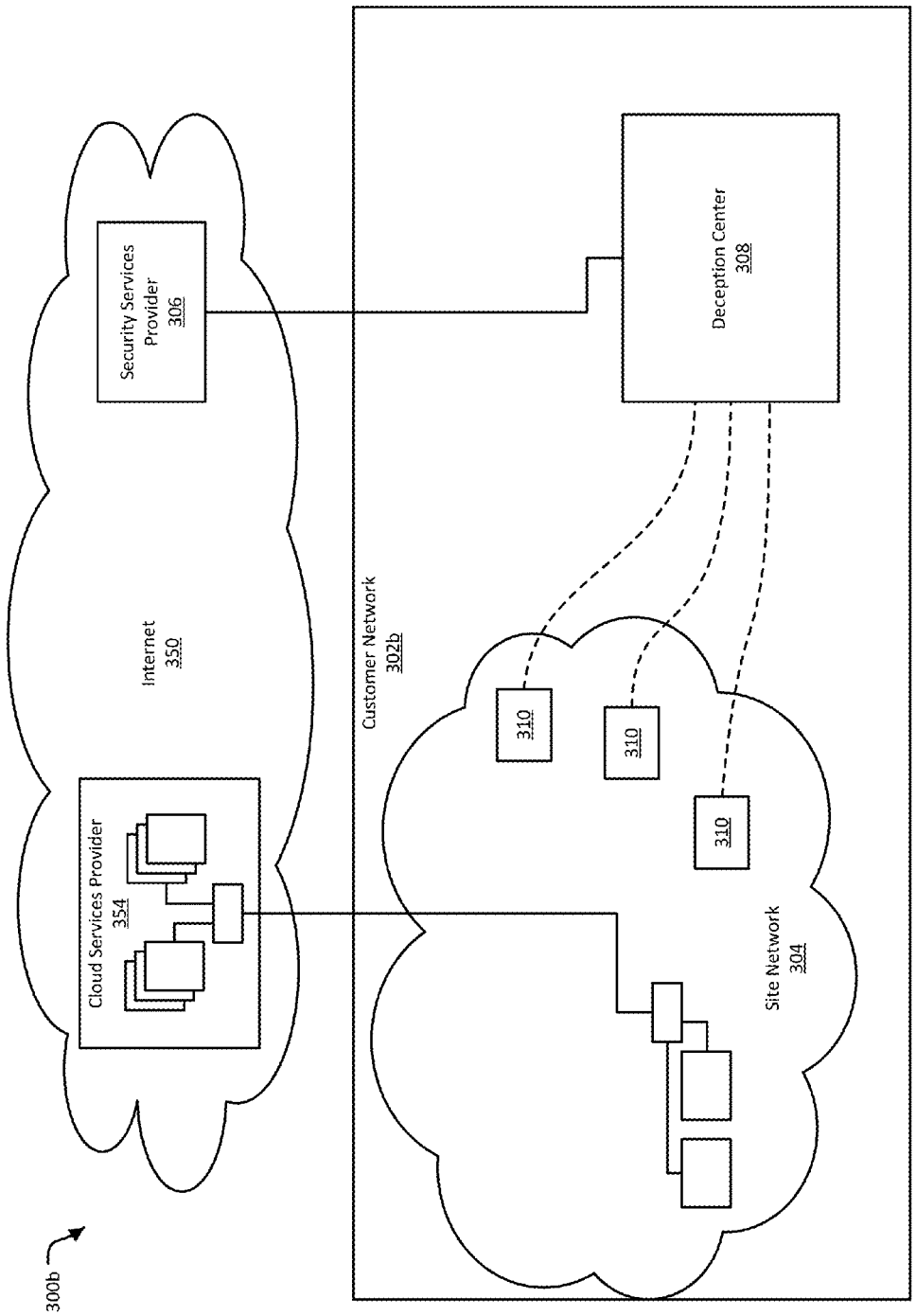

FIG. 3A-3B illustrate examples of customer networks 302a-302b where some of the customer networks' 302a-302b network infrastructure is "in the cloud," that is, is provided by a cloud services provider 354. These example customer networks 302a-302b may be defended by a network security system that includes a deception center 308 and sensors 310, which may also be referred to as deception sensors, and may also include an off-site security services provider 306.

A cloud services provider is a company that offers some component of cloud computer—such as Infrastructure as a Service (IaaS), Software as a Service (SaaS) or Platform as a Service (PaaS)—to other businesses and individuals. A cloud services provider may have a configurable pool of computing resources, including, for example, networks, servers, storage, applications, and services. These computing resources can be available on demand, and can be rapidly provisioned. While a cloud services provider's resources may be shared between the cloud service provider's customers, from the perspective of each customer, the individual customer may appear to have a private network within the cloud, including for example having dedicated subnets and IP addresses.

In the examples illustrated in FIGS. 3A-3B, the customer networks' 302a-302b network is partially in a site network 304, and partially provided by the cloud services provider 354. In some cases, the site network 304 is the part of the customer networks 302a-302b that is located at a physical site owned or controlled by the customer network 302a-302b. For example, the site network 304 may be a network located in the customer network's 302a-302b office or campus. Alternatively or additionally, the site network 304 may include network equipment owned and/or operated by the customer network 302 that may be located anywhere. For example, the customer networks' 302a-302b operations may consist of a few laptops owned by the customer networks 302a-302b, which are used from the private homes of the lap tops' users, from a co-working space, from a coffee shop, or from some other mobile location.

In various implementations, sensors 310 may be installed in the site network 304. The sensors 310 can be used by the network security system to project deceptions into the site network 304, monitor the site network 304 for attacks, and/or to divert suspect attacks into the deception center 308.

In some implementations, the sensors 310 may also be able to project deceptions into the part of the customer networks 302a-302b network that is provided by the cloud services provider 354. In most cases, it may not be possible to install sensors 310 inside the network of the cloud services provider 354, but in some implementations, this may not be necessary. For example, as discussed further below, the deception center 308 can acquire the subnet address of the network provided by the cloud services provider 354, and use that subnet address the create deceptions. Though these deceptions are projected form the sensors 310 installed in the site network 304, the deceptions may appear to be within the subnet provided by the cloud services provider 354.

In illustrated examples, the deception center 308 is installed inside the customer networks 302a-302b. Though not illustrated here, the deception center 308 can also be installed outside the customer networks 302a-302b, such as for example somewhere on the Internet 350. In some implementations, the deception center 308 may reside at the same location as the security service provider 306. When located outside the customer networks 302a-302b, the deception center 308 may connect to the sensors 310 in the site network 304 over various public and/or private networks.

FIG. 3A illustrates an example of a configuration 300a where the customer network's 302a network infrastructure is located in the cloud and the customer network 302a also has a substantial site network 304. In this example, the customer may have an office where the site network 304 is located, and where the customer's employees access and use the customer network 302a. For example, developers, sales and marketing personnel, human resources and finance employees, may access the customer network 302a from the site network 304. In the illustrated example, the customer may obtain applications and services from the cloud services provider 354. Alternatively or additionally, the cloud services provider 354 may provide data center services for the customer. For example, the cloud services provider 354 may host the customer's repository of data (e.g., music provided by a streaming music service, or video provided by a streaming video provider). In this example, the customer's own customers may be provided data directly from the cloud services provider 354, rather than from the customer network 302a.

FIG. 3B illustrates and example of a configuration 300b where the customer network's 302b network is primarily or sometimes entirely in the cloud. In this example, the customer network's 302b site network 304 may include a few laptops, or one or two desktop servers. These computing devices may be used by the customer's employees to conduct the customer's business, while the cloud services provider 354 provides the majority of the network infrastructure needed by the customer. For example, a very small company may have no office space and no dedicated location, and have as computing resources only the laptops used by its employees. This small company may use the cloud services provider 354 to provide its fixed network infrastructure. The small company may access this network infrastructure by connecting a laptop to any available network connection (e.g, in a co-working space, library, or coffee shop). When no laptops are connected to the cloud services provider 354, the customer network 302 may be existing entirely within the cloud.

In the example provided above, the site network 304 can be found wherever the customer's employees connect to a network and can access the cloud services provider 354. Similarly, the sensors 310 can be co-located with the employees' laptops. For example, whenever an employee connects to a network, she can enable a sensor 310, which can then project deceptions into the network around her. Alternatively or additionally, sensors 310 can be installed in a fixed location (such as the home of an employee of the customer) from which they can access the cloud services provider 354 and project deceptions into the network provided by the cloud services provider 354.

Figure 4:
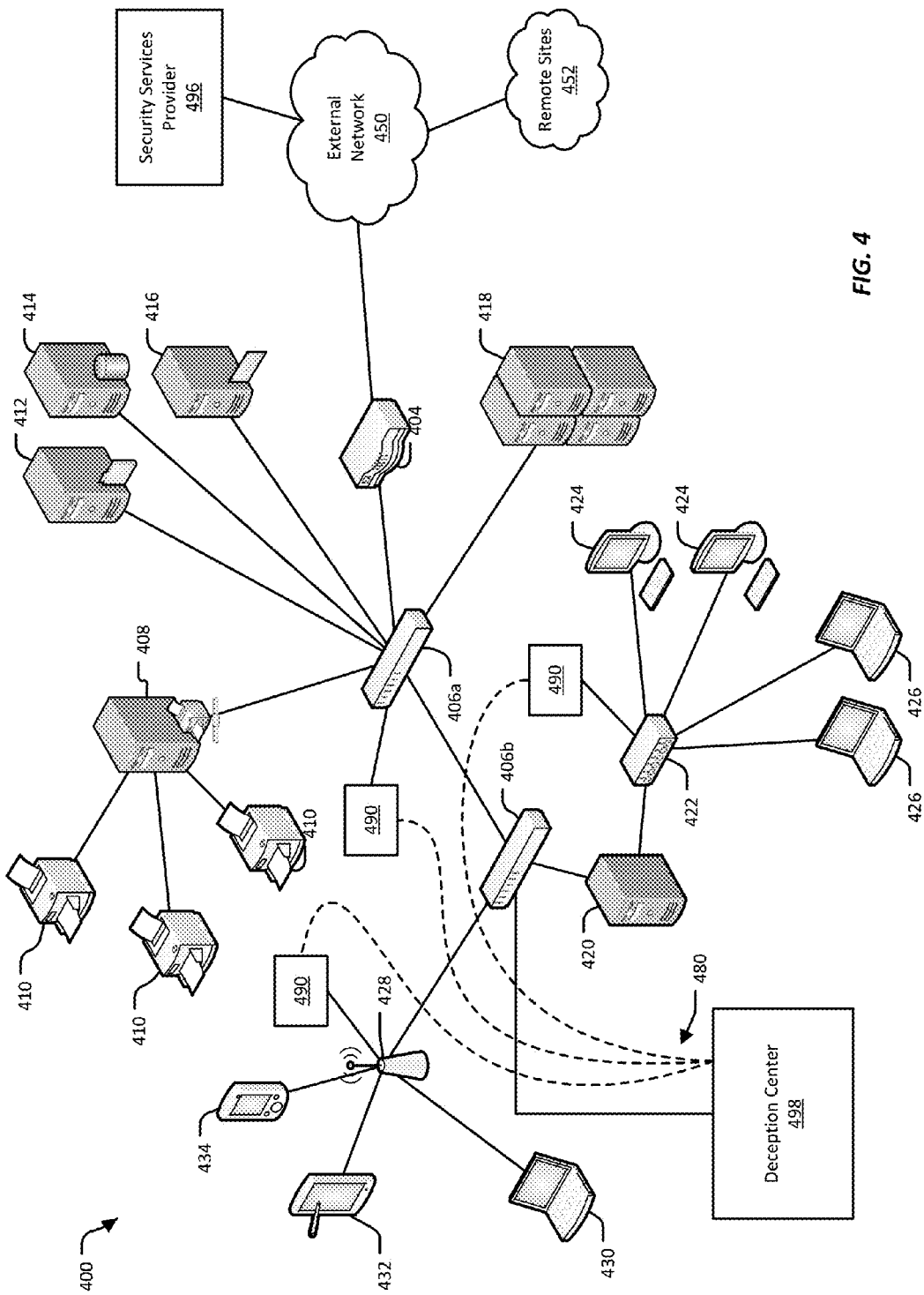
FIG. 4 illustrates an example of an enterprise network.

The network security system, such as the deception-based system discussed above, can provide network security for a variety of customer networks, which may include a diverse array of devices. FIG. 4 illustrates an example of an enterprise network 400, which is one such network that can be defended by a network security system. The example enterprise network 400 illustrates examples of various network devices and network clients that may be included in an enterprise network. The enterprise network 400 may include more or fewer network devices and/or network clients, and/or may include network devices, additional networks including remote sites 452, and/or systems not illustrated here. Enterprise networks may include networks installed at a large site, such as a corporate office, a university campus, a hospital, a government office, or a similar entity. An enterprise network may include multiple physical sites. Access to an enterprise networks is typically restricted, and may require authorized users to enter a password or otherwise authenticate before using the network. A network such as illustrated by the example enterprise network 400 may also be found at small sites, such as in a small business.

The enterprise network 400 may be connected to an external network 450. The external network 450 may be a public network, such as the Internet. A public network is a network that has been made accessible to any device that can connect to it. A public network may have unrestricted access, meaning that, for example, no password or other authentication is required to connect to it. The external network 450 may include third-party telecommunication lines, such as phone lines, broadcast coaxial cable, fiber optic cables, satellite communications, cellular communications, and the like. The external network 450 may include any number of intermediate network devices, such as switches, routers, gateways, servers, and/or controllers that are not directly part of the enterprise network 400 but that facilitate communication between the network 400 and other network-connected entities, such as a remote site 452.

Remote sites 452 are networks and/or individual computers that are generally located outside the enterprise network 400, and which may be connected to the enterprise network 400 through intermediate networks, but that function as if within the enterprise network 400 and connected directly to it. For example, an employee may connect to the enterprise network 400 while at home, using various secure protocols, and/or by connecting to a Virtual Private Network (VPN) provided by the enterprise network 400. While the employee's computer is connected, the employee's home is a remote site 452. Alternatively or additionally, the enterprise network's 400 owner may have a satellite office with a small internal network. This satellite office's network may have a fixed connection to the enterprise network 400 over various intermediate networks. This satellite office can also be considered a remote site.

The enterprise network 400 may be connected to the external network 450 using a gateway device 404. The gateway device 404 may include a firewall or similar system for preventing unauthorized access while allowing authorized access to the enterprise network 400. Examples of gateway devices include routers, modems (e.g. cable, fiber optic, dial-up, etc.), and the like.

The gateway device 404 may be connected to a switch 406a. The switch 406a provides connectivity between various devices in the enterprise network 400. In this example, the switch 406a connects together the gateway device 404, various servers 408, 412, 414, 416, 418, an another switch 406b. A switch typically has multiple ports, and functions to direct packets received on one port to another port. In some implementations, the gateway device 404 and the switch 406a may be combined into a single device.

Various servers may be connected to the switch 406a. For example, a print server 408 may be connected to the switch 406a. The print server 408 may provide network access to a number of printers 410. Client devices connected to the enterprise network 400 may be able to access one of the printers 410 through the printer server 408.

Other examples of servers connected to the switch 406a include a file server 412, database server 414, and email server 416. The file server 412 may provide storage for and access to data. This data may be accessible to client devices connected to the enterprise network 400. The database server 414 may store one or more databases, and provide services for accessing the databases. The email server 416 may host an email program or service, and may also store email for users on the enterprise network 400.

As yet another example, a server rack 418 may be connected to the switch 406. The server rack 418 may house one or more rack-mounted servers. The server rack 418 may have one connection to the switch 406a, or may have multiple connections to the switch 406a. The servers in the server rack 418 may have various purposes, including providing computing resources, file storage, database storage and access, and email, among others.

An additional switch 406b may also be connected to the first switch 406a. The additional switch 406b may be provided to expand the capacity of the network. A switch typically has a limited number of ports (e.g., 8, 16, 32, 64 or more ports). In most cases, however, a switch can direct traffic to and from another switch, so that by connecting the additional switch 406b to the first switch 406a, the number of available ports can be expanded.

In this example, a server 420 is connected to the additional switch 406b. The server 420 may manage network access for a number of network devices or client devices. For example, the server 420 may provide network authentication, arbitration, prioritization, load balancing, and other management services as needed to manage multiple network devices accessing the enterprise network 400. The server 420 may be connected to a hub 422. The hub 422 may include multiple ports, each of which may provide a wired connection for a network or client device. A hub is typically a simpler device than a switch, and may be used when connecting a small number of network devices together. In some cases, a switch can be substituted for the hub 422. In this example, the hub 422 connects desktop computers 424 and laptop computers 426 to the enterprise network 400. In this example, each of the desktop computers 424 and laptop computers 426 are connected to the hub 422 using a physical cable.

In this example, the additional switch 406b is also connected to a wireless access point 428. The wireless access point 428 provides wireless access to the enterprise network 400 for wireless-enabled network or client devices. Examples of wireless-enabled network and client devices include laptops 430, tablet computers 432, and smart phones 434, among others. In some implementations, the wireless access point 428 may also provide switching and/or routing functionality.

The example enterprise network 400 of FIG. 4 is defended from network threats by a network threat detection and analysis system, which uses deception security mechanisms to attract and divert attacks on the network. The deceptive security mechanisms may be controlled by and inserted into the enterprise network 400 using a deception center 498 and sensors 490, which may also be referred to as deception sensors, installed in various places in the enterprise network 400. In some implementations, the deception center 498 and the sensors 490 interact with a security services provider 496 located outside of the enterprise network 400. The deception center 498 may also obtain or exchange data with sources located on external networks 450, such as the Internet.

In various implementations, the sensors 490 are a minimal combination of hardware and/or software, sufficient to form a network connection with the enterprise network 400 and a network tunnel 480 with the deception center 498. For example, a sensor 490 may be constructed using a low-power processor, a network interface, and a simple operating system. In some implementations, any of the devices in the enterprise network (e.g., the servers 408, 412, 416, 418 the printers 410, the computing devices 424, 426, 430, 432, 434, or the network infrastructure devices 404, 406a, 406b, 428) can be configured to act as a sensor.

In various implementations, one or more sensors 490 can be installed anywhere in the enterprise network 400, include being attached switches 406a, hubs 422, wireless access points 428, and so on. The sensors 490 can further be configured to be part of one or more VLANs. The sensors 490 provide the deception center 498 with visibility into the enterprise network 400, such as for example being able to operate as a node in the enterprise network 400, and/or being able to present or project deceptive security mechanisms into the enterprise network 400. Additionally, in various implementations, the sensors 490 may provide a portal through which a suspected attack on the enterprise network 400 can be redirected to the deception center 498.

The deception center 498 provides network security for the enterprise network 400 by deploying security mechanisms into the enterprise network 400, monitoring the enterprise network 400 through the security mechanisms, detecting and redirecting apparent threats, and analyzing network activity resulting from the apparent threat. To provide security for the enterprise network 400, in various implementations the deception center 498 may communicate with sensors 490 installed in the enterprise network 400, using, for example, network tunnels 480. The tunnels 480 may allow the deception center 498 to be located in a different sub-network ("subnet") than the enterprise network 400, on a different network, or remote from the enterprise network 400, with intermediate networks between the deception center 498 and the enterprise network 400. In some implementations, the enterprise network 400 can include more than one deception center 498. In some implementations, the deception center may be located off-site, such as in an external network 450.

In some implementations, the security services provider 496 may act as a central hub for providing security to multiple site networks, possibly including site networks controlled by different organizations. For example, the security services provider 496 may communicate with multiple deception centers 498 that each provide security for a different enterprise network 400 for the same organization. As another example, the security services provider 496 may coordinate the activities of the deception center 498 and the sensors 490, such as enabling the deception center 498 and the sensors 490 to connect to each other. In some implementations, the security services provider 496 is located outside the enterprise network 400. In some implementations, the security services provider 496 is controlled by a different entity than the entity that controls the site network. For example, the security services provider 496 may be an outside vendor. In some implementations, the security services provider 496 is controlled by the same entity as that controls the enterprise network 400. In some implementations, the network security system does not include a security services provider 496.

FIG. 4 illustrates one example of what can be considered a "traditional" network, that is, a network that is based on the interconnection of computers. In various implementations, a network security system, such as the deception-based system discussed above, can also be used to defend "non-traditional" networks that include devices other than traditional computers, such as for example mechanical, electrical, or electromechanical devices, sensors, actuators, and control systems. Such "non-traditional" networks may be referred to as the Internet of Things (IoT). The Internet of Things encompasses newly-developed, every-day devices designed to be networked (e.g., drones, self-driving automobiles, etc.) as well as common and long-established machinery that has augmented to be connected to a network (e.g., home appliances, traffic signals, etc.).

Figure 5:
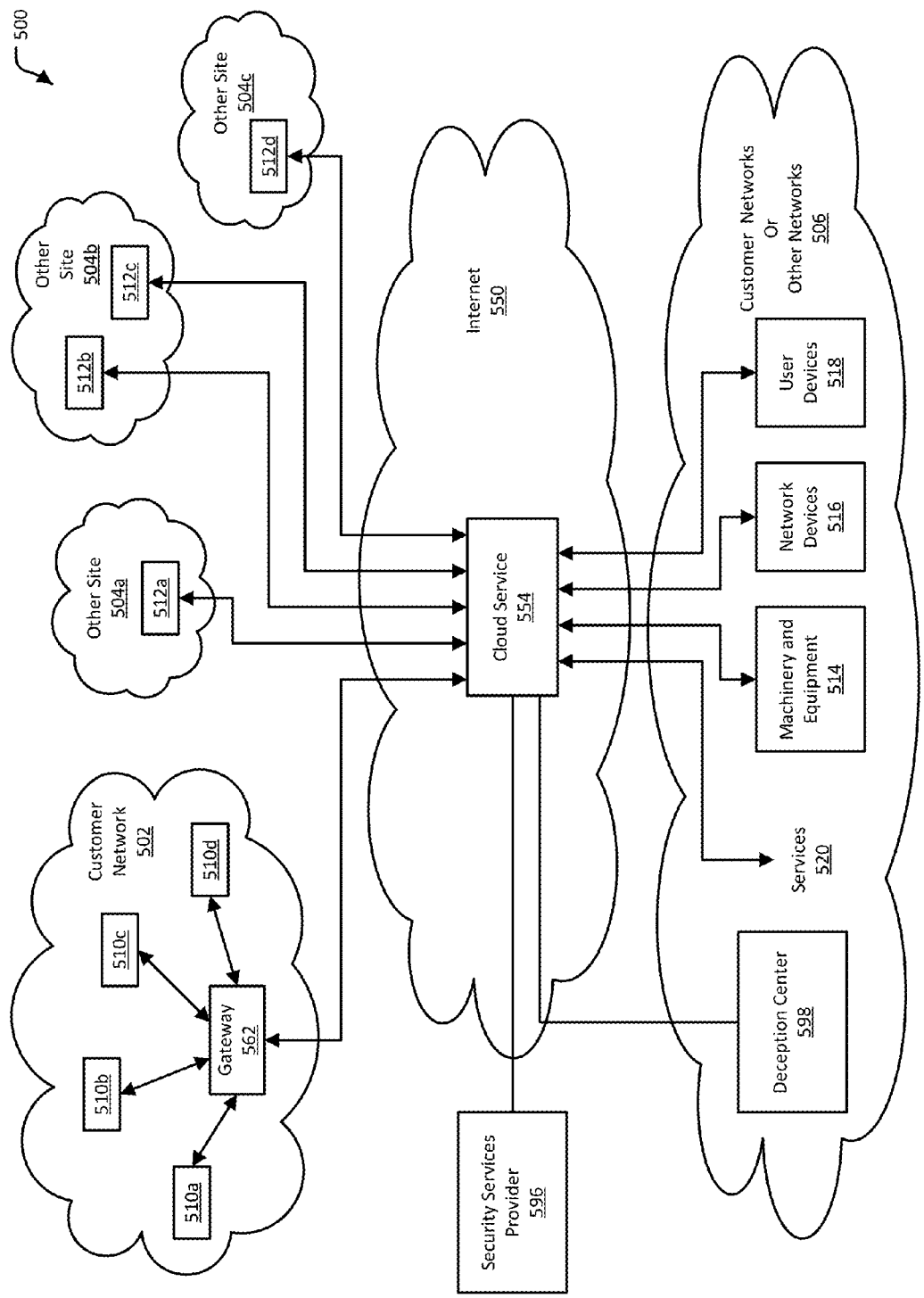
FIG. 5 illustrates a general example of an Internet-of-Things network.

FIG. 5 illustrates a general example of an IoT network 500. The example IoT network 500 can be implemented wherever sensors, actuators, and control systems can be found. For example, the example IoT network 500 can be implemented for buildings, roads and bridges, agriculture, transportation and logistics, utilities, air traffic control, factories, and private homes, among others. In various implementations, the IoT network 500 includes cloud service 554 that collects data from various sensors 510a-510d, 512a-512d, located in various locations. Using the collected data, the cloud service 554 can provide services 520, control of machinery and equipment 514, exchange of data with traditional network devices 516, and/or exchange of data with user devices 518. In some implementations, the cloud service 554 can work with a deception center 528 and/or a security service provider 526 to provide security for the network 500.

A cloud service, such as the illustrated cloud service 554, is a resource provided over the Internet 550. Sometimes synonymous with "cloud computing," the resource provided by the cloud services is in the "cloud" in that the resource is provided by hardware and/or software at some location remote from the place where the resource is used. Often, the hardware and software of the cloud service is distributed across multiple physical locations. Generally, the resource provided by the cloud service is not directly associated with specific hardware or software resources, such that use of the resource can continue when the hardware or software is changed. The resource provided by the cloud service can often also be shared between multiple users of the cloud service, without affecting each user's use. The resource can often also be provided as needed or on-demand. Often, the resource provided by the cloud service 554 is automated, or otherwise capable of operating with little or no assistance from human operators.

Examples of cloud services include software as a service (SaaS), infrastructure as a service (IaaS), platform as a service (PaaS), desktop as a service (DaaS), managed software as a service (MSaaS), mobile backend as a service (MBaaS), and information technology management as a service (ITMaas). Specific examples of cloud services include data centers, such as those operated by Amazon Web Services and Google Web Services, among others, that provide general networking and software services. Other examples of cloud services include those associated with smartphone applications, or "apps," such as for example apps that track fitness and health, apps that allow a user to remotely manage her home security system or thermostat, and networked gaming apps, among others. In each of these examples, the company that provides the app may also provide cloud-based storage of application data, cloud-based software and computing resources, and/or networking services. In some cases, the company manages the cloud services provided by the company, including managing physical hardware resources. In other cases, the company leases networking time from a data center provider.

In some cases, the cloud service 554 is part of one integrated system, run by one entity. For example, the cloud service 554 can be part of a traffic control system. In this example, sensors 510a-510d, 512a-512d can be used to monitor traffic and road conditions. In this example, the cloud service 554 can attempt to optimize the flow of traffic and also provide traffic safety. For example, the sensors 510a-510d, 512a-512d can include a sensor 512a on a bridge that monitors ice formation. When the sensor 512a detects that ice has formed on the bridge, the sensor 512a can alert the cloud service 554. The cloud service 554, can respond by interacting with machinery and equipment 514 that manages traffic in the area of the bridge. For example, the cloud service 554 can turn on warning signs, indicating to drivers that the bridge is icy. Generally, the interaction between the sensor 512, the cloud service 554, and the machinery and equipment 514 is automated, requiring little or no management by human operators.

In various implementations, the cloud service 554 collects or receives data from sensors 510a-510d, 512a-512d, distributed across one or more networks. The sensors 510a-510d, 512a-512d include devices capable of "sensing" information, such as air or water temperature, air pressure, weight, motion, humidity, fluid levels, noise levels, and so on. The sensors 510a-510d, 512a-512d can alternatively or additionally include devices capable of receiving input, such as cameras, microphones, touch pads, keyboards, key pads, and so on. In some cases, a group of sensors 510a-510d may be common to one customer network 502. For example, the sensors 510a-510d may be motion sensors, traffic cameras, temperature sensors, and other sensors for monitoring traffic in a city's metro area. In this example, the sensors 510a-510d can be located in one area of the city, or be distribute across the city, and be connected to a common network. In these cases, the sensors 510a-510d can communicate with a gateway device 562, such as a network gateway. The gateway device 562 can further communicate with the cloud service 554.

In some cases, in addition to receiving data from sensors 510a-510d in one customer network 502, the cloud service 554 can also receive data from sensors 512a-512d in other sites 504a-504c. These other sites 504a-504c can be part of the same customer network 502 or can be unrelated to the customer network 502. For example, the other sites 504a-504c can each be the metro area of a different city, and the sensors 512a-512d can be monitoring traffic for each individual city.

Generally, communication between the cloud service 554 and the sensors 510a-510d, 512a-512d is bidirectional. For example, the sensors 510a-510d, 512a-512d can send information to the cloud service 554. The cloud service 554 can further provide configuration and control information to the sensors 510a-510d, 512a-512d. For example, the cloud service 554 can enable or disable a sensor 510a-510d, 512a-512d or modify the operation of a sensor 510a-510d, 512a-512d, such as changing the format of the data provided by a sensor 510a-510d, 512a-512d or upgrading the firmware of a sensor 510a-510d, 512a-512d.

In various implementations, the cloud service 554 can operate on the data received from the sensors 510a-510d, 512a-512d, and use this data to interact with services 520 provided by the cloud service 554, or to interact with machinery and equipment 514, network devices 516, and/or user devices 518 available to the cloud service 554. Services 520 can include software-based services, such as cloud-based applications, website services, or data management services. Services 520 can alternatively or additionally include media, such as streaming video or music or other entertainment services. Services 520 can also include delivery and/or coordination of physical assets, such as for example package delivery, direction of vehicles for passenger pick-up and drop-off, or automate re-ordering and re-stocking of supplies. In various implementations, services 520 may be delivered to and used by the machinery and equipment 514, the network devices 516, and/or the user devices 518.

In various implementations, the machinery and equipment 514 can include physical systems that can be controlled by the cloud service 554. Examples of machinery and equipment 514 include factory equipment, trains, electrical street cars, self-driving cars, traffic lights, gate and door locks, and so on. In various implementations, the cloud service 554 can provide configuration and control of the machinery and equipment 514 in an automated fashion.

The network devices 516 can include traditional networking equipment, such as server computers, data storage devices, routers, switches, gateways, and so on. In various implementations, the cloud service 554 can provide control and management of the network devices 516, such as for example automated upgrading of software, security monitoring, or asset tracking. Alternatively or additionally, in various implementations the cloud service 554 can exchange data with the network devices 516, such as for example providing websites, providing stock trading data, or providing online shopping resources, among others. Alternatively or additionally, the network devices 516 can include computing systems used by the cloud service provider to manage the cloud service 554.

The user devices 518 can include individual personal computers, smart phones, tablet devices, smart watches, fitness trackers, medical devices, and so on that can be associated with an individual user. The cloud service 554 can exchange data with the user devices 518, such as for example provide support for applications installed on the user devices 518, providing websites, providing streaming media, providing directional navigation services, and so on. Alternatively or additionally, the cloud service 554 may enable a user to use a user device 518 to access and/or view other devices, such as the sensors 510a-510d, 512a-512d, the machinery and equipment 514, or the network devices 516.

In various implementations, the services 520, machinery and equipment 514, network devices 516, and user devices 518 may be part of one customer network 506. In some cases, this customer network 506 is the same as the customer network 502 that includes the sensors 510a-510d. In some cases, the services 520, machinery and equipment 514, network devices 516, and user devices 518 are part of the same network, and may instead be part of various other networks 506.

In various implementations, customer networks can include a deception center 598. The deception center 598 provides network security for the IoT network 500 by deploying security mechanisms into the IoT network 500, monitoring the IoT network 500 through the security mechanisms, detecting and redirecting apparent threats, and analyzing network activity resulting from the apparent threat. To provide security for the IoT network 500, in various implementations the deception center 598 may communicate with the sensors 510a-5106d, 512a-5012 installed in the IoT network 500, for example through the cloud service 554. In some implementations, the IoT network 500 can include more than one deception center 598. For example, each of customer network 502 and customer networks or other networks 506 can include a deception center 528.

In some implementations, the deception center 598 and the sensors 510a-510d, 512a-512d interact with a security services provider 596. In some implementations, the security services provider 596 may act as a central hub for providing security to multiple site networks, possibly including site networks controlled by different organizations. For example, the security services provider 596 may communicate with multiple deception centers 598 that each provide security for a different IoT network 500 for the same organization. As another example, the security services provider 596 may coordinate the activities of the deception center 598 and the sensors 510a-510d, 512a-512d, such as enabling the deception center 598 and the sensors 510a-510d, 512a-512d to connect to each other. In some implementations, the security services provider 596 is integrated into the cloud service 554. In some implementations, the security services provider 596 is controlled by a different entity than the entity that controls the site network. For example, the security services provider 596 may be an outside vendor. In some implementations, the security services provider 596 is controlled by the same entity as that controls the IoT network 500. In some implementations, the network security system does not include a security services provider 596.

Figure 6:
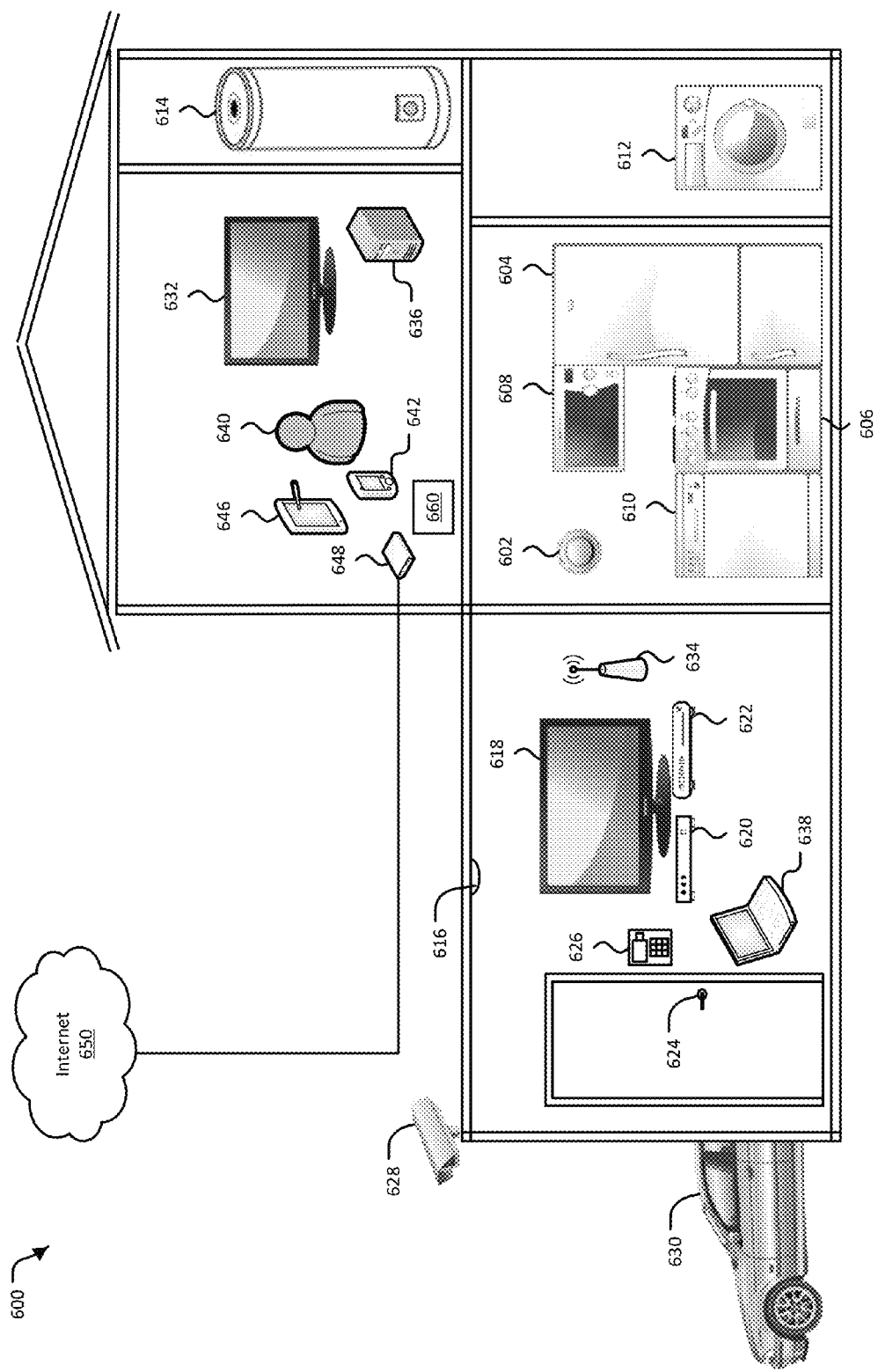
FIG. 6 illustrates an example of an Internet-of-Things network, here implemented in a private home.

IoT networks can also include small networks of non-traditional devices. FIG. 6 illustrates an example of a customer network that is a small network 600, here implemented in a private home. A network for a home is an example of small network that may have both traditional and non-traditional network devices connected to the network 600, in keeping with an Internet of Things approach. Home networks are also an example of networks that are often implemented with minimal security. The average homeowner is not likely to be a sophisticated network security expert, and may rely on his modem or router to provide at least some basic security. The homeowner, however, is likely able to at least set up a basic home network. A deception-based network security device may be as simple to set up as a home router or base station, yet provide sophisticated security for the network 600.

The example network 600 of FIG. 6 may be a single network, or may include multiple sub-networks. These sub-networks may or may not communicate with each other. For example, the network 600 may include a sub-network that uses the electrical wiring in the house as a communication channel. Devices configured to communicate in this way may connect to the network using electrical outlets, which also provide the devices with power. The sub-network may include a central controller device, which may coordinate the activities of devices connected to the electrical network, including turning devices on and off at particular times. One example of a protocol that uses the electrical wiring as a communication network is X10.

The network 600 may also include wireless and wired networks, built into the home or added to the home solely for providing a communication medium for devices in the house. Examples of wireless, radio-based networks include networks using protocols such as Z-Wave™, Zigbee™ (also known as Institute of Electrical and Electronics Engineers (IEEE) 802.15.4), Bluetooth™, and Wi-Fi (also known as IEEE 802.11), among others. Wireless networks can be set up by installing a wireless base station in the house. Alternatively or additionally, a wireless network can be established by having at least two devices in the house that are able to communicate with each other using the same protocol.

Examples of wired networks include Ethernet (also known as IEEE 802.3), token ring (also known as IEEE 802.5), Fiber Distributed Data Interface (FDDI), and Attached Resource Computer Network (ARCNET), among others. A wired network can be added to the house by running cabling through the walls, ceilings, and/or floors, and placing jacks in various rooms that devices can connect to with additional cables. The wired network can be extended using routers, switches, and/or hubs. In many cases, wired networks may be interconnected with wireless networks, with the interconnected networks operating as one seamless network. For example, an Ethernet network may include a wireless base station that provides a Wi-Fi signal for devices in the house.

As noted above, a small network 600 implemented in a home is one that may include both traditional network devices and non-traditional, everyday electronics and appliances that have also been connected to the network 600. Examples of rooms where one may find non-traditional devices connected to the network are the kitchen and laundry rooms. For example, in the kitchen a refrigerator 604, oven 606, microwave 608, and dishwasher 610 may be connected to the network 600, and in the laundry room a washing machine 612 may be connected to the network 600. By attaching these appliances to the network 600, the homeowner can monitor the activity of each device (e.g., whether the dishes are clean, the current state of a turkey in the oven, or the washing machine cycle) or change the operation of each device without needing to be in the same room or even be at home. The appliances can also be configured to resupply themselves. For example, the refrigerator 604 may detect that a certain product is running low, and may place an order with a grocery delivery service for the product to be restocked.

The network 600 may also include environmental appliances, such as a thermostat 602 and a water heater 614. By having these devices connected to the network 600, the homeowner can monitor the current environment of the house (e.g., the air temperature or the hot water temperature), and adjust the settings of these appliances while at home or away. Furthermore, software on the network 600 or on the Internet 650 may track energy usage for the heating and cooling units and the water heater 614. This software may also track energy usage for the other devices, such as the kitchen and laundry room appliances. The energy usage of each appliance may be available to the homeowner over the network 600.

In the living room, various home electronics may be on the network 600. These electronics may have once been fully analog or may have been standalone devices, but now include a network connection for exchanging data with other devices in the network 600 or with the Internet 650. The home electronics in this example include a television 618, a gaming system 620, and a media device 622 (e.g., a video and/or audio player). Each of these devices may play media hosted, for example, on network attached storage 636 located elsewhere in the network 600, or media hosted on the Internet 650.

The network 600 may also include home safety and security devices, such as a smoke detector 616, an electronic door lock 624, and a home security system 626. Having these devices on the network may allow the homeowner to track the information monitored and/or sensed by these devices, both when the homeowner is at home and away from the house. For example, the homeowner may be able to view a video feed from a security camera 628. When the safety and security devices detect a problem, they may also inform the homeowner. For example, the smoke detector 616 may send an alert to the homeowner's smartphone when it detects smoke, or the electronic door lock 624 may alert the homeowner when there has been a forced entry. Furthermore, the homeowner may be able to remotely control these devices. For example, the homeowner may be able to remotely open the electronic door lock 624 for a family member who has been locked out. The safety and security devices may also use their connection to the network to call the fire department or police if necessary.

Another non-traditional device that may be found in the network 600 is the family car 630. The car 630 is one of many devices, such as laptop computers 638, tablet computers 646, and smartphones 642, that connect to the network 600 when at home, and when not at home, may be able to connect to the network 600 over the Internet 650. Connecting to the network 600 over the Internet 650 may provide the homeowner with remote access to his network. The network 600 may be able to provide information to the car 630 and receive information from the car 630 while the car is away. For example, the network 600 may be able to track the location of the car 630 while the car 630 is away.

In the home office and elsewhere around the house, this example network 600 includes some traditional devices connected to the network 600. For example, the home office may include a desktop computer 632 and network attached storage 636. Elsewhere around the house, this example includes a laptop computer 638 and handheld devices such as a tablet computer 646 and a smartphone 642. In this example, a person 640 is also connected to the network 600. The person 640 may be connected to the network 600 wirelessly through personal devices worn by the person 640, such as a smart watch, fitness tracker, or heart rate monitor. The person 640 may alternatively or additionally be connected to the network 600 through a network-enabled medical device, such as a pacemaker, heart monitor, or drug delivery system, which may be worn or implanted.

The desktop computer 632, laptop computer 638, tablet computer 646, and/or smartphone 642 may provide an interface that allows the homeowner to monitor and control the various devices connected to the network. Some of these devices, such as the laptop computer 638, the tablet computer 646, and the smartphone 642 may also leave the house, and provide remote access to the network 600 over the Internet 650. In many cases, however, each device on the network may have its own software for monitoring and controlling only that one device. For example, the thermostat 602 may use one application while the media device 622 uses another, and the wireless network provides yet another. Furthermore, it may be the case that the various sub-networks in the house do not communicate with each other, and/or are viewed and controlled using software that is unique to each sub-network. In many cases, the homeowner may not have one unified and easily understood view of his entire home network 600.

The small network 600 in this example may also include network infrastructure devices, such as a router or switch (not shown) and a wireless base station 634. The wireless base station 634 may provide a wireless network for the house. The router or switch may provide a wired network for the house. The wireless base station 634 may be connected to the router or switch to provide a wireless network that is an extension of the wired network. The router or switch may be connected to a gateway device 648 that connects the network 600 to other networks, including the Internet 650. In some cases, a router or switch may be integrated into the gateway device 648. The gateway device 648 is a cable modem, digital subscriber line (DSL) modem, optical modem, analog modem, or some other device that connects the network 600 to an ISP. The ISP may provide access to the Internet 650. Typically, a home network only has one gateway device 648. In some cases, the network 600 may not be connected to any networks outside of the house. In these cases, information about the network 600 and control of devices in the network 600 may not be available when the homeowner is not connected to the network 600; that is, the homeowner may not have access to his network 600 over the Internet 650.

Typically, the gateway device 648 includes a hardware and/or software firewall. A firewall monitors incoming and outgoing network traffic and, by applying security rules to the network traffic, attempts to keep harmful network traffic out of the network 600. In many cases, a firewall is the only security system protecting the network 600. While a firewall may work for some types of intrusion attempts originating outside the network 600, the firewall may not block all intrusion mechanisms, particularly intrusions mechanisms hidden in legitimate network traffic. Furthermore, while a firewall may block intrusions originating on the Internet 650, the firewall may not detect intrusions originating from within the network 600. For example, an infiltrator may get into the network 600 by connecting to signal from the Wi-Fi base station 634. Alternatively, the infiltrator may connect to the network 600 by physically connecting, for example, to the washing machine 612. The washing machine 612 may have a port that a service technician can connect to service the machine. Alternatively or additionally, the washing machine 612 may have a simple Universal Serial Bus (USB) port. Once an intruder has gained access to the washing machine 612, the intruder may have access to the rest of the network 600.

To provide more security for the network 600, a deception-based network security device 660 can be added to the network 600. In some implementations, the security device 660 is a standalone device that can be added to the network 600 by connecting it to a router or switch. In some implementations, the security device 660 can alternatively or additionally be connected to the network's 600 wireless sub-network by powering on the security device 660 and providing it with Wi-Fi credentials. The security device 660 may have a touchscreen, or a screen and a keypad, for inputting Wi-Fi credentials. Alternatively or additionally, the homeowner may be able to enter network information into the security device by logging into the security device 660 over a Bluetooth™ or Wi-Fi signal using software on a smartphone, tablet, or laptop, or using a web browser. In some implementations, the security device 660 can be connected to a sub-network running over the home's electrical wiring by connecting the security device 660 to a power outlet. In some implementations, the security device 660 may have ports, interfaces, and/or radio antennas for connecting to the various sub-networks that can be included in the network 600. This may be useful, for example, when the sub-networks do not communicate with each other, or do not communicate with each other seamlessly. Once powered on and connected, the security device 660 may self-configure and monitor the security of each sub-network in the network 600 that it is connected to.

In some implementations, the security device 660 may be configured to connect between the gateway device 648 and the network's 600 primary router, and/or between the gateway device 648 and the gateway device's 648 connection to the wall. Connected in one or both of these locations, the security device 660 may be able to control the network's 600 connection with outside networks. For example, the security device can disconnect the network 600 from the Internet 650.

In some implementations, the security device 660, instead of being implemented as a standalone device, may be integrated into one or more of the appliances, home electronics, or computing devices (in this example network 600), or in some other device not illustrated here. For example, the security device 660—or the functionality of the security device 660—may be incorporated into the gateway device 648 or a desktop computer 632 or a laptop computer 638. As another example, the security device 660 can be integrated into a kitchen appliance (e.g., the refrigerator 604 or microwave 608), a home media device (e.g., the television 618 or gaming system 620), or the home security system 626. In some implementations, the security device 660 may be a printed circuit board that can be added to another device without requiring significant changes to the other device. In some implementations, the security device 660 may be implemented using an Application Specific Integrated Circuit (ASIC) or Field Programmable Gate Array (FPGA) that can be added to the electronics of a device. In some implementations, the security device 660 may be implemented as a software module or modules that can run concurrently with the operating system or firmware of a networked device. In some implementations, the security device 660 may have a physical or virtual security barrier that prevents access to it by the device that it is integrated into. In some implementations, the security device's 660 presence in another device may be hidden from the device into which the security device 660 is integrated.

In various implementations, the security device 660 may scan the network 600 to determine which devices are present in the network 600. Alternatively or additionally, the security device 660 may communicate with a central controller in the network 600 (or multiple central controllers, when there are sub-networks, each with their own central controller) to learn which devices are connected to the network 600. In some implementations, the security device 660 may undergo a learning period, during which the security device 660 learns the normal activity of the network 600, such as what time of day appliances and electronics are used, what they are used for, and/or what data is transferred to and from these devices. During the learning period, the security device 660 may alert the homeowner to any unusual or suspicious activity. The homeowner may indicate that this activity is acceptable, or may indicate that the activity is an intrusion. As described below, the security device 660 may subsequently take preventive action against the intrusion.

Once the security device 660 has learned the topology and/or activity of the network 600, the security device 660 may be able to provide deception-based security for the network 600. In some implementations, the security device 660 may deploy security mechanisms that are configured to emulate devices that could be found in the network 600. In some implementations, the security device 660 may monitor activity on the network 600, including watching the data sent between the various devices on the network 600, and between the devices and the Internet 650. The security device 660 may be looking for activity that is unusual, unexpected, or readily identifiable as suspect. Upon detecting suspicious activity in the network 600, the security device 660 may deploy deceptive security mechanisms.

In some implementations, the deceptive security mechanisms are software processes running on the security device 660 that emulate devices that may be found in the network 600. In some implementations, the security device 660 may be assisted in emulating the security devices by another device on the network 600, such as the desktop computer 632. From the perspective of devices connected to the network 600, the security mechanisms appear just like any other device on the network, including, for example, having an Internet Protocol (IP) address, a Media Access Control (MAC) address, and/or some other identification information, having an identifiable device type, and responding to or transmitting data just as would the device being emulated. The security mechanisms may be emulated by the security device 660 itself; thus, while, from the point of view of the network 600, the network 600 appears to have additional devices, no physical equivalent (other than the security device 660) can be found in the house.

The devices and data emulated by a security mechanism are selected such that the security mechanism is an attractive target for intrusion attempts. Thus, the security mechanism may emulate valuable data, and/or devices that are easily hacked into, and/or devices that provide easy access to the reset of the network 600. Furthermore, the security mechanisms emulate devices that are likely to be found in the network 600, such as a second television, a second thermostat, or another laptop computer. In some implementations, the security device 660 may contact a service on the Internet 650 for assistance in selecting devices to emulate and/or for how to configure emulated devices. The security devices 660 may select and configure security mechanisms to be attractive to intrusions attempts, and to deflect attention away from more valuable or vulnerable network assets. Additionally, the security mechanisms can assist in confirming that an intrusion into the network 600 has actually taken place.

In some implementations, the security device 660 may deploy deceptive security mechanisms in advance of detecting any suspicious activity. For example, having scanned the network, the security device 660 may determine that the network 600 includes only one television 618 and one smoke detector 616. The security device 660 may therefore choose to deploy security mechanisms that emulate a second television and a second smoke detector. With security mechanisms preemptively added to the network, when there is an intrusion attempt, the intruder may target the security mechanisms instead of valuable or vulnerable network devices. The security mechanisms thus may serve as decoys and may deflect an intruder away from the network's 600 real devices.

In some implementations, the security mechanisms deployed by the security device 660 may take into account specific requirements of the network 600 and/or the type of devices that can be emulated. For example, in some cases, the network 600 (or a sub-network) may assign identifiers to each device connected to the network 600, and/or each device may be required to adopt a unique identifier. In these cases, the security device 660 may assign an identifier to deployed security mechanisms that do not interfere with identifiers used by actual devices in the network 600. As another example, in some cases, devices on the network 600 may register themselves with a central controller and/or with a central service on the Internet 650. For example, the thermostat 602 may register with a service on the Internet 650 that monitors energy use for the home. In these cases, the security mechanisms that emulate these types of devices may also register with the central controller or the central service. Doing so may improve the apparent authenticity of the security mechanism, and may avoid conflicts with the central controller or central service. Alternatively or additionally, the security device 660 may determine to deploy security mechanisms that emulate other devices, and avoid registering with the central controller or central service.

In some implementations, the security device 660 may dynamically adjust the security mechanisms that it has deployed. For example, when the homeowner adds devices to the network 600, the security device 660 may remove security mechanisms that conflict with the new devices, or change a security mechanism so that the security mechanism's configuration is not incongruous with the new devices (e.g., the security mechanisms should not have the same MAC address as a new device). As another example, when the network owner removes a device from the network 600, the security device 660 may add a security mechanism that mimics the device that was removed. As another example, the security device may change the activity of a security mechanism, for example, to reflect changes in the normal activity of the home, changes in the weather, the time of year, the occurrence of special events, and so on.

The security device 660 may also dynamically adjust the security mechanisms it has deployed in response to suspicious activity it has detected on the network 600. For example, upon detecting suspicious activity, the security device 660 may change the behavior of a security mechanism or may deploy additional security mechanisms. The changes to the security mechanisms may be directed by the suspicious activity, meaning that if, for example, the suspicious activity appears to be probing for a wireless base station 634, the security device 660 may deploy a decoy wireless base station.

Changes to the security mechanisms are meant not only to attract a possible intrusion, but also to confirm that an intrusion has, in fact occurred. Since the security mechanisms are not part of the normal operation of the network 600, normal occupants of the home are not expected to access the security mechanisms. Thus, in most cases, any access of a security mechanism is suspect. Once the security device 660 has detected an access to a security mechanism, the security device 660 may next attempt to confirm that an intrusion into the network 600 has taken place. An intrusion can be confirmed, for example, by monitoring activity at the security mechanism. For example, login attempts, probing of data emulated by the security mechanism, copying of data from the security mechanism, and attempts to log into another part of the network 600 from the security mechanism indicate a high likelihood that an intrusion has occurred.

Once the security device 660 is able to confirm an intrusion into the network 600, the security device 660 may alert the homeowner. For example, the security device 660 may sound an audible alarm, send an email or text message to the homeowner or some other designated persons, and/or send an alert to an application running on a smartphone or tablet. As another example, the security device 660 may access other network devices and, for example, flash lights, trigger the security system's 626 alarm, and/or display messages on devices that include display screens, such as the television 618 or refrigerator 604. In some implementations, depending on the nature of the intrusion, the security device 660 may alert authorities such as the police or fire department.

In some implementations, the security device 660 may also take preventive actions. For example, when an intrusion appears to have originated outside the network 600, the security device 660 may block the network's 600 access to the Internet 650, thus possibly cutting off the intrusion. As another example, when the intrusion appears to have originated from within the network 600, the security device 660 may isolate any apparently compromised devices, for example by disconnecting them from the network 600. When only its own security mechanisms are compromised, the security device 660 may isolate itself from the rest of the network 600. As another example, when the security device 660 is able to determine that the intrusion very likely included physical intrusion into the house, the security device 660 may alert the authorities. The security device 660 may further lock down the house by, for example, locking any electronic door locks 624.

In some implementations, the security device 660 may be able to enable a homeowner to monitor the network 600 when a suspicious activity has been detected, or at any other time. For example, the homeowner may be provided with a software application that can be installed on a smartphone, tablet, desktop, and/or laptop computer. The software application may receive information from the security device 660 over a wired or wireless connection. Alternatively or additionally, the homeowner may be able to access information about his network through a web browser, where the security device 660 formats webpages for displaying the information. Alternatively or additionally, the security device 660 may itself have a touchscreen or a screen and key pad that provide information about the network 600 to the homeowner.

The information provided to the homeowner may include, for example, a list and/or graphic display of the devices connected to the network 600. The information may further provide a real-time status of each device, such as whether the device is on or off, the current activity of the device, data being transferred to or from the device, and/or the current user of the device, among other things. The list or graphic display may update as devices connect and disconnect from the network 600, such as for example laptops and smartphones connecting to or disconnecting from a wireless sub-network in the network 600. The security device 660 may further alert the homeowner when a device has unexpectedly been disconnected from the network 600. The security device 660 may further alert the homeowner when an unknown device connects to the network 600, such as for example when a device that is not known to the homeowner connects to the Wi-Fi signal.

The security device 660 may also maintain historic information. For example, the security device 660 may provide snapshots of the network 600 taken once a day, once a week, or once a month. The security device 660 may further provide a list of devices that have, for example, connected to the wireless signal in the last hour or day, at what times, and for how long. The security device 660 may also be able to provide identification information for these devices, such as MAC addresses or usernames. As another example, the security device 660 may also maintain usage statistics for each device in the network 600, such as for example the times at which each device was in use, what the device was used for, how much energy the device used, and so on.

The software application or web browser or display interface that provides the homeowner with information about his network 600 may also enable the homeowner to make changes to the network 600 or to devices in the network 600. For example, through the security device 660, the homeowner may be able to turn devices on or off, change the configuration of a device, change a password for a device or for the network, and so on.

In some implementations, the security device 660 may also display currently deployed security mechanisms and their configuration. In some implementations, the security device 660 may also display activity seen at the security mechanisms, such as for example a suspicious access to a security mechanism. In some implementations, the security device 660 may also allow the homeowner to customize the security mechanisms. For example, the homeowner may be able to add or remove security mechanisms, modify data emulated by the security mechanisms, modify the configuration of security mechanism, and/or modify the activity of a security mechanism.

A deception-based network security device 660 thus can provide sophisticated security for a small network. The security device 660 may be simple to add to a network, yet provide comprehensive protection against both external and internal intrusions. Moreover, the security device 660 may be able to monitor multiple sub-networks that are each using different protocols. The security device 660, using deceptive security mechanisms, may be able to detect and confirm intrusions into the network 600. The security device 660 may be able to take preventive actions when an intrusion occurs. The security device 660 may also be able to provide the homeowner with information about his network, and possibly also control over devices in the network.

Figure 7:
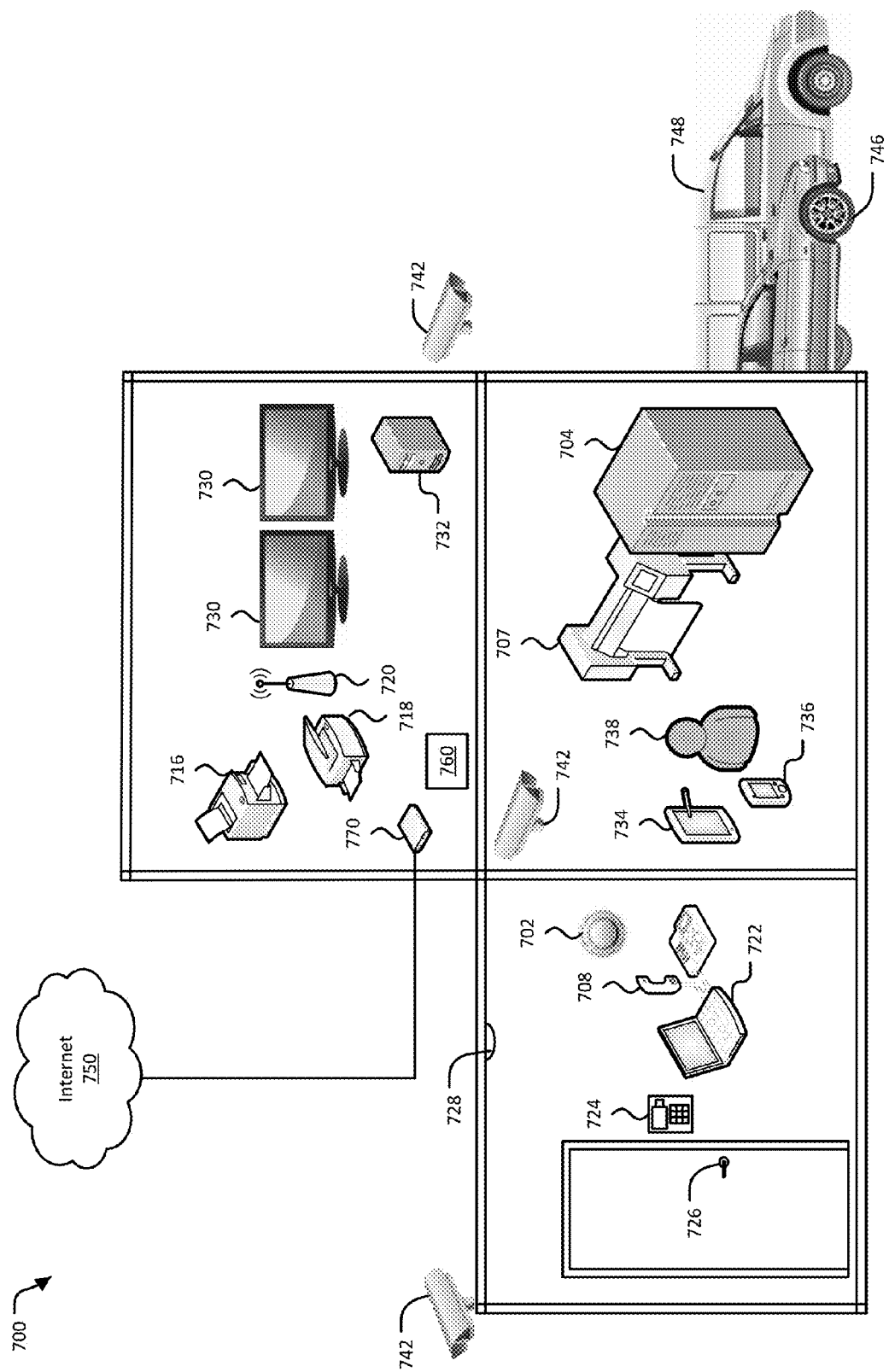
FIG. 7 illustrates of an Internet-of-Things network, here implemented in a small business.

FIG. 7 illustrates another example of a small network 700, here implemented in a small business. A network in a small business may have both traditional and non-traditional devices connected to the network 700. Small business networks are also examples of networks that are often implemented with minimal security. A small business owner may not have the financial or technical resources, time, or expertise to configure a sophisticated security infrastructure for her network 700. The business owner, however, is likely able to at least set up a network 700 for the operation of the business. A deception-based network security device that is at least as simple to set up as the network 700 itself may provide inexpensive and simple yet sophisticated security for the network 700.

The example network 700 may be one, single network, or may include multiple sub-networks. For example, the network 700 may include a wired sub-network, such as an Ethernet network, and a wireless sub-network, such as an 802.11 Wi-Fi network. The wired sub-network may be implemented using cables that have been run through the walls and/or ceilings to the various rooms in the business. The cables may be connected to jacks in the walls that devices can connect to in order to connect to the network 700. The wireless network may be implemented using a wireless base station 720, or several wireless base stations, which provide a wireless signal throughout the business. The network 700 may include other wireless sub-networks, such as a short-distance Bluetooth™ network. In some cases, the sub-networks communicate with one another. For example, the Wi-Fi sub-network may be connected to the wired Ethernet sub-network. In some cases, the various sub-networks in the network 700 may not be configured to or able to communicate with each other.

As noted above, the small business network 700 may include both computers, network infrastructure devices, and other devices not traditionally found in a network. The network 700 may also include electronics, machinery, and systems that have been connected to the network 700 according to an Internet-of-Things approach. Workshop machinery that was once purely analog may now have computer controls. Digital workshop equipment may be network-enabled. By connecting shop equipment and machinery to the network 700, automation and efficiency of the business can be improved and orders, materials, and inventory can be tracked. Having more devices on the network 700, however, may increase the number of vulnerabilities in the network 700. Devices that have only recently become network-enabled may be particularly vulnerable because their security systems have not yet been hardened through use and attack. A deception-based network security device may provide simple-to-install and sophisticated security for a network that may otherwise have only minimal security.

The example small business of FIG. 7 includes a front office. In the front office, the network may include devices for administrative tasks. These devices may include, for example, a laptop computer 722 and a telephone 708. These devices may be attached to the network 700 in order to, for example, access records related to the business, which may be stored on a server 732 located elsewhere in the building. In the front office, security devices for the building may also be found, including, for example, security system controls 724 and an electronic door lock 726. Having the security devices on the network 700 may enable the business owner to remotely control access to the building. The business owner may also be able to remotely monitor the security of building, such as for example being able to view video streams from security cameras 742. The front office may also be where environmental controls, such as a thermostat 702, are located. Having the thermostat 702 on the network 700 may allow the business owner to remotely control the temperature settings. A network-enabled thermostat 702 may also track energy usage for the heating and cooling systems. The front office may also include safety devices, such as a network-connected smoke alarm 728. A network-connected smoke alarm may be able to inform the business owner that there is a problem in the building be connecting to the business owner's smartphone or computer.

Another workspace in this example small business is a workshop. In the workshop, the network 700 may include production equipment for producing the goods sold by the business. The production equipment may include, for example, manufacturing machines 704 (e.g. a milling machine, a Computer Numerical Control (CNC) machine, a 3D printer, or some other machine tool) and a plotter 706. The production equipment may be controlled by a computer on the network 700, and/or may receive product designs over the network 700 and independently execute the designs. In the workshop, one may also find other devices related to the manufacturing of products, such as radiofrequency identification (RFID) scanners, barcode or Quick Response (QR) code generators, and other devices for tracking inventory, as well as electronic tools, hand tools, and so on.

In the workshop and elsewhere in the building, mobile computing devices and people 738 may also be connected to the network 700. Mobile computing devices include, for example, tablet computers 734 and smartphones 736. These devices may be used to control production equipment, track supplies and inventory, receive and track orders, and/or for other operations of the business. People 738 may be connected to the network through network-connected devices worn or implanted in the people 738, such as for example smart watches, fitness trackers, heart rate monitors, drug delivery systems, pacemakers, and so on.

At a loading dock, the example small business may have a delivery van 748 and a company car 746. When these vehicles are away from the business, they may be connected to the network 700 remotely, for example over the Internet 750. By being able to communicate with the network 700, the vehicles may be able to receive information such as product delivery information (e.g., orders, addresses, and/or delivery times), supply pickup instructions, and so on. The business owner may also be able to track the location of these vehicles from the business location, or over the Internet 750 when away from the business, and/or track who is using the vehicles.

The business may also have a back office. In the back office, the network 700 may include traditional network devices, such as computers 730, a multi-function printer 716, a scanner 718, and a server 732. In this example, the computers 730 may be used to design products for manufacturing in the workshop, as well as for management of the business, including tracking orders, supplies, inventory, and/or human resources records. The multi-function printer 716 and scanner 718 may support the design work and the running of the business. The server 732 may store product designs, orders, supply records, and inventory records, as well as administrative data, such as accounting and human resources data.

The back office may also be where a gateway device 770 is located. The gateway device 770 connects the small business to other networks, including the Internet 750. Typically, the gateway device 770 connects to an ISP, and the ISP provides access to the Internet 750. In some cases, a router may be integrated into the gateway device 770. In some cases, gateway device 770 may be connected to an external router, switch, or hub, not illustrated here. In some cases, the network 700 is not connected to any networks outside of the business's own network 700. In these cases, the network 700 may not have a gateway device 770.

The back office is also where the network 700 may have a deception-based network security device 760. The security device 760 may be a standalone device that may be enabled as soon as it is connected to the network 700. Alternatively or additionally, the security device 760 may be integrated into another device connected to the network 700, such as the gateway device 770, a router, a desktop computer 730, a laptop computer 722, the multi-function printer 716, or the thermostat 702, among others. When integrated into another device, the security device 760 may use the network connection of the other device, or may have its own network connection for connecting to the network 700. The security device 760 may connect to the network 700 using a wired connection or a wireless connection.

Once connected to the network 700, the security device 760 may begin monitoring the network 700 for suspect activity. In some implementations, the security device 760 may scan the network 700 to learn which devices are connected to the network 700. In some cases, the security device 760 may learn the normal activity of the network 700, such as what time the various devices are used, for how long, by whom, for what purpose, and what data is transferred to and from each device, among other things.

In some implementations, having learned the configuration and/or activity of the network 700, the security device 760 may deploy deceptive security mechanisms. These security mechanisms may emulate devices that may be found on the network 700, including having an identifiable device type and/or network identifiers (such as a MAC address and/or IP address), and being able to send and receive network traffic that a device of a certain time would send and receive. For example, for the example small business, the security device 760 may configure a security mechanism to emulate a 3D printer, a wide-body scanner, or an additional security camera. The security device 760 may further avoid configuring a security mechanism to emulate a device that is not likely to be found in the small business, such as a washing machine. The security device 760 may use the deployed security mechanisms to monitor activity on the network 700.

In various implementations, when the security device 760 detects suspect activity, the security device 760 may deploy additional security mechanisms. These additional security mechanisms may be selected based on the nature of suspect activity. For example, when the suspect activity appears to be attempting to break into the shop equipment, the security device 760 may deploy a security mechanism that looks like shop equipment that is easy to hack. In some implementations, the security device 760 may deploy security mechanisms only after detecting suspect activity on the network 700.

The security device 760 selects devices to emulate that are particularly attractive for an infiltration, either because the emulated device appears to have valuable data or because the emulated device appears to be easy to infiltrate, or for some other reason. In some implementations, the security device 760 connects to a service on the Internet 750 for assistance in determining which devices to emulate and/or how to configure the emulated device. Once deployed, the security mechanisms serve as decoys to attract the attention of a possible infiltrator away from valuable network assets. In some implementations, the security device 760 emulates the security mechanisms using software processes. In some implementations, the security device 760 may be assisted in emulating security mechanisms by a computer 730 on the network.

In some implementations, the security device 760 may deploy security mechanisms prior to detecting suspicious activity on the network 700. In these implementations, the security mechanisms may present more attractive targets for a possible, future infiltration, so that if an infiltration occurs, the infiltrator will go after the security mechanisms instead of the actual devices on the network 700.

In various implementations, the security device 760 may also change the security mechanisms that it has deployed. For example, the security device 760 may add or remove security mechanisms as the operation of the business changes, as the activity on the network 700 changes, as devices are added or removed from the network 700, as the time of year changes, and so on.

Besides deflecting a possible network infiltration away from valuable or vulnerable network devices, the security device 760 may use the security mechanisms to confirm that the network 700 has been infiltrated. Because the security mechanisms are not part of actual devices in use by the business, any access to them over the network is suspect. Thus, once the security device 760 detects an access to one of its security mechanisms, the security device 760 may attempt to confirm that this access is, in fact, an unauthorized infiltration of the network 700.

To confirm that a security mechanism has been infiltrated, the security device 760 may monitor activity seen at the security mechanism. The security device 760 may further deploy additional security mechanisms, to see if, for example, it can present an even more attractive target to the possible infiltrator. The security device 760 may further look for certain activity, such as log in attempts to other devices in the network, attempts to examine data on the security mechanism, attempts to move data from the security mechanism to the Internet 750, scanning of the network 700, password breaking attempts, and so on.

Once the security device 760 has confirmed that the network 700 has been infiltrated, the security device 760 may alert the business owner. For example, the security device 760 may sound an audible alarm, email or send text messages to the computers 730 and/or handheld devices 734, 736, send a message to the business's cars 746, 748, flash lights, or trigger the security system's 724 alarm. In some implementations, the security device 760 may also take preventive measures. For example, the security device 760 may disconnect the network 700 from the Internet 750, may disconnect specific devices from the network 700 (e.g., the server 732 or the manufacturing machines 704), may turn some network-connected devices off, and/or may lock the building.

In various implementations, the security device 760 may allow the business owner to monitor her network 700, either when an infiltration is taking place or at any other time. For example, the security device 760 may provide a display of the devices currently connected to the network 700, including flagging any devices connected to the wireless network that do not appear to be part of the business. The security device 760 may further display what each device is currently doing, who is using them, how much energy each device is presently using, and/or how much network bandwidth each device is using. The security device 760 may also be able to store this information and provide historic configuration and/or usage of the network 700.

The security device 760 may have a display it can use to show information to the business owner. Alternatively or additionally, the security device 760 may provide this information to a software application that can run on a desktop or laptop computer, a tablet, or a smartphone. Alternatively or additionally, the security device 760 may format this information for display through a web browser. The business owner may further be able to control devices on the network 700 through an interface provided by the security device 760, including, for example, turning devices on or off, adjusting settings on devices, configuring user accounts, and so on. The business owner may also be able to view any security mechanisms presently deployed, and may be able to re-configure the security mechanisms, turn them off, or turn them on.

IoT networks can also include industrial control systems. Industrial control system is a general term that encompasses several types of control systems, including supervisory control and data acquisition (SCADA) systems, distributed control systems (DCS) and other control system configurations, such as Programmable Logic Controllers (PLCs), often found in the industrial sectors and infrastructures. Industrial control systems are often found in industries such as electrical, water and wastewater, oil and natural gas, chemical, transportation, pharmaceutical, pulp and paper, food and beverage, and discrete manufacturing (e.g., automotive, aerospace, and durable goods). While a large percentage of industrial control systems may be privately owned and operated, federal agencies also operate many industrial processes, such as air traffic control systems and materials handling (e.g., Postal Service mail handling).

Figure 8:
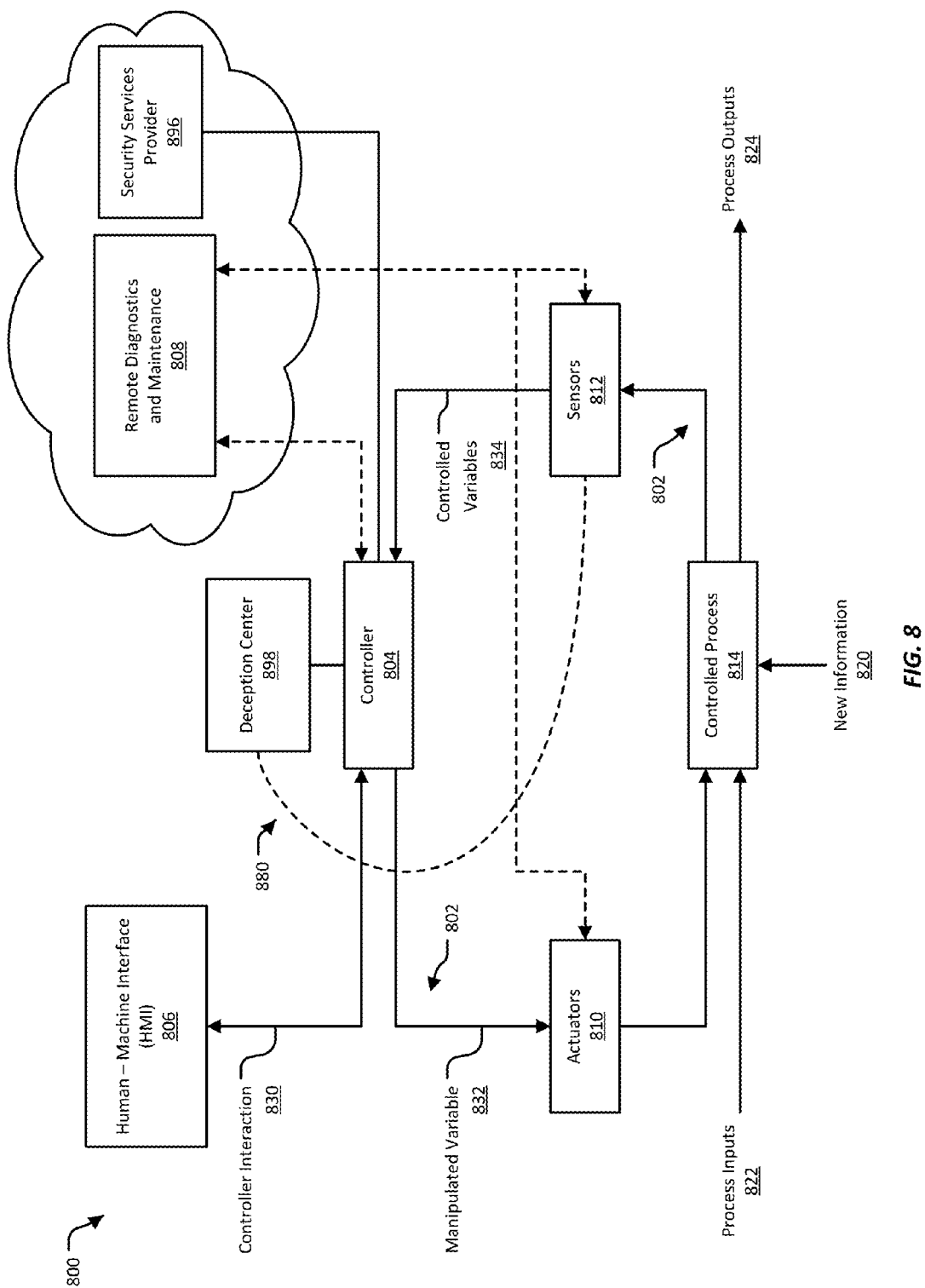
FIG. 8 illustrates an example of the basic operation of an industrial control system.

FIG. 8 illustrates an example of the basic operation of an industrial control system 800. Generally, an industrial control system 800 may include a control loop 802, a human-machine interface 806, and remote diagnostics and maintenance 808. In some implementations, the example industrial control system can be defended by a network threat detection and analysis system, which can include a deception center 898 and a security services provider 896.

A control loop 802 may consist of sensors 812, controller 804 hardware such as PLCs, actuators 810, and the communication of variables 832, 834. The sensors 812 may be used for measuring variables in the system, while the actuators 810 may include, for example, control valves breakers, switches, and motors. Some of the sensors 812 may be deceptions sensors. Controlled variables 834 may be transmitted to the controller 804 from the sensors 812. The controller 804 may interpret the controlled variables 834 and generates corresponding manipulated variables 832, based on set points provided by controller interaction 830. The controller 804 may then transmit the manipulated variables 832 to the actuators 810. The actuators 810 may drive a controlled process 814 (e.g., a machine on an assembly line). The controlled process 814 may accept process inputs 822 (e.g., raw materials) and produce process outputs 824 (e.g., finished products). New information 820 provided to the controlled process 814 may result in new sensor 812 signals, which identify the state of the controlled process 814 and which may also transmitted to the controller 804.

In some implementations, at least some of the sensors 812 can also provide the deception center 898 with visibility into the industrial control system 800, such as for example being able to present or project deceptive security mechanisms into the industrial control system. Additionally, in various implementations, the sensors 812 may provide a portal through which a suspected attack on the industrial control system can be redirected to the deception center 898. The deception center 898 and the sensors 812 may be able to communicate using network tunnels 880.

The deception center 898 provides network security for the industrial control system 800 by deploying security mechanisms into the industrial control system 800, monitoring the industrial control system through the security mechanisms, detecting and redirecting apparent threats, and analyzing network activity resulting from the apparent threat. In some implementations, the industrial control system 800 can include more than one deception center 898. In some implementations, the deception center may be located off-site, such as on the Internet.

In some implementations, the deception center 898 may interact with a security services provider 896 located outside the industrial control system 800. The security services provider 896 may act as a central hub for providing security to multiple sites that are part of the industrial control system 800, and/or for multiple separate, possibly unrelated, industrial control systems. For example, the security services provider 896 may communicate with multiple deception centers 898 that each provide security for a different industrial control system 800 for the same organization. As another example, the security services provider 896 may coordinate the activities of the deception center 898 and the sensors 812, such as enabling the deception center 898 and the sensors 812 to connect to each other. In some implementations, the security services provider 896 is located outside the industrial control system 800. In some implementations, the security services provider 896 is controlled by a different entity than the entity that controls the site network. For example, the security services provider 896 may be an outside vendor. In some implementations, the security services provider 896 is controlled by the same entity as that controls the industrial control system. In some implementations, the network security system does not include a security services provider 896.

The human-machine interface 806 provides operators and engineers with an interface for controller interaction 830. Controller interaction 830 may include monitoring and configuring set points and control algorithms, and adjusting and establishing parameters in the controller 804. The human-machine interface 806 typically also receives information from the controller 804 that allows the human-machine interface 806 to display process status information and historical information about the operation of the control loop 802.

The remote diagnostics and maintenance 808 utilities are typically used to prevent, identify, and recover from abnormal operation or failures. For diagnostics, the remote diagnostics and maintenance utilities 808 may monitor the operation of each of the controller 804, sensors 812, and actuators 810. To recover after a problem, the remote diagnostics and maintenance 808 utilities may provide recovery information and instructions to one or more of the controller 804, sensors 812, and/or actuators 810.

A typical industrial control system contains many control loops, human-machine interfaces, and remote diagnostics and maintenance tools, built using an array of network protocols on layered network architectures. In some cases, multiple control loops are nested and/or cascading, with the set point for one control loop being based on process variables determined by another control loop. Supervisory-level control loops and lower-level control loops typically operate continuously over the duration of a process, with cycle times ranging from milliseconds to minutes.

One type of industrial control system that may include many control loops, human-machine interfaces, and remote diagnostics and maintenance tools is a supervisory control and data acquisition (SCADA) system. SCADA systems are used to control dispersed assets, where centralized data acquisition is typically as important as control of the system. SCADA systems are used in distribution systems such as, for example, water distribution and wastewater collection systems, oil and natural gas pipelines, electrical utility transmission and distribution systems, and rail and other public transportation systems, among others. SCADA systems typically integrate data acquisition systems with data transmission systems and human-machine interface software to provide a centralized monitoring and control system for numerous process inputs and outputs. SCADA systems are typically designed to collect field information, transfer this information to a central computer facility, and to display the information to an operator in a graphic and/or textual manner. Using this displayed information, the operator may, in real time, monitor and control an entire system from a central location. In various implementations, control of any individual sub-system, operation, or task can be automatic, or can be performed by manual commands.

Figure 9:
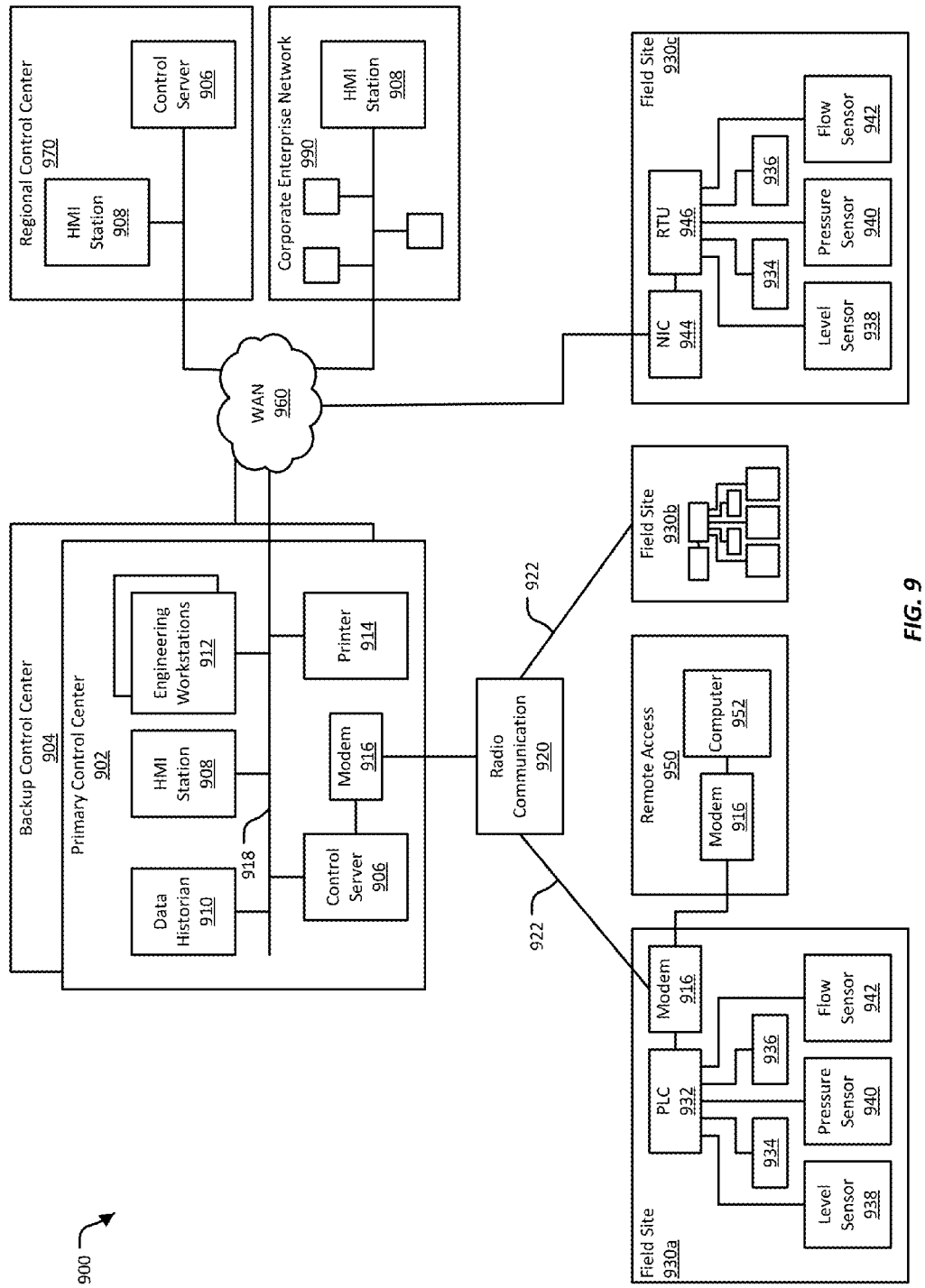
FIG. 9 illustrates an example of a SCADA system, here used for distributed monitoring and control.

FIG. 9 illustrates an example of a SCADA system 900, here used for distributed monitoring and control. This example SCADA system 900 includes a primary control center 902 and three field sites 930*a*-930*c*. A backup control center 904 provides redundancy in case of there is a malfunction at the primary control center 902. The primary control center 902 in this example includes a control server 906—which may also be called a SCADA server or a Master Terminal Unit (MTU)—and a local area network (LAN) 908. The primary control center 902 may also include a human-machine interface station 908, a data historian 910, engineering workstations 912, and various network equipment such as printers 914, each connected to the LAN 918.

The control server 906 typically acts as the master of the SCADA system 900. The control server 906 typically includes supervisory control software that controls lower-level control devices, such as Remote Terminal Units (RTUs) and PLCs, located at the field sites 930*a*-930*c*. The software may tell the system 900 what and when to monitor, what parameter ranges are acceptable, and/or what response to initiate when parameters are outside of acceptable values.

The control server 906 of this example may access Remote Terminal Units and/or PLCs at the field sites 930*a*-930*c* using a communications infrastructure, which may include radio-based communication devices, telephone lines, cables, and/or satellites. In the illustrated example, the control server 906 is connected to a modem 916, which provides communication with serial-based radio communication 920, such as a radio antenna. Using the radio communication 920, the control server 906 can communicate with field sites 930*a*-930*b* using radiofrequency signals 922. Some field sites 930*a*-930*b* may have radio transceivers for communicating back to the control server 906.

A human-machine interface station 908 is typically a combination of hardware and software that allows human operators to monitor the state of processes in the SCADA system 900. The human-machine interface station 908 may further allow operators to modify control settings to change a control objective, and/or manually override automatic control operations, such as in the event of an emergency. The human-machine interface station 908 may also allow a control engineer or operator to configure set points or control algorithms and parameters in a controller, such as a Remote Terminal Unit or a PLC. The human-machine interface station 908 may also display process status information, historical information, reports, and other information to operators, administrators, mangers, business partners, and other authorized users. The location, platform, and interface of a human-machine interface station 908 may vary. For example, the human-machine interface station 908 may be a custom, dedicated platform in the primary control center 902, a laptop on a wireless LAN, or a browser on a system connected to the Internet.

The data historian 910 in this example is a database for logging all process information within the SCADA system 900. Information stored in this database can be accessed to support analysis of the system 900, for example for statistical process control or enterprise level planning.

The backup control center 904 may include all or most of the same components that are found in the primary control center 902. In some cases, the backup control center 904 may temporarily take over for components at the primary control center 902 that have failed or have been taken offline for maintenance. In some cases, the backup control center 904 is configured to take over all operations of the primary control center 902, such as when the primary control center 902 experiences a complete failure (e.g., is destroyed in a natural disaster).

The primary control center 902 may collect and log information gathered by the field sites 930*a*-930*c* and display this information using the human-machine interface station 908. The primary control center 902 may also generate actions based on detected events. The primary control center 902 may, for example, poll field devices at the field sites 930*a*-930*c* for data at defined intervals (e.g., 5 or 60 seconds), and can send new set points to a field device as required. In addition to polling and issuing high-level commands, the primary control center 902 may also watch for priority interrupts coming from the alarm systems at the field sites 930*a*-930*c*.

In this example, the primary control center 902 uses point-to-point connections to communication with three field sites 930*a*-930*c*, using radio telemetry for two communications with two of the field sites 930*a*-930*b*. In this example, the primary control center 902 uses a wide area network (WAN) 960 to communicate with the third field site 930*c*. In other implementations, the primary control center 902 may use other communication topologies to communicate with field sites. Other communication topologies include rings, stars, meshes, trees, lines or series, and busses or multi-drops, among others. Standard and proprietary communication protocols may be used to transport information between the primary control center 902 and field sites 930*a*-930*c*. These protocols may use telemetry techniques such as provided by telephone lines, cables, fiber optics, and/or radiofrequency transmissions such as broadcast, microwave, and/or satellite communications.

The field sites 930*a*-930*c* in this example perform local control of actuators and monitor local sensors. For example, a first field site 930*a* may include a PLC 932. A PLC is a small industrial computer originally designed to perform the logic functions formerly executed by electrical hardware (such as relays, switches, and/or mechanical timers and counters). PLCs have evolved into controllers capable of controlling complex processes, and are used extensively in both SCADA systems and distributed control systems. Other controllers used at the field level include process controllers and Remote Terminal Units, which may provide the same level of control as a PLC but may be designed for specific control applications. In SCADA environments, PLCs are often used as field devices because they are more economical, versatile, flexible, and configurable than special-purpose controllers.

The PLC 932 at a field site, such as the first field site 930*a*, may control local actuators 934, 936 and monitor local sensors 938, 940, 942. Examples of actuators include valves 934 and pumps 936, among others. Examples of sensors include level sensors 938, pressure sensors 940, and flow sensors 942, among others. Any of the actuators 934, 936 or sensors 938, 940, 942 may be "smart" actuators or sensors, more commonly called intelligent electronic devices (IEDs). Intelligent electronic devices may include intelligence for acquiring data, communicating with other devices, and performing local processing and control. An intelligent electronic device could combine an analog input sensor, analog output, low-level control capabilities, a communication system, and/or program memory in one device. The use of intelligent electronic devices in SCADA systems and distributed control systems may allow for automatic control at the local level. Intelligent electronic devices, such as protective relays, may communicate directly with the control server 906. Alternatively or additionally, a local Remote Terminal Unit may poll intelligent electronic devices to collect data, which it may then pass to the control server 906.

Field sites 930*a*-930*c* are often equipped with remote access capability that allows field operators to perform remote diagnostics and repairs. For example, the first remote 930*a* may include a modem 916 connected to the PLC 932. A remote access 950 site may be able to, using a dial up connection, connect to the modem 916. The remote access 950 site may include its own modem 916 for dialing into to the field site 930*a* over a telephone line. At the remote access 950 site, an operator may use a computer 952 connected to the modem 916 to perform diagnostics and repairs on the first field site 930*a*.

The example SCADA system 900 includes a second field site 930*b*, which may be provisioned in substantially the same way as the first field site 930*a*, having at least a modem and a PLC or Remote Terminal that controls and monitors some number of actuators and sensors.

The example SCADA system 900 also includes a third field site 930*c* that includes a network interface card (NIC) 944 for communicating with the system's 900 WAN 960. In this example, the third field site 930*c* includes a Remote Terminal Unit 946 that is responsible for controlling local actuators 934, 936 and monitoring local sensors 938, 940, 942. A Remote Terminal Unit, also called a remote telemetry unit, is a special-purpose data acquisition and control unit typically designed to support SCADA remote stations. Remote Terminal Units may be field devices equipped with wireless radio interfaces to support remote situations where wire-based communications are unavailable. In some cases, PLCs are implemented as Remote Terminal Units.

The SCADA system 900 of this example also includes a regional control center 970 and a corporate enterprise network 980. The regional control center 970 may provide a higher level of supervisory control. The regional control center 970 may include at least a human-machine interface station 908 and a control server 906 that may have supervisory control over the control server 906 at the primary control center 902. The corporate enterprise network 980 typically has access, through the system's 900 WAN 960, to all the control centers 902, 904 and to the field sites 930*a*-930*c*. The corporate enterprise network 980 may include a human-machine interface station 908 so that operators can remotely maintain and troubleshoot operations.

Another type of industrial control system is the distributed control system (DCS). Distributed control systems are typically used to control production systems within the same geographic location for industries such as oil refineries, water and wastewater management, electric power generation plants, chemical manufacturing plants, and pharmaceutical processing facilities, among others. These systems are usually process control or discrete part control systems. Process control systems may be processes that run continuously, such as manufacturing processes for fuel or steam flow in a power plant, for petroleum production in a refinery, or for distillation in a chemical plant. Discrete part control systems have processes that have distinct processing steps, typically with a distinct start and end to each step, such as found in food manufacturing, electrical and mechanical parts assembly, and parts machining. Discrete-based manufacturing industries typically conduct a series of steps on a single item to create an end product.

A distributed control system typically uses a centralized supervisory control loop to mediate a group of localized controllers that share the overall tasks of carrying out an entire production process. By modularizing the production system, a distributed control system may reduce the impact of a single fault on the overall system. A distributed control system is typically interfaced with a corporate network to give business operations a view of the production process.

Figure 10:
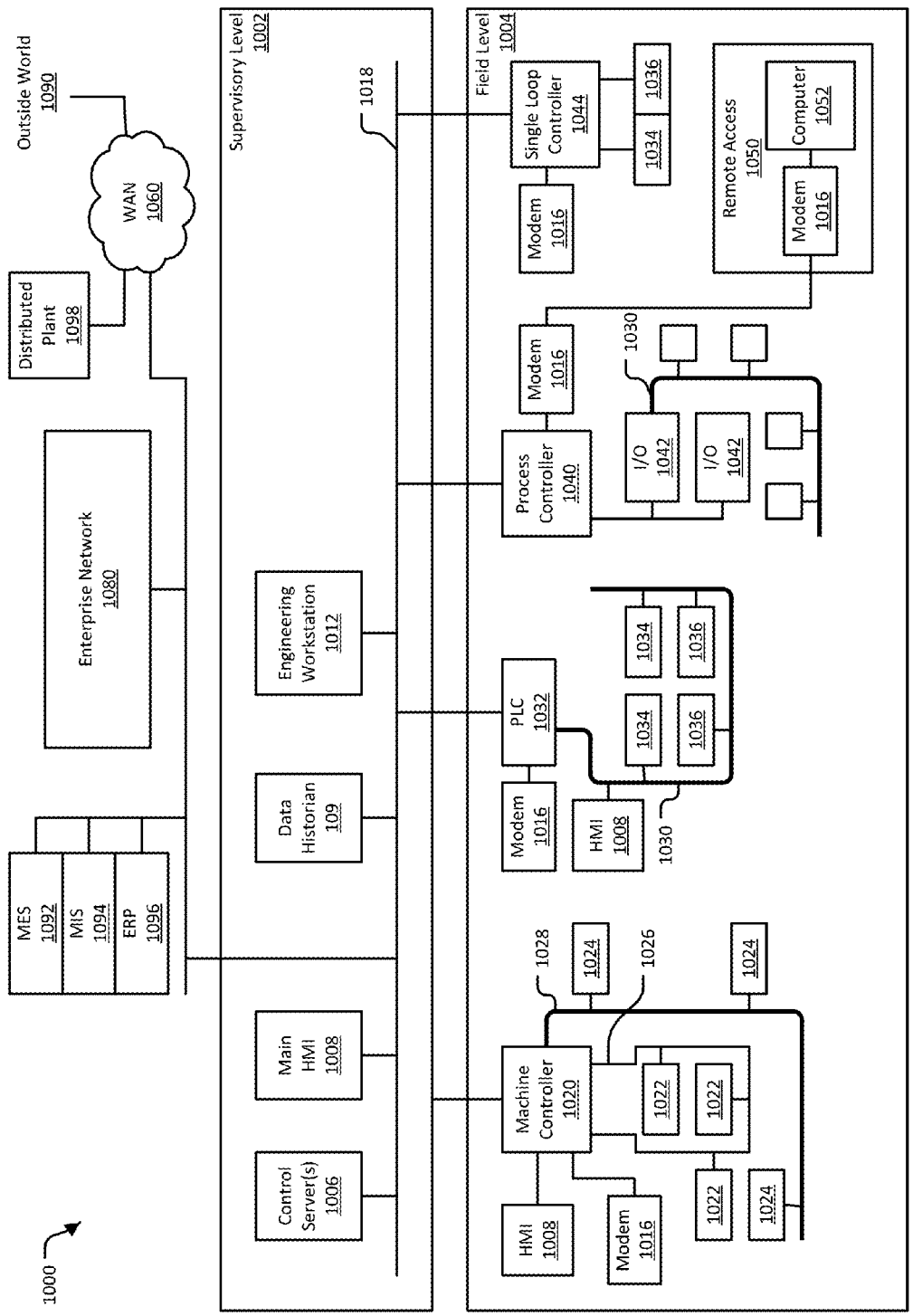
FIG. 10 illustrates an example of a distributed control.

FIG. 10 illustrates an example of a distributed control system 1000. This example distributed control system 1000 encompasses a production facility, including bottom-level production processes at a field level 1004, supervisory control systems at a supervisory level 1002, and a corporate or enterprise layer.

At the supervisory level 1002, a control server 1006, operating as a supervisory controller, may communicate with subordinate systems via a control network 1018. The control server 1006 may send set points to distributed field controllers, and may request data from the distributed field controllers. The supervisory level 1002 may include multiple control servers 1006, with one acting as the primary control server and the rest acting as redundant, back-up control servers. The supervisory level 1002 may also include a main human-machine interface 1008 for use by operators and engineers, a data historian 1010 for logging process information from the system 1000, and engineering workstations 1012.

At the field level 1004, the system 1000 may include various distributed field controllers. In the illustrated example, the distributed control system 1000 includes a machine controller 1020, a PLC 1032, a process controller 1040, and a single loop controller 1044. The distributed field controllers may each control local process actuators, based on control server 1006 commands and sensor feedback from local process sensors.

In this example, the machine controller 1020 drives a motion control network 1026. Using the motion control network 1026, the machine controller 1020 may control a number of servo drives 1022, which may each drive a motor. The machine controller 1020 may also drive a logic control bus 1028 to communicate with various devices 1024. For example, the machine controller 1020 may use the logic control bus 1028 to communicate with pressure sensors, pressure regulators, and/or solenoid valves, among other devices. One or more of the devices 1024 may be an intelligent electronic device. A human-machine interface 1008 may be attached to the machine controller 1020 to provide an operator with local status information about the processes under control of the machine controller 1020, and/or local control of the machine controller 1020. A modem 1016 may also be attached to the machine controller 1020 to provide remote access to the machine controller 1020.

The PLC 1032 in this example system 1000 uses a fieldbus 1030 to communicate with actuators 1034 and sensors 1036 under its control. These actuators 1034 and sensors 1036 may include, for example, direct current (DC) servo drives, alternating current (AC) servo drives, light towers, photo eyes, and/or proximity sensors, among others. A human-machine interface 1008 may also be attached to the fieldbus 1030 to provide operators with local status and control for the PLC 1032. A modem 1016 may also be attached to the PLC 1032 to provide remote access to the PLC 1032.

The process controller 1040 in this example system 1000 also uses a fieldbus 1030 to communicate with actuators and sensors under its control, one or more of which may be intelligent electronic devices. The process controller 1040 may communicate with its fieldbus 1030 through an input/output (I/O) server 1042. An I/O server is a control component typically responsible for collecting, buffering, and/or providing access to process information from control subcomponents. An I/O server may be used for interfacing with third-party control components. Actuators and sensors under control of the process controller 1040 may include, for example, pressure regulators, pressure sensors, temperature sensors, servo valves, and/or solenoid valves, among others. The process controller 1040 may be connected to a modem 1016 so that a remote access 1050 site may access the process controller 1040. The remote access 1050 site may include a computer 1052 for use by an operator to monitor and control the process controller 1040. The computer 1052 may be connected to a local modem 1016 for dialing in to the modem 1016 connected to the process controller 1040.

The illustrated example system 1000 also includes a single loop controller 1044. In this example, the single loop controller 1044 interfaces with actuators 1034 and sensors 1036 with point-to-point connections, instead of a fieldbus. Point-to-point connections require a dedicated connection for each actuator 1034 and each sensor 1036. Fieldbus networks, in contrast, do not need point-to-point connections between a controller and individual field sensors and actuators. In some implementations, a fieldbus allows greater functionality beyond control, including field device diagnostics. A fieldbus can accomplish control algorithms within the fieldbus, thereby avoiding signal routing back to a PLC for every control operation. Standard industrial communication protocols are often used on control networks and fieldbus networks.

The single loop controller 1044 in this example is also connected to a modem 1016, for remote access to the single loop controller.

In addition to the supervisory level 1002 and field level 1004 control loops, the distributed control system 1000 may also include intermediate levels of control. For example, in the case of a distributed control system controlling a discrete part manufacturing facility, there could be an intermediate level supervisor for each cell within the plant. This intermediate level supervisor could encompass a manufacturing cell containing a machine controller that processes a part, and a robot controller that handles raw stock and final products. Additionally, the distributed control system could include several of these cells that manage field-level controllers under the main distributed control system supervisory control loop.

In various implementations, the distributed control system may include a corporate or enterprise layer, where an enterprise network 1080 may connect to the example production facility. The enterprise network 1080 may be, for example, located at a corporate office co-located with the facility, and connected to the control network 1018 in the supervisory level 1002. The enterprise network 1080 may provide engineers and managers with control and visibility into the facility. The enterprise network 1080 may further include Manufacturing Execution Systems (MES) 1092, control systems for managing and monitoring work-in-process on a factory floor. An MES can track manufacturing information in real time, receiving up-to-the-minute data from robots, machine monitors and employees. The enterprise network 1080 may also include Management Information Systems (MIS) 1094, software and hardware applications that implement, for example, decision support systems, resource and people management applications, project management, and database retrieval applications, as well as basic business functions such as order entry and accounting. The enterprise network 1080 may further include Enterprise Resource Planning (ERP) systems 1096, business process management software that allows an organization to use a system of integrated applications to manage the business and automate many back office functions related to technology, services, and human resources.

The enterprise network 1080 may further be connected to a WAN 1060. Through the WAN 1060, the enterprise network 1080 may connect to a distributed plant 1098, which may include control loops and supervisory functions similar to the illustrated facility, but which may be at a different geographic location. The WAN 1060 may also connect the enterprise network to the outside world 1090, that is, to the Internet and/or various private and public networks. In some cases, the WAN 1060 may itself include the Internet, so that the enterprise network 1080 accesses the distributed plant 1098 over the Internet.

As described above, SCADA systems and distributed control systems use Programmable Logic Controllers (PLCs) as the control components of an overall hierarchical system. PLCs can provide local management of processes through feedback control, as described above. In a SCADA implementation, a PLC can provide the same functionality as a Remote Terminal Unit. When used in a distributed control system, PLCs can be implemented as local controllers within a supervisory scheme. PLCs can have user-programmable memory for storing instructions, where the instructions implement specific functions such as I/O control, logic, timing, counting, proportional-integral-derivative (PID) control, communication, arithmetic, and data and file processing.

Figure 11:
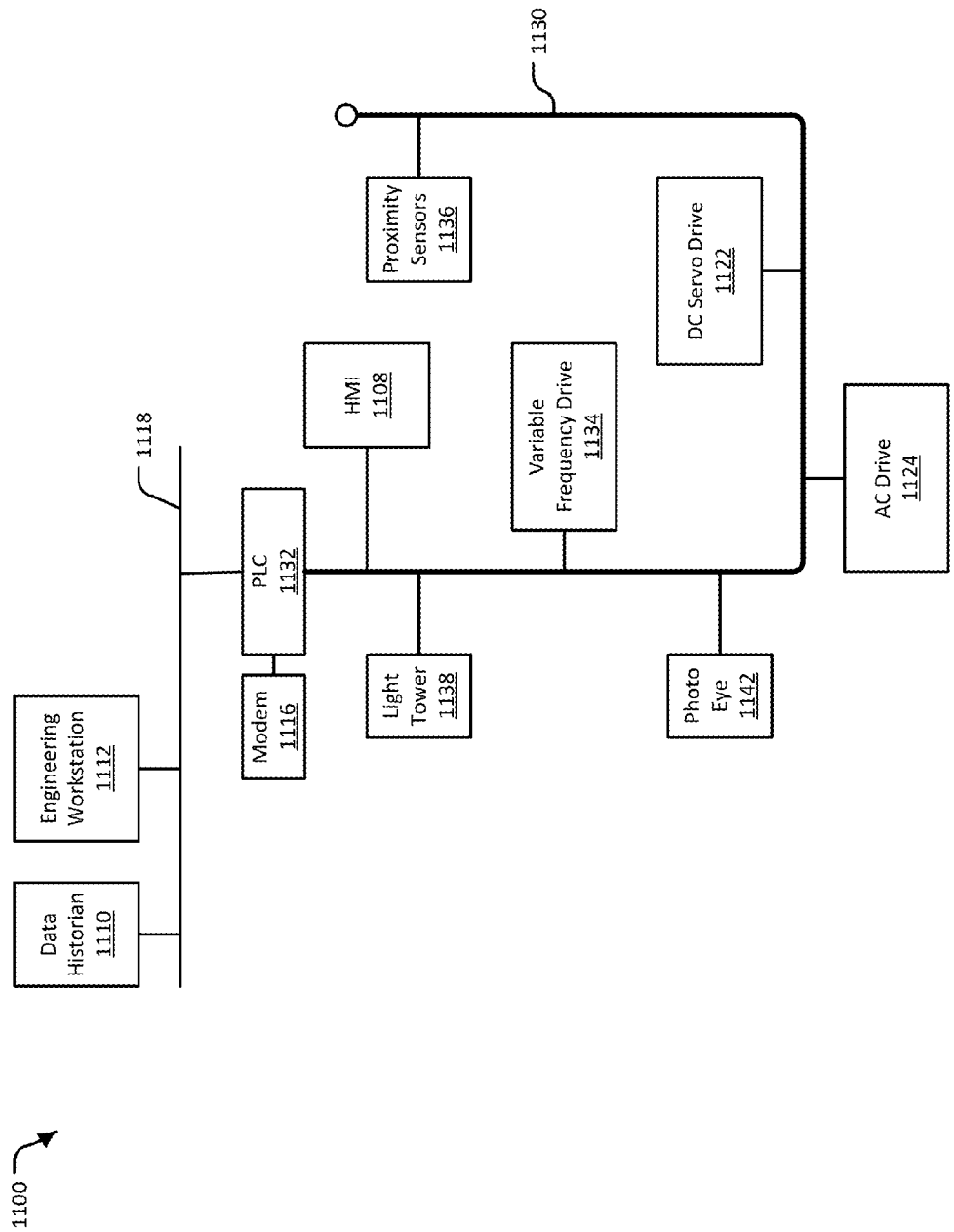
FIG. 11 illustrates an example of a PLC implemented in a manufacturing control process.

FIG. 11 illustrates an example of a PLC 1132 implemented in a manufacturing control process. The PLC 1132 in this example monitors and controls various devices over fieldbus network 1130. The PLC 1132 may be connected to a LAN 1118. An engineering workstation 1112 may also be connected to the LAN 1118, and may include a programming interface that provides access to the PLC 1132. A data historian 1110 on the LAN 1118 may store data produced by the PLC 1132.

The PLC 1132 in this example may control a number of devices attached to its fieldbus network 1130. These devices may include actuators, such as a DC servo drive 1122, an AC drive 1124, a variable frequency drive 1134, and/or a light tower 1138. The PLC 1132 may also monitor sensors connected to the fieldbus network 1130, such as proximity sensors 1136, and/or a photo eye 1142. A human-machine interface 1108 may also be connected to the fieldbus network 1130, and may provide local monitoring and control of the PLC 1132.

Most industrial control systems were developed years ago, long before public and private networks, desktop computing, or the Internet were a common part of business operations. These well-established industrial control systems were designed to meet performance, reliability, safety, and flexibility requirements. In most cases, they were physically isolated from outside networks and based on proprietary hardware, software, and communication protocols that included basic error detection and correction capabilities, but lacked secure communication capabilities. While there was concern for reliability, maintainability, and availability when addressing statistical performance and failure, the need for cyber security measures within these systems was not anticipated. At the time, security for industrial control systems mean physically securing access to the network and the consoles that controlled the systems.

Internet-based technologies have since become part of modern industrial control systems. Widely available, low-cost IP devices have replaced proprietary solutions, which increases the possibility of cyber security vulnerabilities and incidents. Industrial control systems have adopted Internet-based solutions to promote corporate connectivity and remote access capabilities, and are being designed and implemented using industry standard computers, operating systems (OS) and network protocols. As a result, these systems may to resemble computer networks. This integration supports new networking capabilities, but provides less isolation for industrial control systems from the outside world than predecessor systems. Networked industrial control systems may be exposed to similar threats as are seen in computer networks, and an increased likelihood that an industrial control system can be compromised.

Industrial control system vendors have begun to open up their proprietary protocols and publish their protocol specifications to enable third-party manufacturers to build compatible accessories. Organizations are also transitioning from proprietary systems to less expensive, standardized technologies such as Microsoft Windows and Unix-like operating systems as well as common networking protocols such as TCP/IP to reduce costs and improve performance. Another standard contributing to this evolution of open systems is Open Platform Communications (OPC), a protocol that enables interaction between control systems and PC-based application programs. The transition to using these open protocol standards provides economic and technical benefits, but also increases the susceptibility of industrial control systems to cyber incidents. These standardized protocols and technologies have commonly known vulnerabilities, which are susceptible to sophisticated and effective exploitation tools that are widely available and relatively easy to use.

Industrial control systems and corporate networking systems are often interconnected as a result of several changes in information management practices, operational, and business needs. The demand for remote access has encouraged many organizations to establish connections to the industrial control system that enable of industrial control systems engineers and support personnel to monitor and control the system from points outside the control network. Many organizations have also added connections between corporate networks and industrial control systems networks to allow the organization's decision makers to obtain access to critical data about the status of their operational systems and to send instructions for the manufacture or distribution of product.

In early implementations this might have been done with custom applications software or via an OPC server/gateway, but, in the past ten years this has been accomplished with TCP/IP networking and standardized IP applications like File Transfer Protocol (FTP) or Extensible Markup Language (XML) data exchanges. Often, these connections were implemented without a full understanding of the corresponding security risks. In addition, corporate networks are often connected to strategic partner networks and to the Internet. Control systems also make more use of WANs and the Internet to transmit data to their remote or local stations and individual devices. This integration of control system networks with public and corporate networks increases the accessibility of control system vulnerabilities. These vulnerabilities can expose all levels of the industrial control system network architecture to complexity-induced error, adversaries and a variety of cyber threats, including worms and other malware.

Many industrial control system vendors have delivered systems with dial-up modems that provide remote access to ease the burdens of maintenance for the technical field support personnel. Remote access can be accomplished, for example, using a telephone number, and sometimes an access control credential (e.g., valid ID, and/or a password). Remote access may provide support staff with administrative-level access to a system. Adversaries with war dialers— simple personal computer programs that dial consecutive phone numbers looking for modems—and password cracking software could gain access to systems through these remote access capabilities. Passwords used for remote access are often common to all implementations of a particular vendor's systems and may have not been changed by the end user. These types of connections can leave a system highly vulnerable because people entering systems through vendor-installed modems are may be granted high levels of system access.

Organizations often inadvertently leave access links such as dial-up modems open for remote diagnostics, maintenance, and monitoring. Also, control systems increasingly utilize wireless communications systems, which can be vulnerable. Access links not protected with authentication and/or encryption have the increased risk of adversaries using these unsecured connections to access remotely controlled systems. This could lead to an adversary compromising the integrity of the data in transit as well as the availability of the system, both of which can result in an impact to public and plant safety. Data encryption may be a solution, but may not be the appropriate solution in all cases.

Many of the interconnections between corporate networks and industrial control systems require the integration of systems with different communications standards. The result is often an infrastructure that is engineered to move data successfully between two unique systems. Because of the complexity of integrating disparate systems, control engineers often fail to address the added burden of accounting for security risks. Control engineers may have little training in security and often network security personnel are not involved in security design. As a result, access controls designed to protect control systems from unauthorized access through corporate networks may be minimal. Protocols, such as TCP/IP and others have characteristics that often go unchecked, and this may counter any security that can be done at the network or the application levels.

Public information regarding industrial control system design, maintenance, interconnection, and communication may be readily available over the Internet to support competition in product choices as well as to enable the use of open standards. Industrial control system vendors also sell toolkits to help develop software that implements the various standards used in industrial control system environments. There are also many former employees, vendors, contractors, and other end users of the same industrial control system equipment worldwide who have inside knowledge about the operation of control systems and processes.

Information and resources are available to potential adversaries and intruders of all calibers around the world. With the available information, it is quite possible for an individual with very little knowledge of control systems to gain unauthorized access to a control system with the use of automated attack and data mining tools and a factory-set default password. Many times, these default passwords are never changed.

IV. Adversary Trajectory

In various implementations, the systems and methods discussed above can be used for detecting and tracking a trajectory of an adversary. By tracking the trajectory of an adversary, a system can locate weaknesses in machines on a network, even machines that an adversary did not trigger an alarm. In particular, an attack trajectory can identify a path that an adversary took through a network. For example, the attack trajectory can reveal that an adversary accessed another machine prior to the network determining that the adversary was in fact attacking the network.

In some examples, a method includes receiving machine information for machines associated with a network. The machine information can include information that identifies a particular machine. The method can further include receiving interaction information associated with the machines. The interaction information can include information associated with interactions between the machines. The method can further include determining the interactions between the machines. Determining the interactions can include analyzing the interaction information and the machine information. The method can further include generating an adjacency data structure using the interactions. Generating the adjacency data structure can include correlating the interactions. Correlating the interactions can include associating a machine of the machines with one or more other machines that are determined to be an interaction with the machine.

In some examples, the method further includes receiving new interaction information associated with the machines. The new interaction information can include information associated with new interactions between the machines. In some examples, the new interactions occur after the interaction information is received. The method can further include determining one or more new interactions between the machines. Determining the one or more new interactions can include analyzing the new interaction information and the machine information. The method can further include updating the adjacency data structure. The updated adjacency data structure can incorporate the one or more new interactions.

In some examples, the method further includes deploying a deception mechanism in the network. In some examples, the deception mechanism can be added to the network to attract an attacker of the network. In such examples, the deception mechanism can emulate a service on a port of the deception mechanism. The method can further include receiving a request for an interaction by a machine associated with the network. In some examples, the request is received at a port of the deception mechanism. The method can further include receiving deception mechanism interaction information. The deception mechanism interaction information can include machine information associated with the machine and information associated with the interaction between the machine and the deception mechanism. The method can further include identifying the machine in the adjacency data structure. The method can further include generating an attack trajectory data structure. The attack trajectory data structure can be generated by determining one or more machines that are connected, either directly or indirectly, with the machine in the adjacency data structure. The method can further include determining an attack trajectory path in the attack trajectory data structure. The attack trajectory path can include a path using the attack trajectory data structure from the machine to the one or more machines.

In some examples, the method further includes generating an attack graph. The attack graph can be a visual representation of the attack trajectory data structure. Each node of the attack graph can be associated with a machine of the plurality of machines. Each edge of the attack graph can be an interaction between two machines of the plurality of machines. The method can further include highlighting the trajectory path on the attack graph. In some examples, the method further includes computing a probability that a portion of the attack trajectory path on the attack graph is an adversary. Computing the probability can include using network flow information and authentication logs.

While the disclosure below may describe machines, it should be recognized that a machine can be any type of system or device (e.g., a laptop, a desktop, a mobile phone, a printer, a database, network-connected machinery, network device, network-connected thermostat, television, a sensor, an actuator, a modem, or the like).

FIGS. 12A-12F illustrate examples of interactions of machines in a network. The interactions can be determined by analyzing interaction information and machine information.

The interaction information can include a time stamp of an interaction, a source Internet Protocol (IP) address, a source MAC address, a source host name, a user, a destination IP address, a destination MAC address, a destination host name, an action, a protocol type that was used for an interaction (e.g., Secure Shell, Telnet, etc.), a number of packets sent, or the like. In one example, the action can include whether the interaction was a success or a failure. A machine can include authentication logs. Authentication logs can report a time of a login attempt, a type of protocol used for a login attempt, a username used for a login attempt, a password used for a login attempt, and any other information associated with logging in and out of a machine.

The machine information can include information associated with a machine. Examples of machine information include a category of the machine, a city in which the machine is located, a country in which the machine is located, a domain name system (DNS) for the machine, an IP address of the machine, a latitude in which the machine is located, a longitude in which the machine is located, a media access control (MAC) address of the machine, a windows machine name of the machine (e.g., nt_host), a name of the user who owns or uses the machine, a Peripheral Component Interconnect (PCI) domain of the machine, or the like. Examples of a category of a machine can include a domain controller, an active directory, a server machine, an end-user machine, or the like. The machine information for a machine can also include authentication logs.

One or more servers (e.g., a deception control center to implement one or more techniques described herein) can be in communication with one or more machines on the network. In other examples, the deception control center can be a machine that is in communication with the one or more machines on the network. The deception control center can perform one or more of the techniques described herein. In some examples, the deception control center can coordinate other servers or machines to perform one or more of the techniques described herein.

The deception control center can receive, directly or indirectly, the machine information from a machine log forwarder associated with each machine. In particular, a machine log forwarder associated with a machine can send machine information associated with the machine from the machine. The machine log forwarder can send the machine information to the deception control center directly. In other examples, the machine log forwarder can send the machine information to a security information and event management (SIEM) system or a centralized database. In such examples, the deception control center can communicate with the SIEM or the centralized database to receive the machine information.

The machine information can be used to identify a particular machine in an adjacency data structure. For example, the host names can be used to identify each machine. In FIGS. 12A-12F, the host names of the machines are $M_x$, x being a real number. For illustration purposes, a machine is represented as a circle. For example, machine $M_1$ 1210 can be the laptop computer 426. In addition, an interaction between two machines can be represented as a line between the two machines. For example, an interaction can include the laptop computer 426 logging into a desktop computer 424. For another example, an interaction can be the laptop computer 426 sending a message to the desktop computer 424.

Figure 12A:
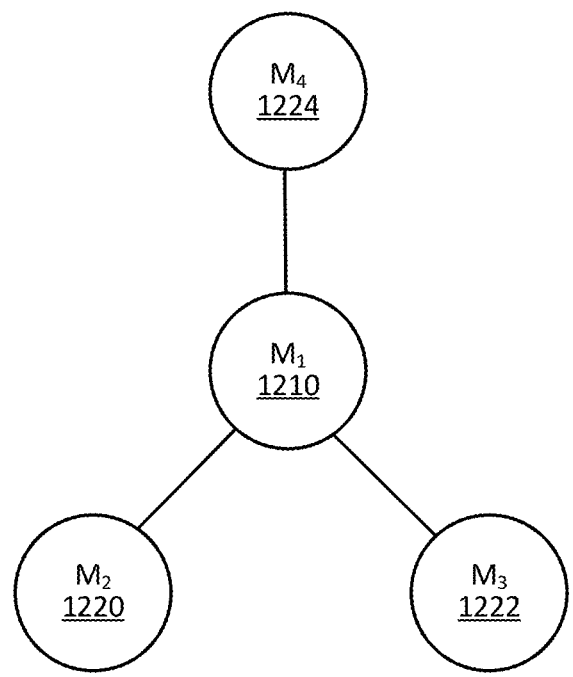
FIG. 12A illustrates an example of interactions for a machine in a network.

FIG. 12A illustrates an example of interactions for $M_1$ 1210. The interactions include an interaction between $M_1$ 1210 and each of $M_2$ 1220, $M_3$ 1222, and $M_4$ 1224. In one illustrative example, the interaction between $M_1$ 1210 and $M_2$ 1220 occurred at 9:40 AM and included an email exchange from $M_1$ 1210 to $M_2$ 1220 using Simple Mail Transfer Protocol (SMTP). In another example, the interaction between $M_1$ 1210 and $M_3$ 1222 occurred at 9:45 AM and included a successful login attempt from $M_1$ 1210 to $M_2$ 1220 using Secure Shell (SSH). The authentication logs associated with $M_2$ 1220 can include information associated with the successful login attempt. In another example, the interaction between $M_1$ 1210 and $M_3$ 1224 occurred at 9:50 AM and included a file transfer from $M_1$ 1210 to $M_3$ 1224 using File Transfer Protocol (FTP).

Figure 12B:
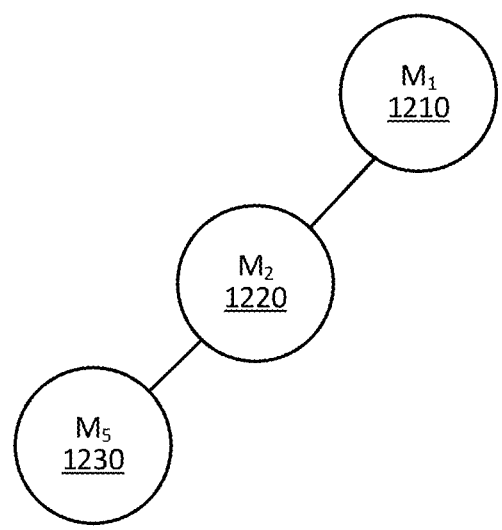
FIG. 12B illustrates another example of interactions for a machine in a network.

FIG. 12B illustrates an example of interactions for $M_2$ 1220. The interactions include an interaction between $M_2$ 1220 and each of $M_1$ 1210 and $M_5$ 1230. Because the interaction between $M_1$ 1210 and $M_2$ 1220 is the same interaction as above but shown with respect to $M_2$ 1220, the adjacency data structure can forgo including the same interaction. In one illustrative example, the interaction between $M_2$ 1220 and $M_5$ 1230 occurred at 9:35 AM and included an email exchange from $M_2$ 1220 to $M_5$ 1230 using SMTP.

Figure 12C:
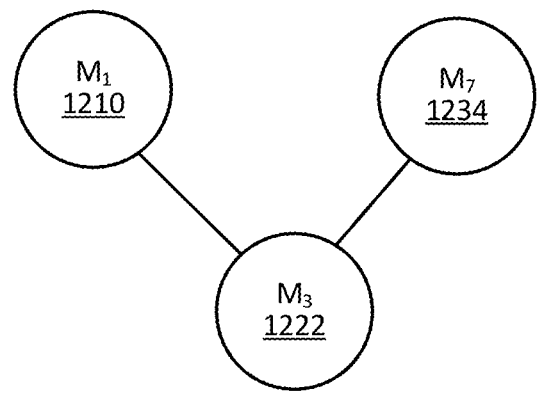
FIG. 12C illustrates another example of interactions for a machine in a network.

FIG. 12C illustrates an example of interactions for $M_3$ 1222. The interactions include an interaction between $M_3$ 1222 and each of $M_1$ 1210, $M_6$ 1232, and $M_7$ 1234. Because the interaction between $M_1$ 1210 and $M_7$ 1234 is the same interaction as above but shown with respect to $M_3$ 1222, the adjacency data structure can forgo including the same interaction. In one illustrative example, the interaction between $M_3$ 1222 and $M_6$ 1232 occurred at 9:30 AM and included a file transfer from $M_3$ 1222 to $M_6$ 1232 using Secure Copy (SCP). In another example, the interaction between $M_3$ 1222 and $M_7$ 1234 occurred at 9:35 AM and included a successful login attempt to $M_7$ 1234 using SSH. The authentication logs associated $M_7$ 1234 can include information associated with the successful login attempt.

Figure 12D:
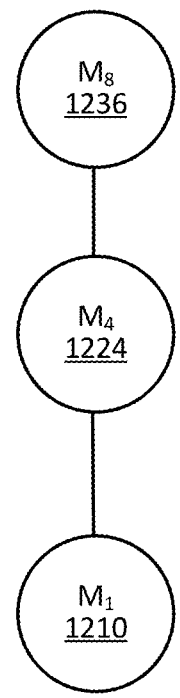
FIG. 12D illustrates another example of interactions for a machine in a network.

FIG. 12D illustrates an example of interactions for $M_4$ 1224. The interactions include an interaction between $M_4$ 1224 and each of $M_1$ 1210 and $M_8$ 1236. Because the interaction between $M_1$ 1210 and $M_4$ 1224 is the same interaction as above but shown with respect to $M_4$ 1224, the adjacency data structure can forgo including the same interaction. In one illustrative example, the interaction between $M_4$ 1224 and $M_8$ 1236 occurred at 9:40 AM and included connecting $M_4$ 1224 to $M_8$ 1236 using hypertext transfer protocol (HTTP).

Figure 12E:
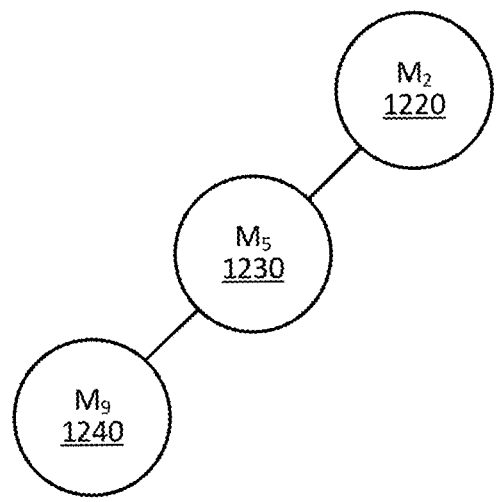
FIG. 12E illustrates another example of interactions for a machine in a network.

FIG. 12E illustrates an example of interactions for $M_5$ 1230. The interactions include an interaction between $M_5$ 1230 and each of $M_2$ 1220 and $M_9$ 1240. Because the interaction between $M_2$ 1220 and $M_5$ 1230 is the same interaction as above but shown with respect to $M_5$ 1230, the adjacency data structure can forgo including the same interaction. In one illustrative example, the interaction between $M_5$ 1230 and $M_9$ 1290 occurred at 9:30 AM and included an email exchange from $M_5$ 1230 to $M_9$ 1290 using SMTP.

Figure 12F:
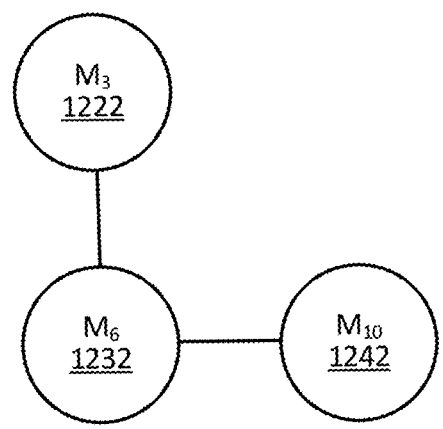
FIG. 12F illustrates another example of interactions for a machine in a network.

FIG. 12F illustrates an example of interactions for $M_6$ 1232. The interactions include an interaction between $M_6$ 1232 and each of $M_3$ 1222 and $M_{10}$ 1242. Because the interaction between $M_3$ 1222 and $M_6$ 1232 is the same interaction as above but shown with respect to $M_6$ 1232, the adjacency data structure can forgo including the same interaction. In one illustrative example, the interaction between $M_6$ 1232 and $M_{10}$ 1242 occurred at 9:25 AM and included a file transfer from $M_6$ 1232 to $M_{10}$ 1242 using SCP.

Figure 12G:
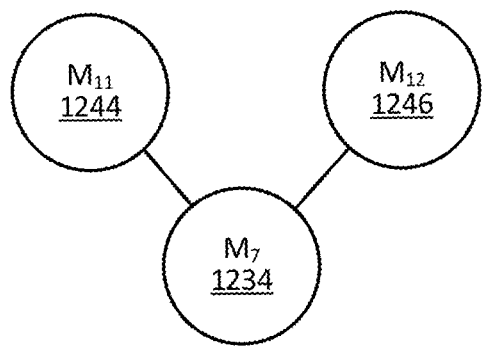
FIG. 12G illustrates another example of interactions for a machine in a network.

FIG. 12G illustrates an example of interactions for $M_7$ 1234. The interactions include an interaction between $M_7$ 1234 and each of $M_3$ 1222, $M_{11}$ 1244, and $M_{12}$ 1246. Because the interaction between $M_3$ 1222 and $M_7$ 1234 is the same interaction as above but shown with respect to $M_7$ 1234, the adjacency data structure can forgo including the same interaction. In one illustrative example, the interaction between $M_7$ 1234 and $M_{11}$ 1244 occurred at 9:10 AM and included a file transfer from $M_7$ 1234 to $M_{11}$ 1244 using SCP. In another example, the interaction between $M_7$ 1234 and $M_{12}$ 1246 occurred at 9:10 AM and included a successful login attempt from $M_7$ 1234 to $M_{12}$ 1246 using SSH. The authentication logs associated with $M_{12}$ 1246 can include information associated with the successful login attempt.

Figure 12H:
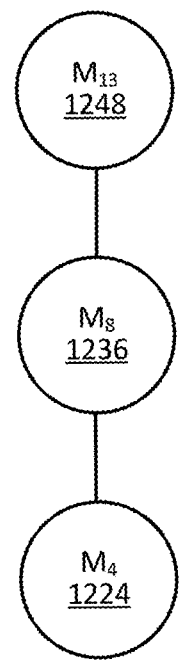
FIG. 12H illustrates another example of interactions for a machine in a network.

FIG. 12H illustrates an example of interactions for $M_8$ 1236. The interactions include an interaction between $M_8$ 1236 and each of $M_4$ 1224 and $M_{13}$ 1248. Because the interaction between $M_4$ 1224 and $M_8$ 1236 is the same interaction as above but shown with respect to $M_8$ 1236, the adjacency data structure can forgo including the same interaction. In one illustrative example, the interaction between $M_8$ 1236 and $M_{13}$ 1248 occurred at 9:12 AM and included a file transfer from $M_8$ 1236 to $M_{13}$ 1248 using FTP.

Figure 13:
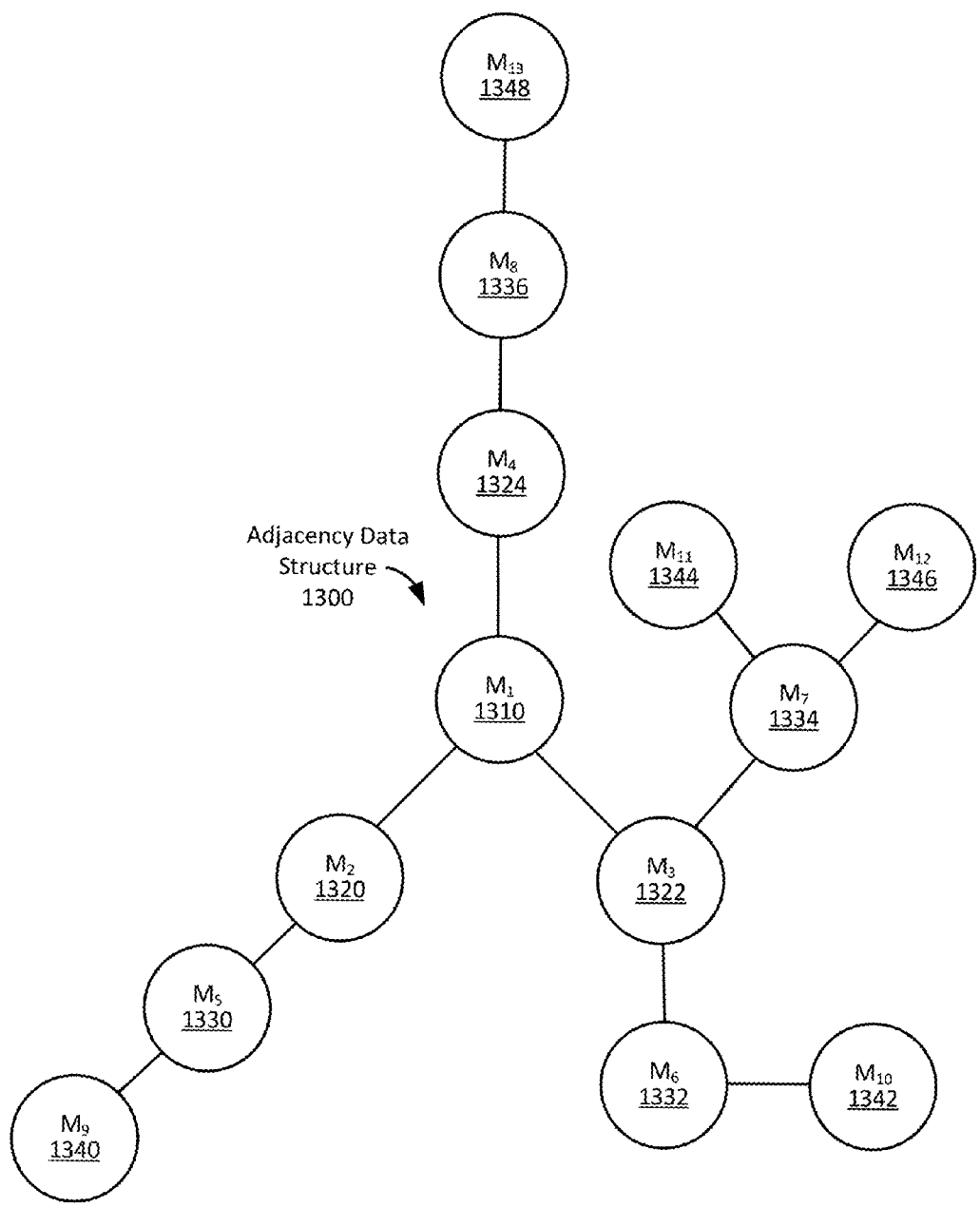
FIG. 13 illustrates an example of an adjacency data structure for a network.

FIG. 13 illustrates an example of an adjacency data structure 1300 for the interactions described above in FIGS. 12A-12H. In some examples, the adjacency data structure 1300 can be an adjacency list, an adjacency matrix, or the like. However, one of skilled in the art will recognize that the adjacency data structure 1300 can be any type of data structure that can organize interactions.

The adjacency data structure 1300 can be generated by correlating interactions (e.g., FIGS. 12A-12H). In some examples, correlating can include establishing a mutual relationship or connection between machines. Using FIGS. 12A-12H as an example, the adjacency data structure 1300, after correlating the interactions among the different machines, can be: $M_1 \rightarrow [M_2, M_3, M_4]$; $M_2 \rightarrow [M_5]$; $M_5 \rightarrow [M_9]$; $M_3 \rightarrow [M_6, M_7]$; $M_6 \rightarrow [M_{10}]$; $M_7 \rightarrow [M_{11}, M_{12}]$; $M_4 \rightarrow [M_8]$; $M_8 \rightarrow [M_{13}]$. The adjacency data structure 1300 includes interactions from a source to a destination. The interactions from a viewpoint of the destination to the source are omitted. In other examples, the adjacency data structure can include all interactions. In such examples, both $M_1 \rightarrow [M_2]$ and $M_2 \rightarrow [M_1]$ may be included as well as the other destination to source interactions.

Because the number of interactions in a network can become large as time increases, an adjacency data structure can limit the amount of network flow information from a network that is maintained. In some examples, the limit is based on a time frame. The time frame can be the amount of time before the current time. Examples of time frames include one hour, one day, and one week. The adjacency data structure can then include all interactions in the time frame.

In other examples, the limit is a number of machine interactions. The limit can be implemented on a machine. For example, a machine can only store a particular number of limitations between the machine and another machine.

In other examples, the limit is one or more types of protocols. For example, the adjacency data structure may maintain only interactions that are SSH. In other examples, the adjacency data structure can maintain interactions of a type of protocol and also interactions of other types of protocols that are similar to the type of protocol. For example, if the adjacency data structure is maintaining interactions that use SSH, the adjacency data structure can also maintain interactions that use Telnet. In other examples, the adjacency data structure can maintain interactions of a type of protocol and machines that include an interaction of the type of protocol. For example, if a machine used SSH for one interaction and HTTP for another interaction, both interactions can be maintained in the adjacency data structure because of the common SSH use from the machine. In some examples, the limit can be based on any combination of the factors mentioned above, such as limiting the interactions based on any combination of time frame, number of interactions, and type of protocol.

Figure 14:
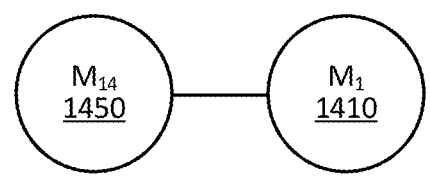
FIG. 14 illustrates an example of a new interaction with a machine in a network.

FIG. 14 illustrates an example of a new interaction with $M_1$ 1410. The new interaction can occur after the interaction information used to generate the adjacency data structure is received. In such a case, new interaction information may be received. In some examples, the adjacency data structure can be updated when new interactions occur on the network. In other examples, the adjacency data structure can be updated based on a schedule that incorporates the typical amount of interactions at particular times. Optionally, the adjacency data structure can switch between the two methods of updating during operation. In addition, the adjacency data structure can update in real time when the adjacency data structure is in use.

Figure 15:
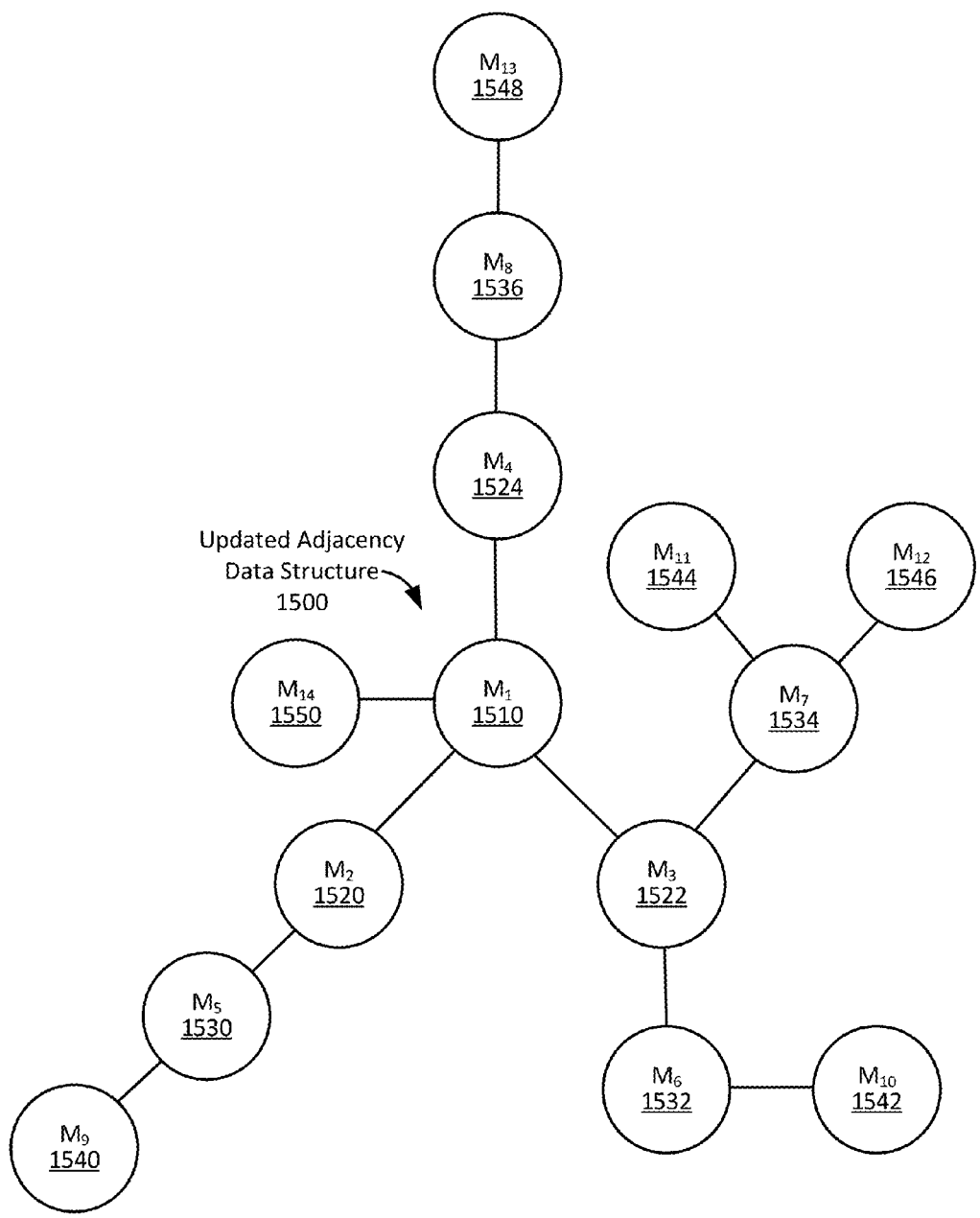
FIG. 15 illustrates an example of an updated adjacency data structure for a network.

FIG. 15 illustrates an example of an updated adjacency data structure 1500 for the network. The updated adjacency data structure 1500 includes the interactions in the adjacency data structure 1300 with the new interaction between $M_1$ 1510 and $M_{14}$ 1550 added. The addition signifies that there was an interaction between $M_1$ 1510 and $M_{14}$ 1550 after the adjacency data structure was generated. The new interaction was incorporated into the adjacency data structure 1300 to generate the updated adjacency data structure 1500. For example, the updated adjacency data structure can include: $M_1 \rightarrow [M_2, M_3, M_4, M_{10}]$; $M_2 \rightarrow [M_5]$; $M_5 \rightarrow [M_9]$; $M_3 \rightarrow [M_6, M_7]$; $M_6 \rightarrow [M_{10}]$; $M_7 \rightarrow [M_{11}, M_{12}]$, $M_4 \rightarrow [M_8]$; $M_8 \rightarrow [M_{13}]$.

Figure 16:
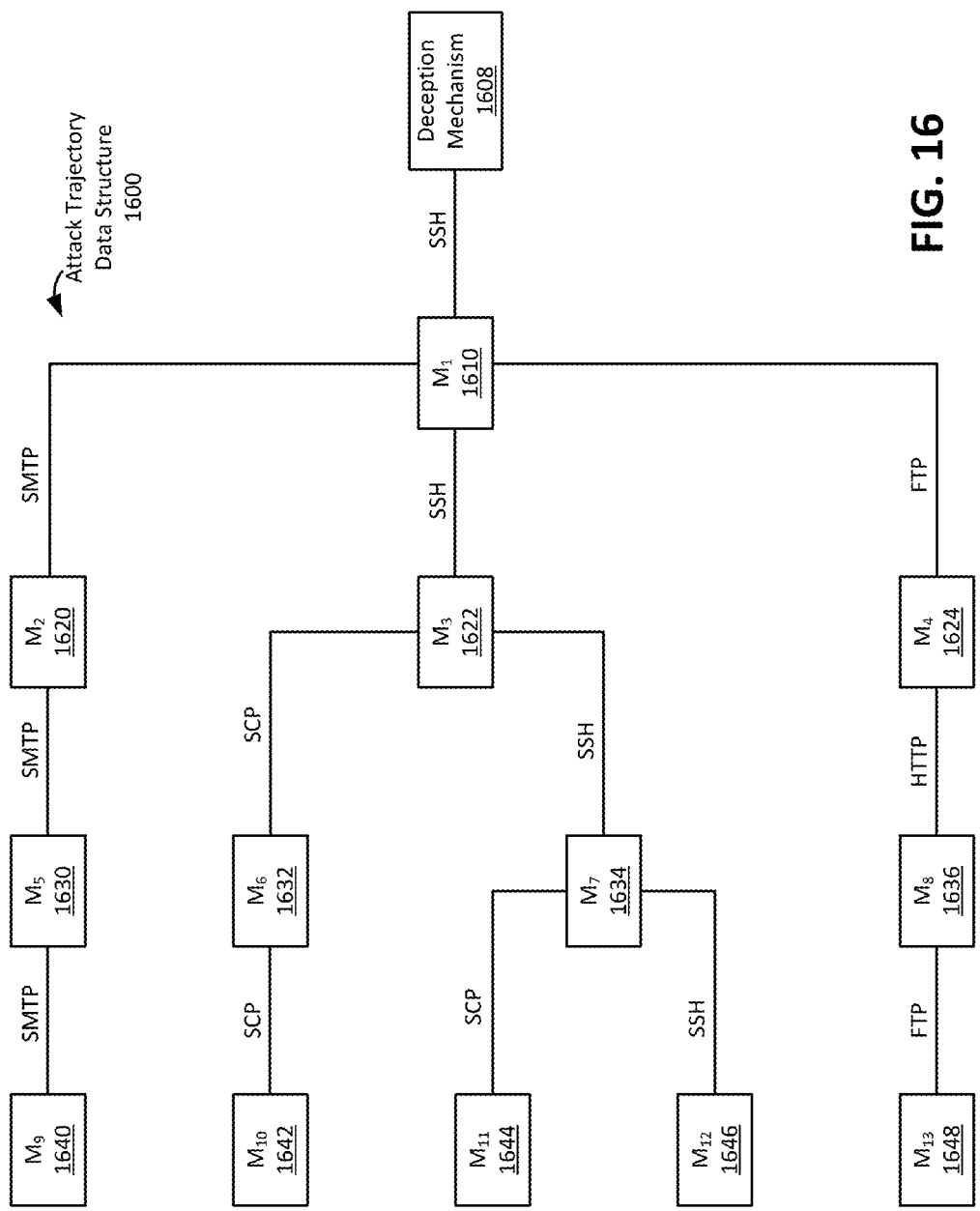
FIG. 16 illustrates an example of an attack trajectory data structure for a network.

FIG. 16 illustrates an example of an attack trajectory data structure 1600 for the network. The attack trajectory data structure 1600 can be generated using an adjacency data structure (e.g., adjacency data structure 1300) and deception mechanism interaction information.

In such an example, the network can include a deception mechanism 1608, as previously discussed. The deception mechanism 1608 can be deployed on an unused IP address. Because the deception mechanism 1608 is deployed on the unused IP address, normal network traffic may not attempt to access the deception mechanism 1608. The deception mechanism 1608 can emulate a service on a port to lure adversaries to interact with the port. An adversary can be any person, machine, program, or other entity that attacks or attempts to attack a machine or system on a network. In some examples, an adversary can be an individual that is logging into a machine. In some examples, an adversary can be malware. By interacting with the deception mechanism 1608, an interaction by a machine can be identified as being associated with an adversary or attacker because the deception mechanism 1608 may not be accessed otherwise.

In addition, deception mechanism interaction information can be received regarding the interaction with the deception mechanism 1608. The deception mechanism interaction information can be used to determine the trajectory of the adversary. The deception mechanism interaction information can include machine information, as discussed before, of the machine that interacted with the deception mechanism 1608 and interaction information. Interaction information can, among other things, include a network protocol type. Other information can include information that is gathered based on the network protocol type. For example, if the network protocol type is SSH, the deception mechanism interaction information can include a username, a password, and/or number of failed attempts.

The adjacency data structure 1300 can be used to generate the attack trajectory data structure 1600 by beginning either from the machine (e.g., $M_1$ 1610) that interacts with the deception mechanism 1608 or from the deception mechanism 1608. In particular, once the deception mechanism 1608 is interacted with by the machine, the attack trajectory data structure 1600 can be generated on a deception control center by stepping through the adjacency data structure 1300 from $M_1$ 1310 to determine the possible trajectories of the adversary. For example, the attack trajectory data structure 1600 can include the machines that interacted with $M_1$ 1610 and the interactions associated with $M_1$ 1610 that occurred before the interaction between $M_1$ 1610 and the deception mechanism 1608 (e.g., $M_2$ 1620, $M_3$ 1622, and $M_4$ 1624). This process can be repeated at each machine that is added to the attack trajectory data structure 1600 until there are no more applicable machines left in the adjacency data structure 1300. The result of this process can be the attack trajectory data structure 1600. The attack trajectory data structure 1600 can be generated by using a modified depth first search algorithm. The modified depth first search algorithm can analyze all of the machine interactions from each machine before stepping deeper into the adjacency data structure 1300. Other search algorithms can be used, including breadth first search and Monte Carlo tree search.

The deception control center can determine an attack trajectory path using an attack trajectory data structure. In some examples, the attack trajectory path can be determined based on interaction information between a machine and a deception mechanism. For example, the deception control center can determine one or more interactions in the attack trajectory data structure that are connected (directly or indirectly) to the deception mechanism and include one or more common elements to the interaction information between the machine and the deception mechanism. The one or more common elements can include a type of protocol, a common username, a number of login attempts, or a combination thereof.

In some examples, the attack trajectory path can be determined based on a user-specified machine. The user-specified machine can be a machine in the network that a user determines is an attacker. In such an example, the attack trajectory path can be determined from a deception mechanism to the user-specified machine. For example, a user can specify that the attacker accessed the system through an e-mail server. The attack trajectory path can then determine an attack trajectory path from a deception mechanism that was accessed by the attacker to the e-mail server. In such an example, the attack trajectory path can illustrate that the attacker accessed the e-mail server, one or more other machines, and the deception mechanism. By providing a user-specified machine, the attack trajectory path can isolate the attack trajectory paths that include the user-specified machined (e.g., an email server, a password database, a database with personal information, a DHCP server, or other user-specified machine).

In some examples, the attack trajectory path can be determined from a machine rather than the deception mechanism. For example, a user can specify a machine that is known to include a vulnerability or malware. The deception control center can determine an attack trajectory path from that machine as if the machine interacted with a deception mechanism.

Figure 17:
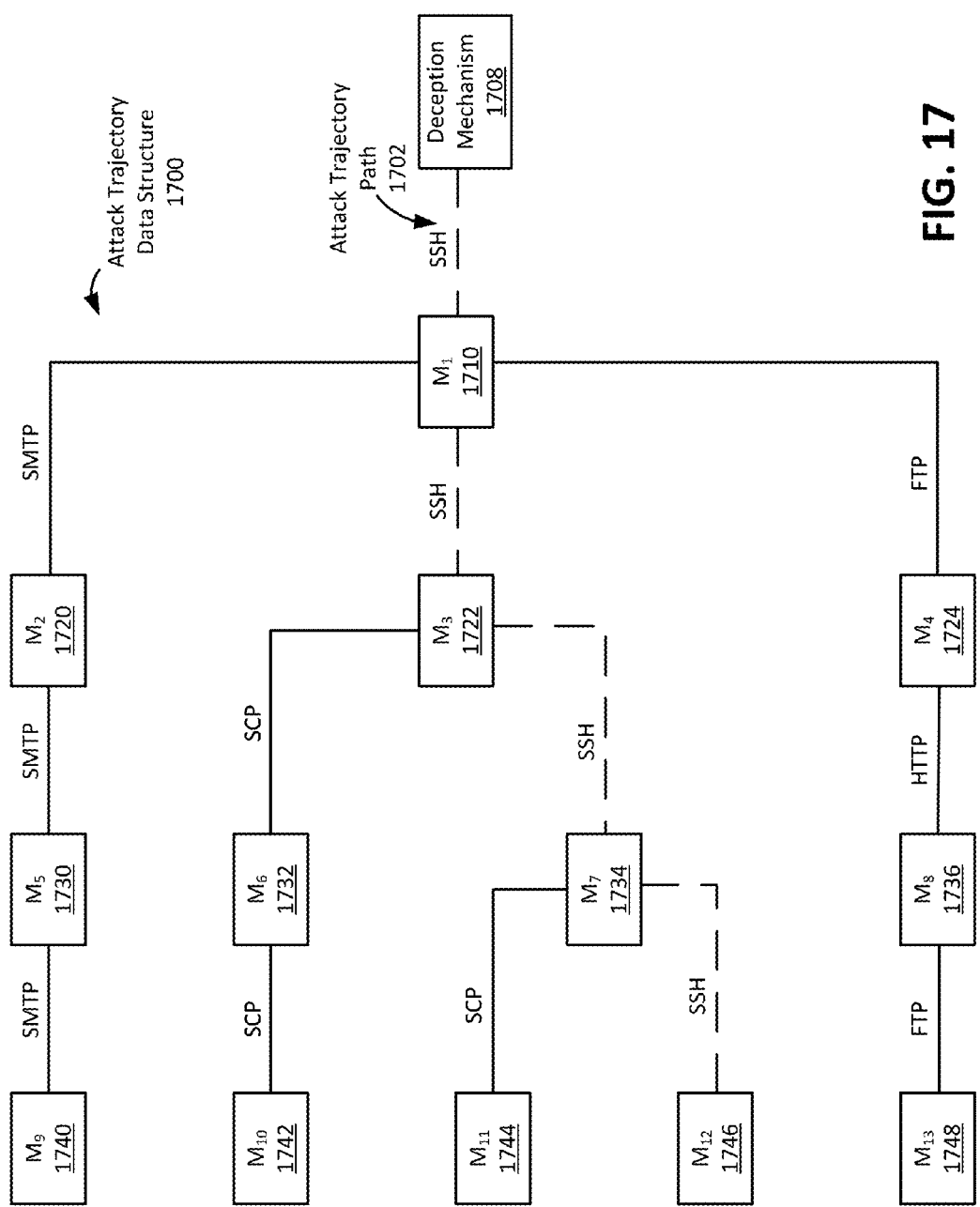
FIG. 17 illustrates an example of an attack trajectory path highlighted in an attack trajectory data structure for a network.

FIG. 17 illustrates an example of an attack trajectory path 1702 that is highlighted in the attack trajectory data structure 1700 for the network. The deception control center can use the attack trajectory data structure 1700 to determine the attack trajectory path 1702. For example, the deception control center can search the attack trajectory data structure 1700 for a path that uses a particular protocol. In one illustrative example, the protocol can include an SSH protocol. In such an example, SSH can be used as the protocol because the interaction between $M_1$ 1710 and the deception mechanism 1708 used SSH, indicating that the adversary used the SSH protocol. In such an example, the attack trajectory path 1702 can include $M_1$ 1710, $M_3$ 1722, $M_7$ 1734, and $M_{12}$ 1746 for the network, as shown in FIG. 17.

Figure 18:
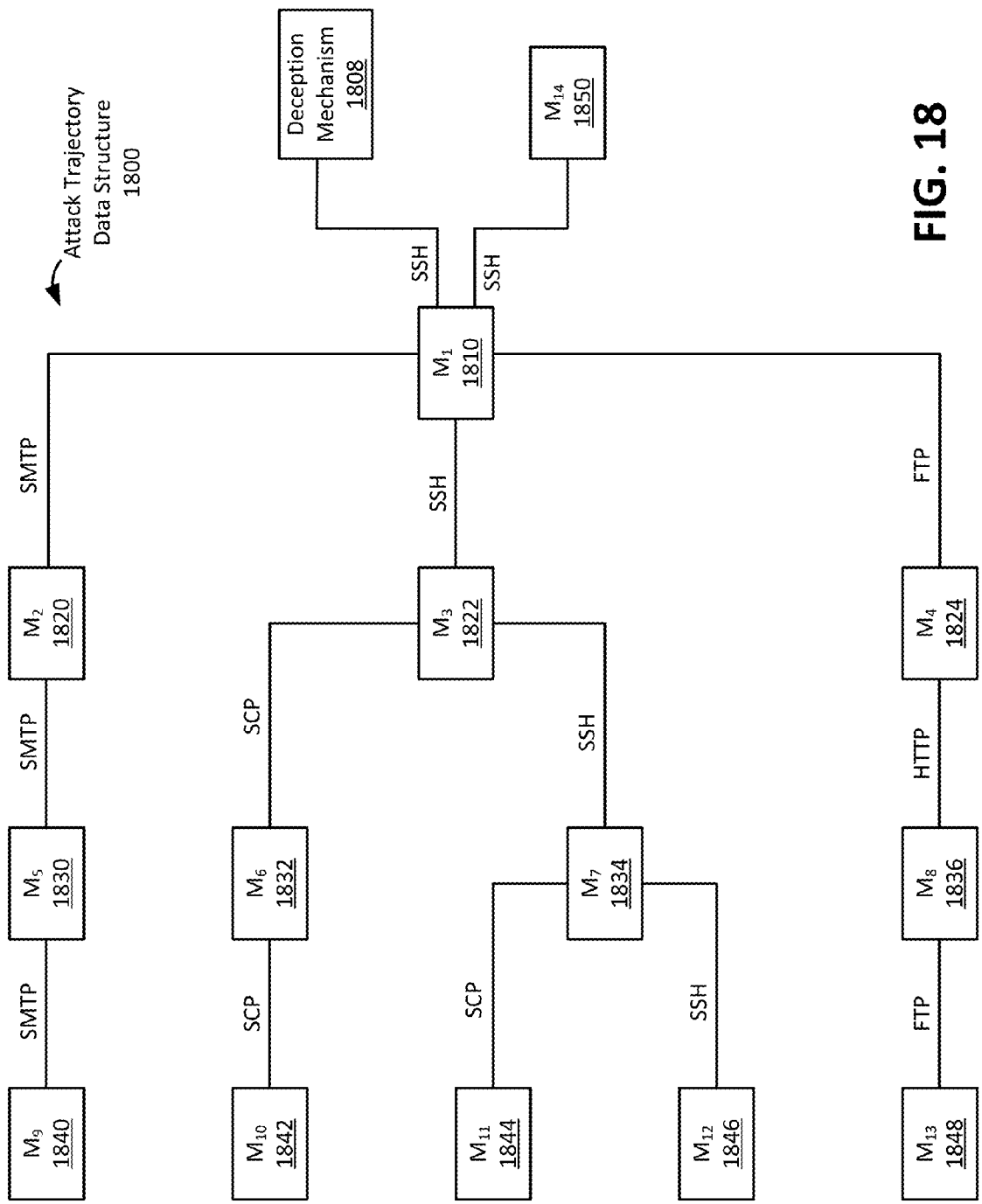
FIG. 18 illustrates another example of an attack trajectory data structure for a network.

FIG. 18 illustrates another example of an attack trajectory data structure 1800 for the network. The attack trajectory data structure 1800 can be generated using an adjacency data structure (e.g., updated adjacency data structure 1500) and deception mechanism interaction information.

In such an example, the network can include a deception mechanism 1808, as previously discussed. The deception mechanism 1808 can be deployed on an unused IP address of the network. Because the deception mechanism 1808 is deployed on the unused IP address, normal network traffic may not attempt to access the deception mechanism 1808. The deception mechanism 1808 can emulate a service on a port of the deception mechanism 1808 to lure adversaries to interact with the port. An adversary can be any person, machine, program, or other entity that attacks or attempts to attack a machine or system on a network. In some examples, an adversary can be an individual that is logging into a machine. In some examples, an adversary can be malware.

By interacting with the deception mechanism 1808, an interaction by a machine can be identified as being associated with an adversary or attacker because the deception mechanism 1808 may not be accessed otherwise.

In addition, deception mechanism interaction information can be received regarding the interaction with the deception mechanism 1808. The deception mechanism interaction information can be used to determine the trajectory of the adversary. The deception mechanism interaction information can include machine information, as discussed above, of the machine that interacted with the deception mechanism 1808 and interaction information. Interaction information can, among other things, include a network protocol type. Other information can include information that is gathered based on the network protocol type. For example, if the network protocol type is SSH, the deception mechanism interaction information can include a username, a password, and/or number of failed attempts.

The updated adjacency data structure 1500 can be used to generate the attack trajectory data structure 1800 by beginning either from the machine (e.g., $M_1$ 1810) that interacts with the deception mechanism 1808 or from the deception mechanism 1808. In particular, once the deception mechanism 1808 is interacted with by the machine, the attack trajectory data structure 1800 can be generated on a deception control center by stepping through the adjacency data structure 1500 from $M_1$ 1510 to determine the possible trajectories of the adversary. For example, the attack trajectory data structure 1800 can include the machines that interacted with $M_1$ 1810 and the interactions associated with $M_1$ 1810 that occurred before or after the interaction between $M_1$ 1810 and the deception mechanism 1808 (e.g., $M_2$ 1820, $M_3$ 1822, $M_4$ 1824 and $M_{14}$ 1850). This process can be repeated at each machine that is added to the attack trajectory data structure 1800 until there are no more applicable machines left in the adjacency data structure 1500. The result of this process can be the attack trajectory data structure 1800. The attack trajectory data structure 1800 can be generated by using a modified depth first search algorithm. The modified depth first search algorithm can analyze all of the machine interactions from each machine before stepping deeper into the adjacency data structure 1500. Other search algorithms can be used, including breadth first search and Monte Carlo tree search, or the like.

The deception control center can determine an attack trajectory path using an attack trajectory data structure. In some examples, the attack trajectory path can be determined based on interaction information between a machine and a deception mechanism. For example, the deception control center can determine one or more interactions in the attack trajectory data structure that are connected (directly or indirectly) to the deception mechanism and include one or more common elements to the interaction information between the machine and the deception mechanism. The one or more common elements can include a type of protocol, a common username, a number of login attempts, or a combination thereof.

In some examples, the attack trajectory path can be determined based on a user-specified machine. The user-specified machine can be a machine in the network that a user determines is an attacker. In such an example, the attack trajectory path can be determined from a deception mechanism to the user-specified machine. For example, a user can specify that the attacker accessed the system through an e-mail server. The attack trajectory path can then determine an attack trajectory path from a deception mechanism that was accessed by the attacker to the e-mail server. In such an example, the attack trajectory path can illustrate that the attacker accessed the e-mail server, one or more other machines, and the deception mechanism. By providing a user-specified machine, the attack trajectory path can isolate the attack trajectory paths that include the user-specified machined (e.g., an email server, a password database, a database with personal information, a DHCP server, or other user-specified machine).

In some examples, the attack trajectory path can be determined from a machine rather than the deception mechanism. For example, a user can specify a machine that is known to include a vulnerability or malware. The deception control center can determine an attack trajectory path from that machine as if the machine interacted with a deception mechanism.

While the description herein may describe a deception mechanism, it should be recognized that alerts can come from other security systems (e.g., firewall alerts, alerts from endpoint security products about unusual process alerts, unusual file system changes, or the like). In some examples, one or more alerts can be used to determine the attack trajectory path. For example, if a machine has an alert from a first security product (e.g., an intrusion defense system or an intrusion prevention system) and the machine is also interacting with a deception mechanism, the machine may receive higher weights for attack trajectory path computations.

Figure 19:
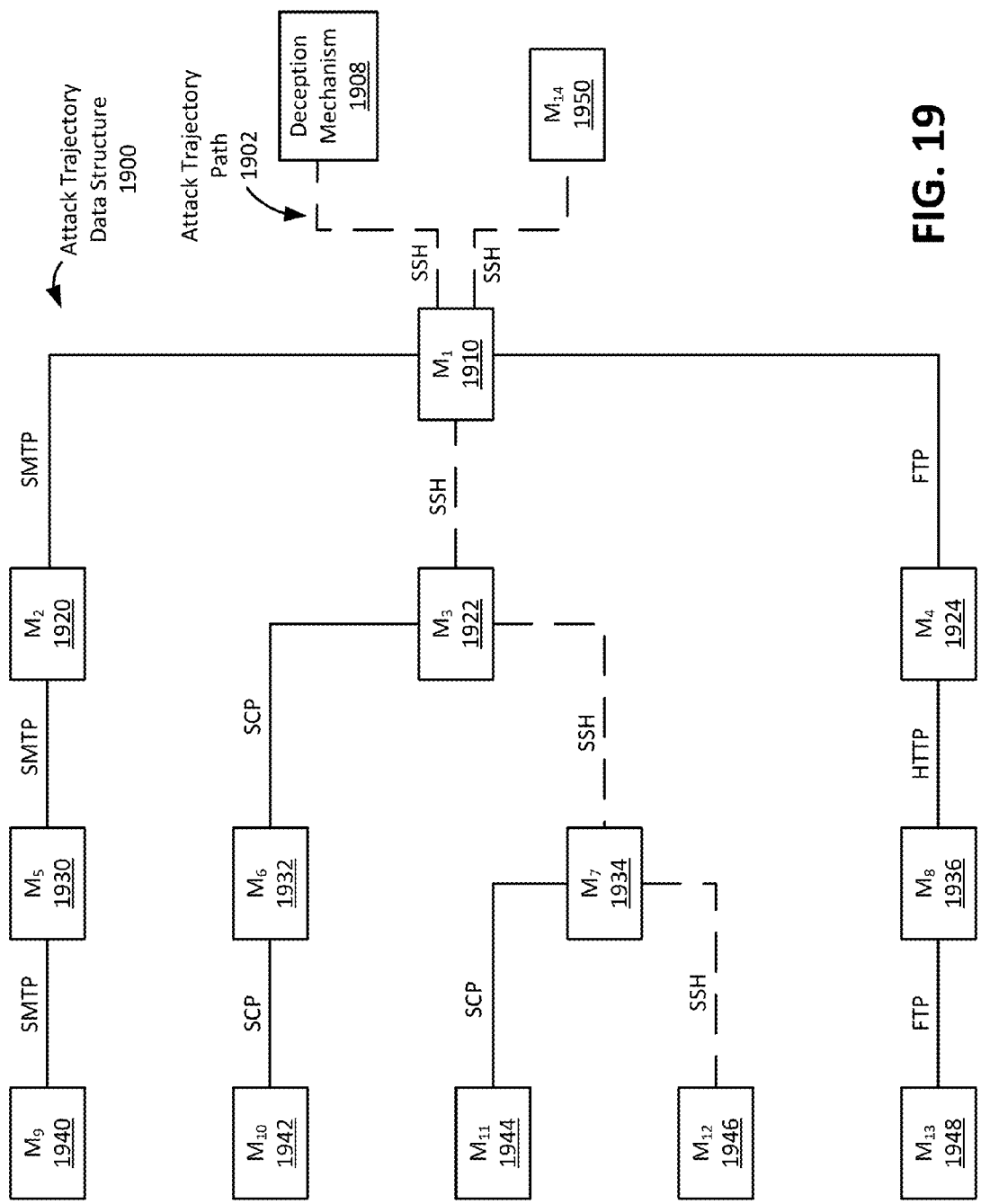
FIG. 19 illustrates another example of an attack trajectory path highlighted in an attack trajectory data structure for a network.

FIG. 19 illustrates another example of an attack trajectory path 1902 that is highlighted in the attack trajectory data structure 1900 for the network. The deception control center can use the attack trajectory data structure 1900 to determine the attack trajectory path 1902. For example, the deception control center can search the attack trajectory data structure 1900 for a path that uses a particular protocol. In one illustrative example, the protocol can include an SSH protocol. In such an example, SSH can be used as the protocol because the interaction between $M_1$ 1910 and the deception mechanism 1908 used SSH, indicating that the adversary used the SSH protocol. In such an example, the attack trajectory path 1702 can include $M_{14}$ 1910, $M_1$ 1910, $M_3$ 1922, $M_7$ 1934, and $M_{12}$ 1946 for the network, as shown in FIG. 19.

Figure 20:
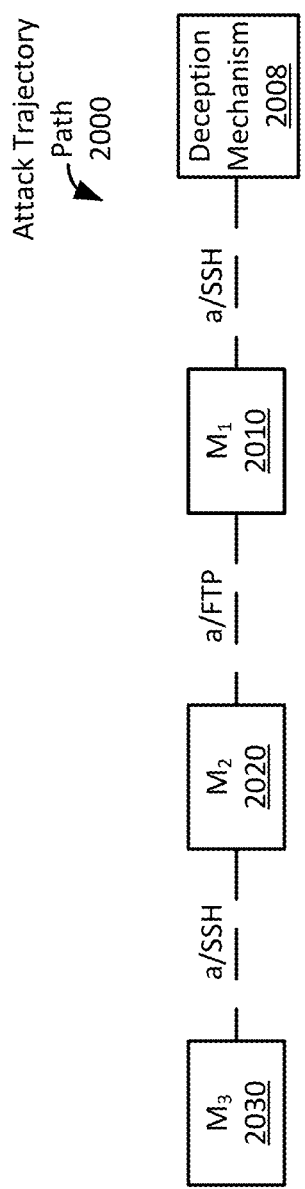
FIG. 20 illustrates another example of an attack trajectory path for a network.

FIG. 20 illustrates another example of an attack trajectory path 2000 for a network using username to determine a path of an adversary. The network can include a deception mechanism 2008, $M_1$ 2010, $M_2$ 2020, and $M_3$ 2030. In one illustrative example, a first interaction occurred between the deception mechanism 2008 and $M_1$ 2010 at 9:00 AM and included a successful login attempt from $M_1$ 2010 to the deception mechanism 2008 with a username "a" using SSH. In another example, a second interaction occurred between $M_1$ 2010 and $M_2$ 2020 at 8:50 AM and included a successful login attempt from $M_2$ 2020 to $M_1$ 2010 with the username "a" using FTP. In another example, a third interaction occurred between $M_2$ 2020 and $M_3$ 2030 at 8:40 AM and included a successful login attempt from $M_3$ 2030 to $M_2$ 2020 with the username "a" using SSH. If the attack trajectory path 2000 is using a common username to determine the path of the adversary, the attack trajectory path 2000 can include $M_1$ 2010, $M_2$ 2020, and $M_3$ 2030.

Figure 21:
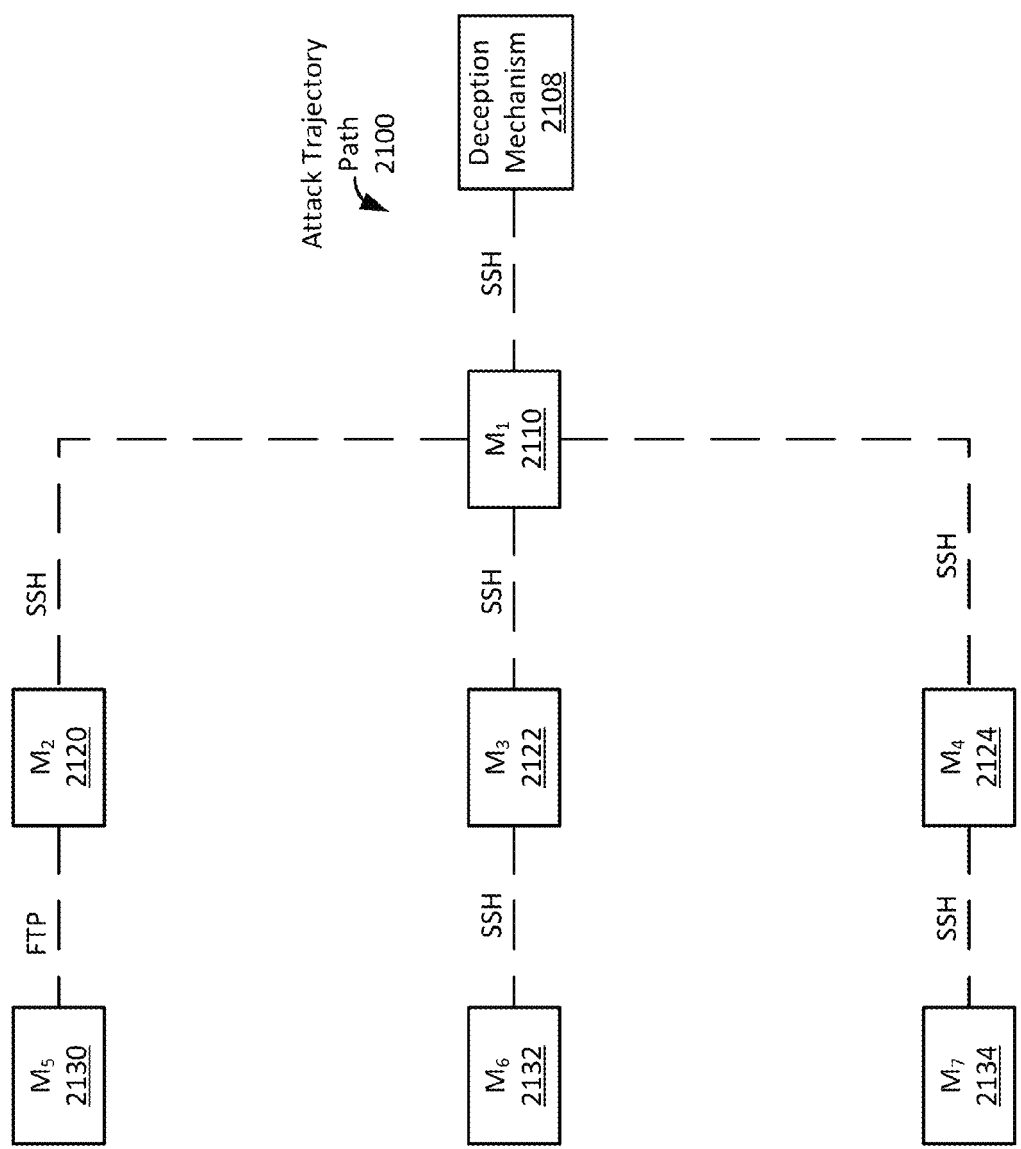
FIG. 21 illustrates another example of an attack trajectory path for a network.

FIG. 21 illustrates another example of an attack trajectory path 2100 for a network. The network can include a deception mechanism 2108, $M_1$ 2110, $M_2$ 2120, $M_3$ 2122, $M_4$ 2124, $M_5$ 2130, $M_6$ 2132, and $M_7$ 2134. $M_1$ 2110 and $M_3$ 2122 can be end-user machines; $M_2$ 2120, $M_4$ 2124, and $M_5$ 2130 can be server machines; $M_6$ 2132 can be an active directory; and $M_7$ 2134 can be a domain controller. In one illustrative example, a first interaction occurred between the deception mechanism 2108 and $M_1$ 2110 at 9:00 AM and included a successful login attempt from $M_1$ 2110 to the deception mechanism 2108 with a username "a" using SSH. In another example, a second interaction occurred between $M_1$ 2110 and $M_2$ 2120 at 8:50 AM and included a successful login attempt from $M_2$ 2120 to $M_1$ 2110 with the username "a" using SSH. In another example, a third interaction occurred between $M_1$ 2110 and $M_3$ 2122 at 8:49 AM and included a successful login attempt from $M_3$ 2122 to $M_1$ 2110 with a username "b" using SSH. In another example, a fourth interaction occurred between $M_1$ 2110 and $M_4$ 2124 at 8:48 AM and included a successful login attempt from $M_4$ 2124 to $M_1$ 2110 with the username "b" using SSH. In another example, a fifth interaction occurred between $M_2$ 2120 and $M_5$ 2130 at 8:40 AM and included a successful login attempt from $M_5$ 2130 to $M_2$ 2120 with the username "a" using FTP. In another example, a sixth interaction occurred between $M_3$ 2120 and $M_6$ 2132 at 8:39 AM and included a successful login attempt from $M_6$ 2132 to $M_3$ 2120 with the username "b" using SSH. In another example, a seventh interaction between $M_4$ 2124 and $M_7$ 2134 at 8:38 AM and included a successful login attempt from $M_7$ 2134 to $M_4$ 2124 with the username "b" using SSH.

For this network, the attack trajectory path 2120 can include three at least partially separate paths. A first at least partially separate path can include $M_1$ 2110, $M_2$ 2120, and $M_5$ 2130. A second at least partially separate path can include $M_1$ 2110, $M_3$ 2122, and $M_6$ 2132. A third at least partially separate path can include $M_1$ 2110, $M_4$ 2124, and $M_7$ 2134. Each at least partially separate path can include a probability for the likelihood that an attacked used the at least partially separate path. One way to compute the probability includes summing the weight of each machine multiplied by a weight of each protocol. In some examples, a path weight can be computed using:

$$\text{PathWeight}(M(x) \rightarrow M(y)) = M\text{Weight}(M(1)) + \Sigma_{i=2}^{n} [M\text{Weight}(i) * P\text{Weight}(M(i) \rightarrow M(i-1))].$$

MWeight(x) is a function that returns a number based on the machine information of $M_x$. In some examples, the function for MWeight(x) can be based on the category of the machine. Each category can have a predetermined amount. For example, a domain controller can be defined as having a weight of 4; an active directory can be defined as having a weight of 3; a server machine can be defined as having a weight of 2; and an end-user machine can be defined as having a weight of 1. In other examples, the function for MWeight(x) can be based on one or more elements of machine information. The function for MWeight(x) can also be based on number of failed attempts by one or more machines. The function for MWeight(x) can also be based on the number of file system changes or malware installations on the machine.

PWeight(x→z) is a function that returns a number based on a protocol type used for an interaction between machines. In some examples, the number returned by PWeight(x→z) is a predetermined amount. For example, SSH can be defined as having a weight of 5 and FTP can be defined as having a weight of 2. The PathWeight value can then be converted into a probability by dividing each PathWeight by the total number of PathWeight.

Figure 22:
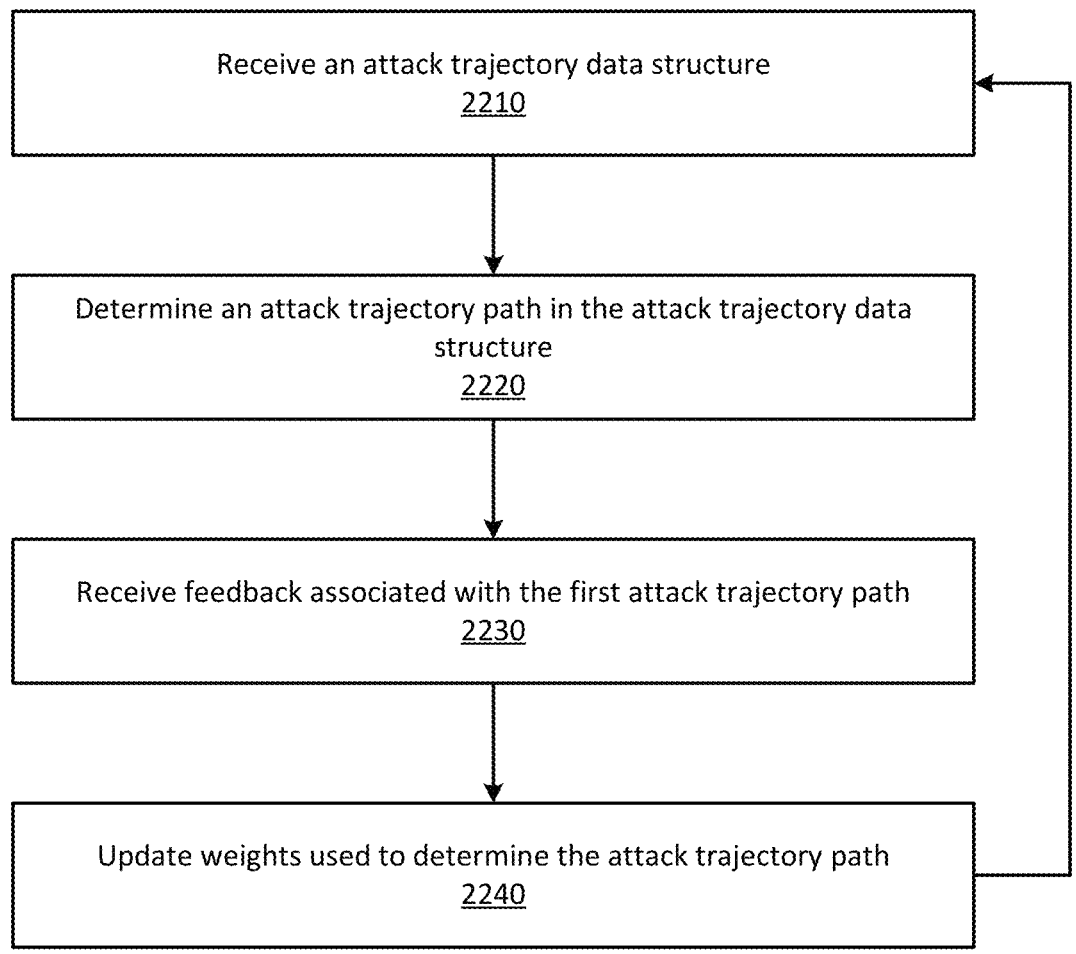
FIG. 22 illustrates an example of a process for updating weights used to determine an attack trajectory path.

Using the PathWeight equation above for FIG. 22, PathWeight(M(1)→M(5))=MWeight(M1)+MWeight(M(2)) *PWeight(M(2)→M(1))+MWeight(M(5))*PWeight(M(5) →M(2))=1+2*5+2*2=15; PathWeight(M(1)→M(6))=17; and PathWeight(M(1)→M(7))=31. The PathWeight can then be converted into a probability: Probability of $M_1 \rightarrow M_5$=15/63=0.238; probability of $M_1 \rightarrow M_6$=17/63=0.269; and probability of $M_1 \rightarrow M_7$=31/63=0.492. In some examples, after computing the probabilities, the attack trajectory path 2210 can remove the paths that are below a specified threshold. In other examples, the trajectory path can remove all paths except for the highest probability path. In other examples, the trajectory path can keep all the paths along with the associated probability for presenting the results.

Other functions can be used to compute the PathWeight. In some examples, the PathWeight can be based on the weights of machines (e.g., MWeight(x)). For example, PathWeight(M(1)→M(5))=MWeight(M1)+MWeight(M(2))+ MWeight(M(5)). In other examples, the PathWeight can be based on a number of login failures. For example, PathWeight(M(1)→M(5))=LoginFailures(M1)+LoginFailures (M(2))+LoginFailures (M(5)). In other examples, the PathWeight can be based on most suspicious number of login failures. Such an examples can modify LoginFailures(x) to ignore login failures that may not be suspicious. For example, login failures that end in a success within less than three tries can be determined not to be suspicious and able to be ignored by LoginFailures(x).

FIG. 22 illustrates an example of a process 2200 for updating weights used to determine an attack trajectory path. In some aspects, the process 2200 may be performed by one or more machines or servers (e.g., a deception control center). While specific examples may be given of a machine, one of ordinary skill in the art will appreciate that other devices may be included in the process 2200.

Process 2200 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 2200 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 2210, the process 2200 can include receiving an attack trajectory data structure. In some examples, the attack trajectory data structure can be received from a memory. In some examples, the attack trajectory data structure can be generated as described herein.

At 2220, the process 2200 can further include determining an attack trajectory path in the attack trajectory data structure. In some examples, the first attack trajectory path can be determined based on one or more weights determined based on the attack trajectory data structure, each weight associated with a connection between machines and/or a machine in the attack trajectory data structure, as described above. Using the weights for machines and weights for connections (or any combination thereof), the first attack trajectory path can include a path with the most weight.

For example, each machine in the attack trajectory data structure can be associated with a weight. The weight can indicate a likelihood that the machine is subject to an attack. Examples of variables that can affect the likelihood include placement of the machine in the network, number of ports of the machine, number of services executing on the machine, types of services executing on the machine, types of connections connecting to the machine, data included on the machine, number of connections connecting to the machine, services executing on the machine, login attempts for the machine, or the like.

In addition, each connection between machines can be associated with a weight. The weight can indicate a likelihood that the connection is associated with an attack. Examples of variables that can affect the likelihood include type of connection, credentials used for the connection, length of time of the connection, machines included in the connection, one or more actions taken over the connection, or the like.

At 2230, the process 2200 can further include receiving feedback associated with the attack trajectory path. In some examples, the feedback can be user feedback that includes a modification of at least one of the one or more weights. For example, a weight can be changed from 0.8 to 0.7 in response to a user indicating to reduce the weight by 0.1. In other examples, the feedback can be user feedback that indicates a machine and/or connection that the attack trajectory path should pass through. In such examples, the feedback can cause a weight to increase or decrease by a predefined amount. In other examples, the feedback can be associated with some other modification or approval and/or disapproval associated with the attack trajectory path.

At step 2240, the process 2200 can further include updating one or more weights used to determine the attack trajectory path. In some cases, the one or more weights that are updated can be a subset of the one or more weights described above in the determining step. In some cases, the one or more weights that are updated can be all of the one or more weights described above in the determining step. In some examples, after the one or more weights are updated, the process 2200 can proceed back to step 2210, where a new attack trajectory data structure is received. In other examples, the process 2200 can proceed back to step 2220, where a new attack trajectory path is determined for the attack trajectory data structure. In such examples, the process 2200 can repeat until there is no further feedback given.

Figure 23A:
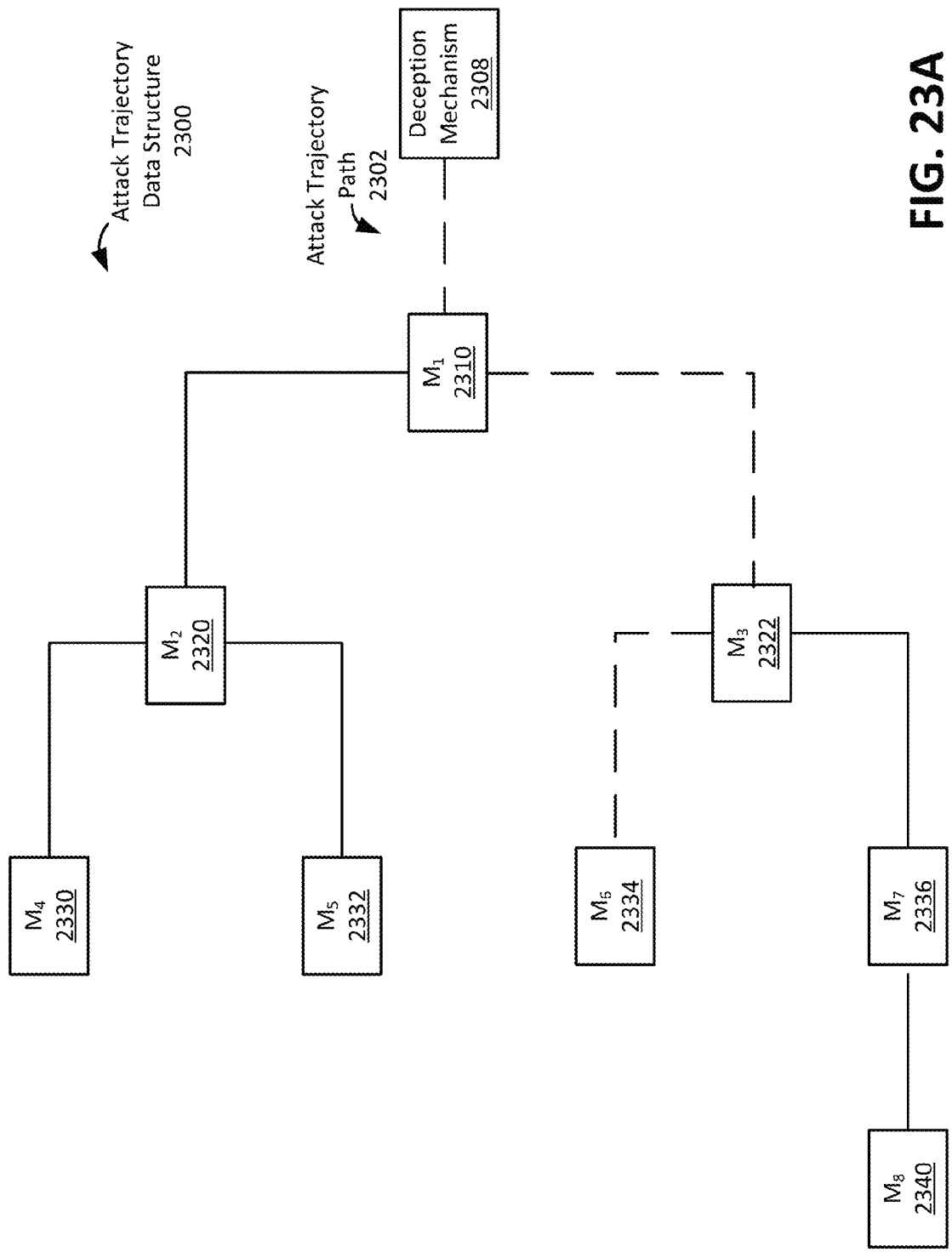
FIG. 23A illustrates another example of an attack trajectory path highlighted in an attack trajectory data structure for a network.

FIG. 23A illustrates another example of an attack trajectory path 2302 highlighted in an attack trajectory data structure 2300 for a network. The attack trajectory path 2302 and the attack trajectory data structure 2300 can be generated similarly as described above. The attack trajectory path 2302 can be determined to begin at a deception mechanism 2308, proceed through $M_1$ 2310 and $M_3$ 2322, and end at $M_6$ 2334.

In some examples, the attack trajectory path 2302 can be determined based on various parameters identified regarding the network, including weights of connections between machines and/or weights of machines. For example, $M_1$ 2310 can have a weight of 1, $M_2$ 2320 can have a weight of 2, $M_3$ 2322 can have a weight 3, $M_4$ 2330 can have a weight of 1, $M_5$ 2332 can have a weight of 1, $M_6$ 2334 can have a weight of 4, $M_7$ 2336 can have a weight of 1, and $M_8$ 2340 can have a weight of 1. In this example, weights of the connections may not be used. Therefore, the largest weight for path would be from $M_1$ 2310 to $M_6$ 2334.

In some examples, a path can be normalized based on its length such that a path with the largest weight would not necessarily be the longest path. In some examples, as the path becomes longer, a predefined amount can be subtracted from the path for each additional connection added. In other examples, each additional connection can be associated with a weight that is subtracted from a total. In other examples, a total for a path can be divided by a number based on a number of connections included in the path. It should be recognized that other methods of normalizing paths can be used such that a longer path is not always identified.

Figure 23B:
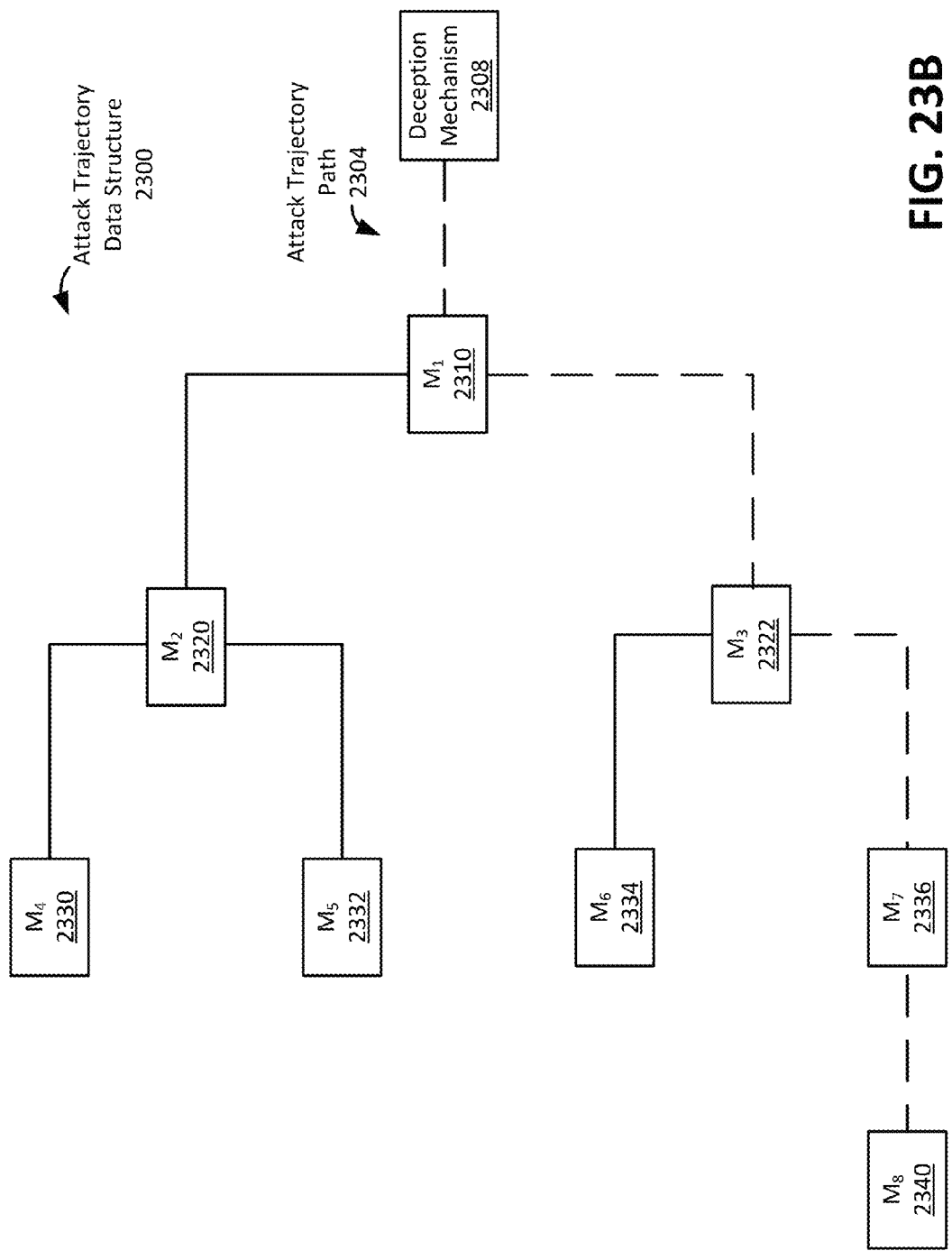
FIG. 23B illustrates another example of an attack trajectory path that has been updated based on user feedback.

FIG. 23B illustrates another example of an attack trajectory path 2304, which has been updated from the attack trajectory path 2302 based on user feedback. In some examples, the user feedback can cause a weight of a connection between machines and/or a weight of a machine to be changed such that a different attack trajectory path is generated (e.g., the attack trajectory path 2304). For example, the attack trajectory path 2304 can continue from $M_3$ 2322 to $M_7$ 2336 and $M_8$ rather than to $M_6$ 2334.

In some examples, an update can include modifying a weight associated with $M_8$ 2340 and/or a connection between $M_8$ 2340 and $M_7$ 2336. In such examples, the modification can cause, the attack trajectory path 2304 to be changed to include $M_7$ 2336 and $M_8$ 2340 rather than $M_6$ 2334. In other examples, an update can include a desire for the path to pass through $M_8$ 2340. By having the path pass through $M_8$ 2340, the attack trajectory path 2304 can be changed to include $M_7$ 2336 and $M_8$ 2340 rather than $M_6$ 2334. It should be recognized that other modification to one or more weights can be performed to change the attack trajectory path 2304, such as decreasing weights that are associated with the attack trajectory path 2302 (e.g., $M_6$ 2334).

In some examples, updating can learn from modifications. For example, if a particular type of machine or connection is always updated by a particular amount, future machines of the particular type or future connections of the particular type can be automatically modified without a user having to modify. In some examples, updating can learn from previous attacks on the network. For example, if an attack pattern typically includes a particular path, weights can be modified to have the attack pattern receiving more weight.

Figure 24A:
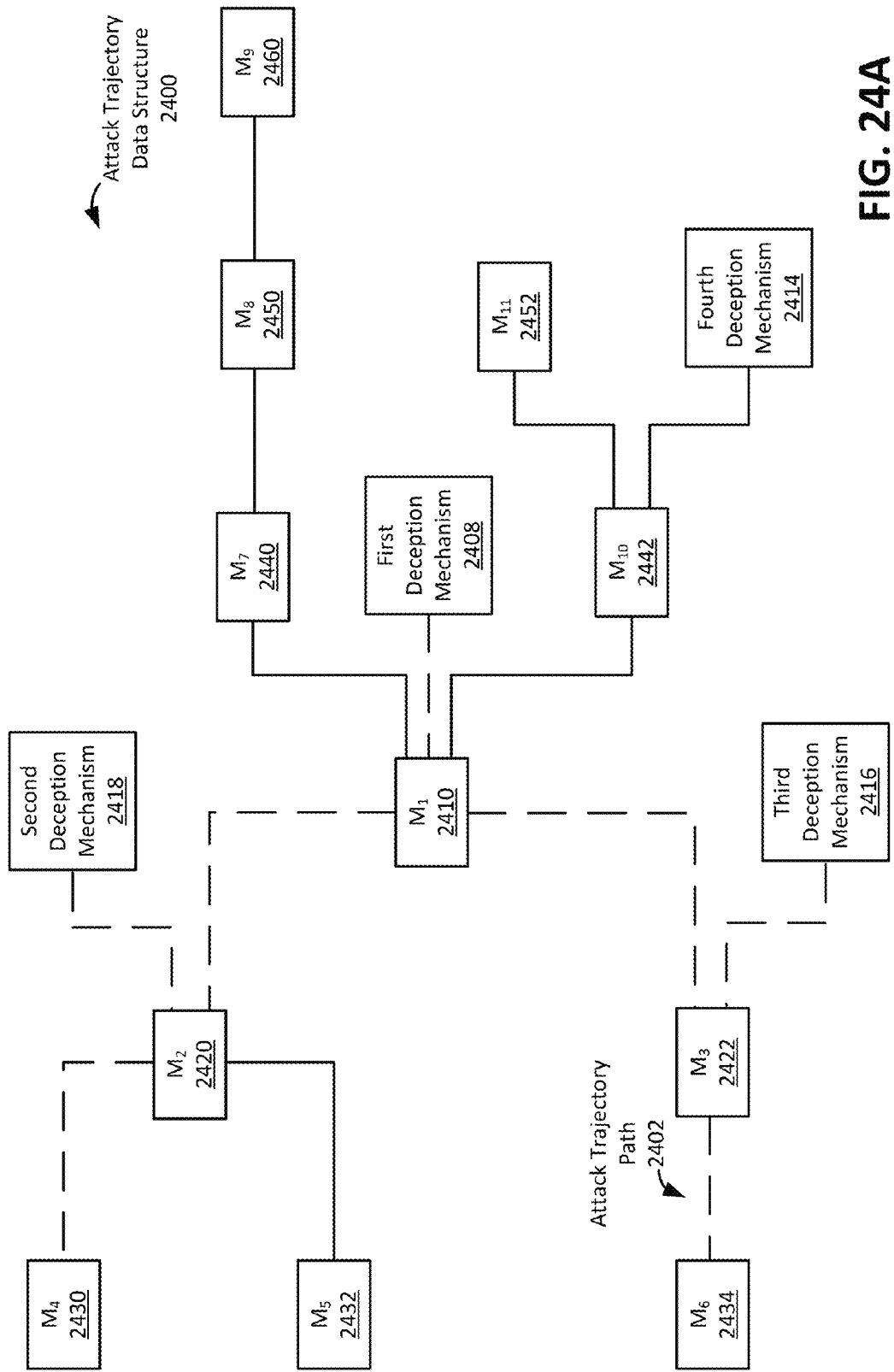
FIG. 24A illustrates another example of an attack trajectory path highlighted in an attack trajectory data structure for a network.

FIG. 24A illustrates another example of an attack trajectory path 2402 highlighted in an attack trajectory data structure 2400 for a network. In some examples, the network can include a plurality of deception mechanisms (e.g., a first deception mechanism 2408, a second deception mechanism 2418, a third deception mechanism 2416, and a fourth deception mechanism 2414). In such examples, more than one of the plurality of deception mechanisms can receive an interaction by a machine of the network (e.g., the first deception mechanism 2408 can receive an interaction from $M_1$ 2410, the second deception mechanism 2418 can receive an interaction from $M_2$ 2420, the third deception mechanism 2416 can receive an interaction from $M_3$ 2422, and the fourth deception mechanism 2414 can receive an interaction from $M_{10}$ 2442).

In some examples, the attack trajectory path 2402 can be determined to include a subset of the plurality of deception mechanisms that have been interacted with by a machine of the network. In such examples, other deception mechanisms of the plurality of deception mechanisms can be determined to be included in other attack trajectory paths by a different attacker. For example, each attack trajectory path can be associated with a particular attacker.

In some examples, each deception mechanism can be associated with a similar weight. In some examples, a weight for each deception mechanism can be predefined. In some examples, a weight for each deception mechanism can be based on one or more machines connection to or near the deception mechanism. While FIG. 24A illustrates that each time a path passes through a machine connected to a deception mechanism that the deception mechanism is included in the path, it should be recognized that a path can pass through a machine without including a deception machines connected to the machine.

Figure 24B:
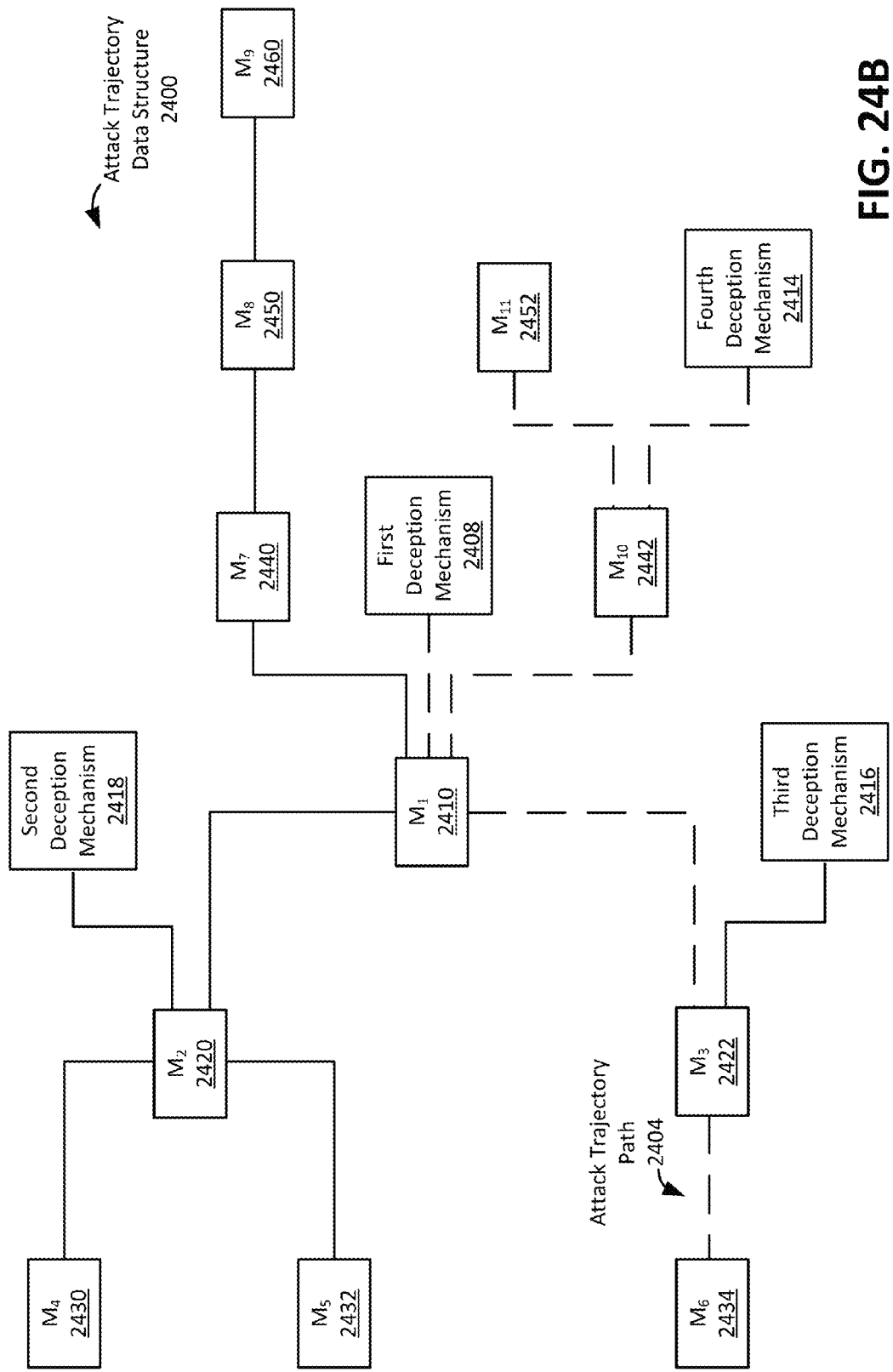
FIG. 24B illustrates another example of an attack trajectory path, which has been updated from the attack trajectory path based on user feedback.

FIG. 24B illustrates another example of an attack trajectory path 2404, which has been updated from the attack trajectory path 2402 based on user feedback. In some examples, the user feedback can cause a weight of a connection between machines and/or a weight of a machine to be changed such that a different attack trajectory path is generated (e.g., the attack trajectory path 2404). In some examples, the user feedback can change a weight associated with a deception mechanism such that the attack trajectory path 2304 is changed to include or not include the deception mechanism. For example, the attack trajectory path 2404 can head toward the fourth deception mechanism 2414 rather than the second deception mechanism 2418.

In some examples, feedback can include updating a weight associated with a deception mechanism such that the attack trajectory path 2402 is changed to the attack trajectory path 2404. For example, a weight associated with the fourth deception mechanism 2414 can cause the attack trajectory path 2404 to include $M_{10}$ 2442, $M_{11}$ 2452, and the fourth deception mechanism 2414. For another example, a weight associated with the third deception mechanism 2416 can be decreased such that the third deception mechanism 2416 is removed from the attack trajectory path 2404. In such an example, even though the third deception mechanism 2416 is removed, $M_6$ 2434 and $M_3$ 2422 can still can included in the attack trajectory path 2404.

Figure 25:
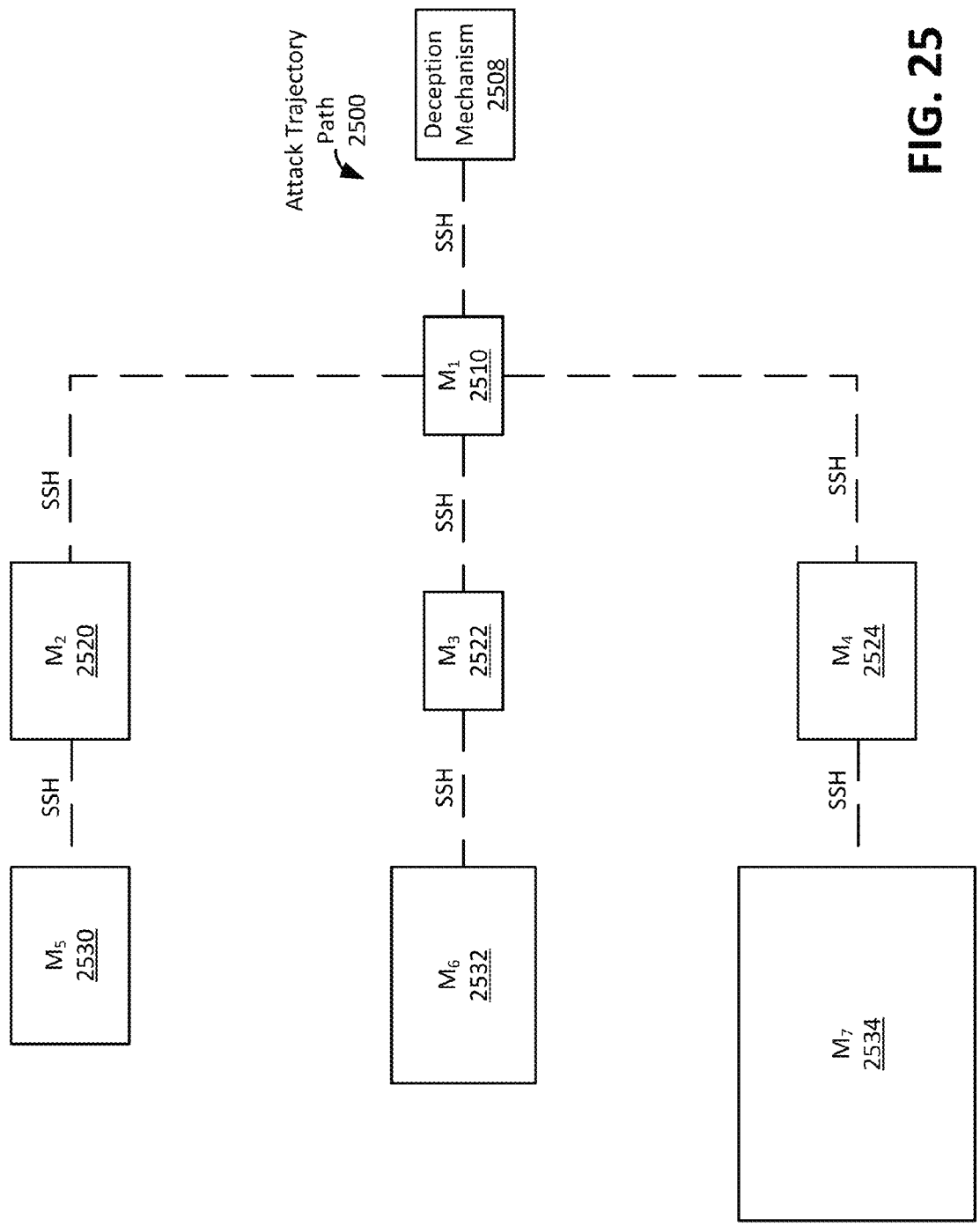
FIG. 25 is an example of a graphic representation of an attack trajectory path for a network, implementing importance factors, for a network.

FIG. 25 is an example of a graphic representation of an attack trajectory path 2500 for the network, implementing importance factors, for a network. An importance factor can be based on the MWeight(x) above. However, the importance factor can be based on other factors stated above that are not included in the MWeight(x). For example, the MWeight(x) can be based on a first set of factors and the importance factor can be based on a second set of factors. In some examples, the graphic representation of a machine is larger when the importance factor is larger. For example, $M_1$ 2510 and $M_3$ 2522 are the smallest machines in the example because they have the lowest importance factor. $M_2$ 2520, $M_4$ 2524, and $M_5$ 2530 are the next largest machines in the example because they have the next largest important factor. $M_6$ 2532 is then even larger because of the larger importance factor in the example. And $M_7$ 2534 is the largest machine in the example because it is associated with the largest importance factor. The importance factor can be an indicator where a threat is located. For example, a weakness in a machine can be shown by having a large importance factor.

In other examples, the graphic representation of a machine is smaller when the importance factor is larger. A person of ordinary skill in the art will recognize other ways to display that a machine is more important than another (e.g., color, type of image, etc.).

Figure 26:
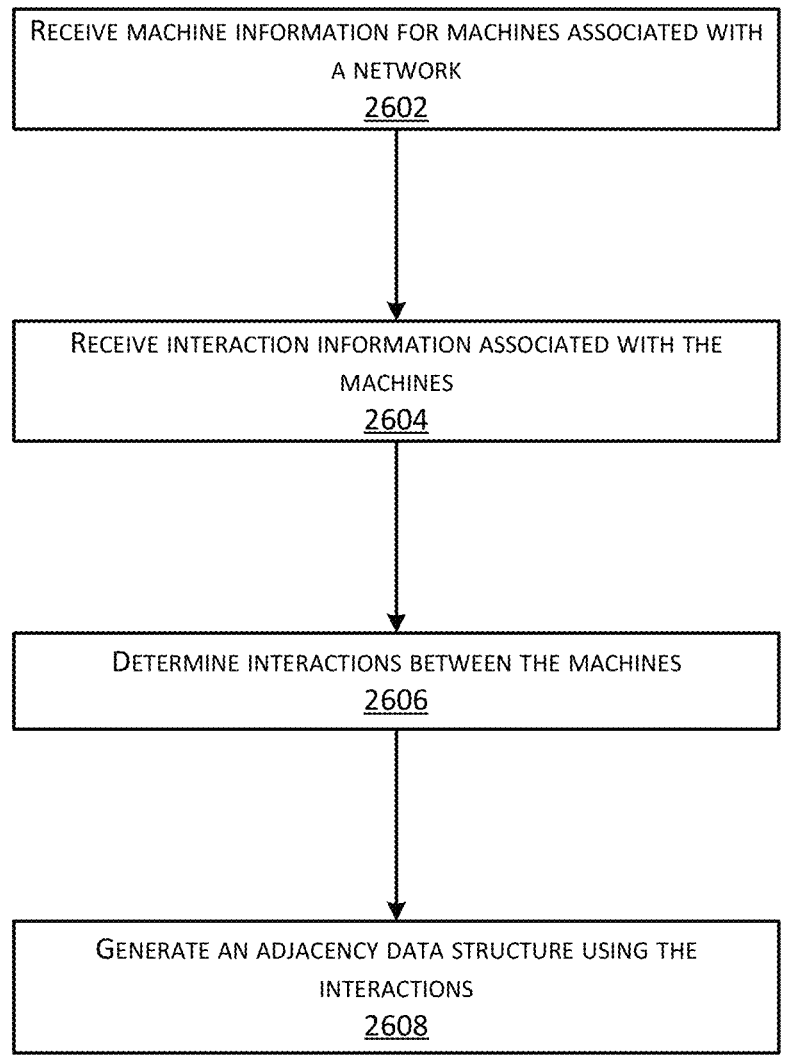
FIG. 26 is a flowchart illustrating an example of a process for recognizing interactions in a network.

FIG. 26 illustrates an example of a process 2600 for recognizing interactions in a network. In some aspects, the process 2600 may be performed by one or more machines or servers (e.g., of a deception control center). While specific examples may be given of a machine, one of ordinary skill in the art will appreciate that other devices may be included in the process 2600.

Process 2600 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 2600 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 2602, the process 2600 includes receiving machine information for machines associated with a network. The machine information can include information that identifies a particular machine. The machine information can include an IP address, a host name, malware, vulnerability, machine type (e.g., server, end-point machine, privilege user machine, etc.), or any combination thereof.

At 2604, the process 2600 includes receiving interaction information associated with the machines. The interaction information can include information associated with interactions between machines. The interaction information can include network flow information. The network flow information can include a network protocol type, an IP address, a port, a host name, or any combination thereof. The interaction information can also include authentication logs. An authentication log can include a username, a password, a number of failed attempts to login, or any combination thereof.

At 2606, the process 2600 includes determining interactions between the machines. Determining can include analyzing the interaction information and machine information.

At 2608, the process 2600 includes generating an adjacency data structure using the interactions. Generating can include correlating the interactions. The adjacency data structure can be generated using interaction information between a past time and a current time.

Figure 27:
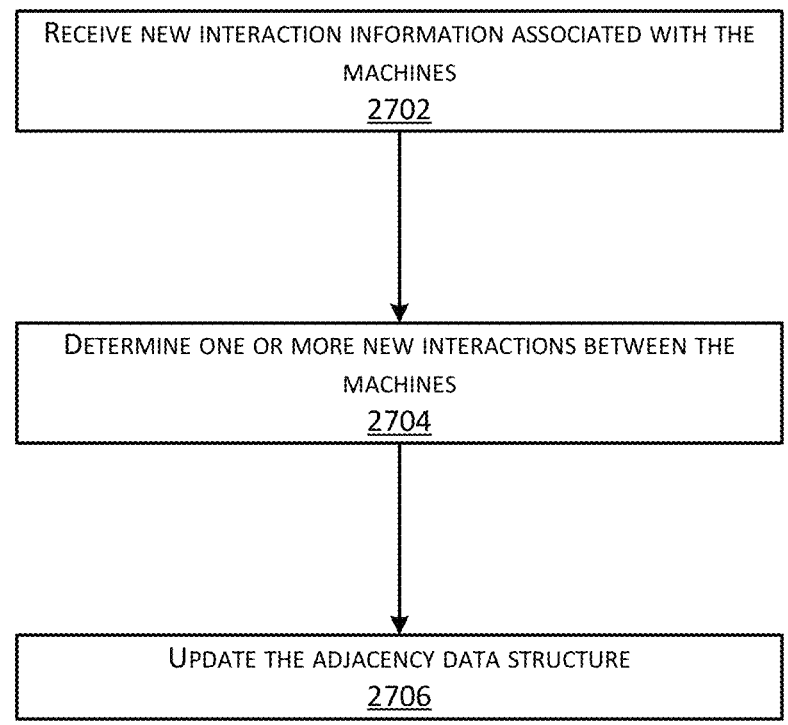
FIG. 27 is a flowchart illustrating an example of a process for updating an adjacency data structure.

FIG. 27 is a flowchart illustrating an example of a process for updating an adjacency data structure. In some aspects, the process 2700 may be performed by one or more machines or servers (e.g., of a deception control center). While specific examples may be given of a machine, one of ordinary skill in the art will appreciate that other devices may be included in the process 2700.

Process 2700 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 2700 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 2702, the process 2700 includes receiving new interaction information associated with the machines. The new interaction information can include information associated with new interactions between the machines. The new interactions can occur after the interaction information is received in process 2700.

At 2704, the process 2700 includes determining one or more new interactions between the machines. Determining can include analyzing the new interaction information and machine information.

At 2706, the process 2700 includes updating the adjacency data structure. The updated adjacency data structure can incorporate the one or more new interactions.

Figure 28:
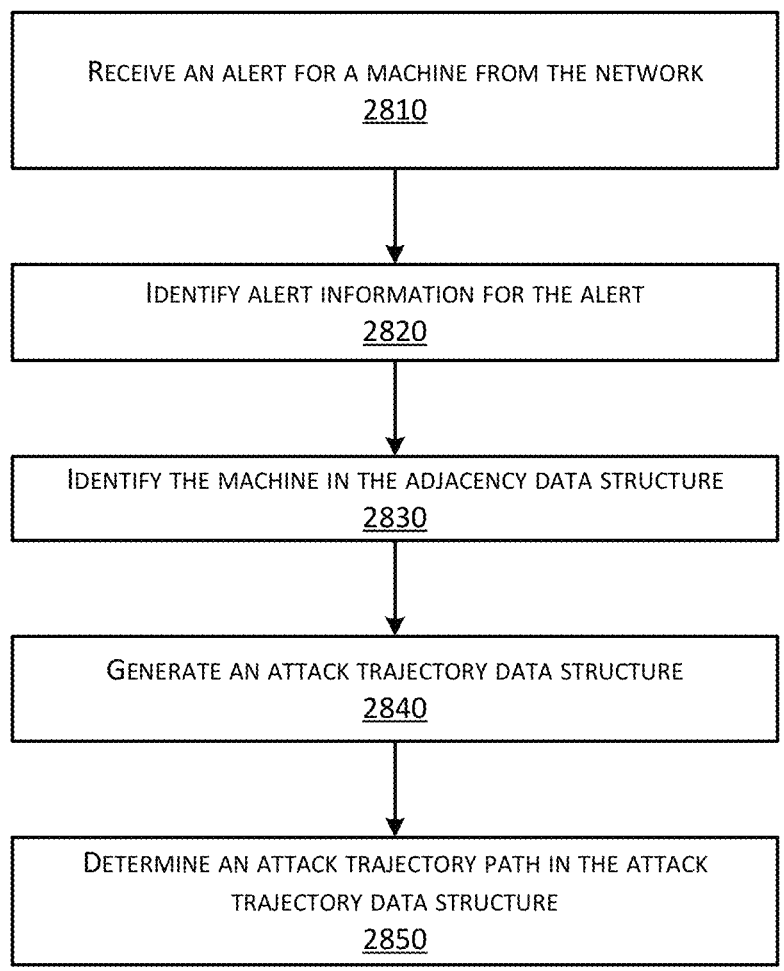
FIG. 28 is a flowchart illustrating an example of a process for determining an attack trajectory path in an attack trajectory data structure.

FIG. 28 is a flowchart illustrating an example of a process for determining an attack trajectory path in an attack trajectory data structure. In some aspects, the process 2800 may be performed by one or more machines or servers (e.g., of a deception control center). While specific examples may be given of a machine, one of ordinary skill in the art will appreciate that other devices may be included in the process 2800.

Process 2800 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 2800 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 2810, the process 2800 includes receiving an alert for a machine from the network. In some examples, the alert can indicate a possible attack on the network using the machine. In such examples, the alert can be based on a deception mechanism, a firewall, an endpoint security product, an unusual file system, any other system that may alert of an attack or indicate unusual behavior, or any combination thereof.

In examples with the deception mechanism, the process 2800 can further include deploying one or more deception mechanisms in the network. In such examples, a deception mechanism can be added to the network to attract an attacker of the network to the deception mechanism. The deception mechanism can emulate a service on a port. The deception mechanism can be deployed on an unused IP address. In some examples, the process 2800 can further include receiving, at the port of the deception mechanism, a request for an interaction by a machine of the machines. In such examples, the request can be what causes the alert to be sent.

At 2820, the process 2800 includes identifying alert information for the alert. In some examples, the alert information can include machine information of the machine associated with the alert. In such examples, the alert information can further include information associated with an interaction with the machine. In some examples, the alert information can be deception mechanism interaction information. The deception mechanism interaction information can include machine information, associated with the machine, and information associated with the interaction between the machine and the deception mechanism. In some examples, the deception interaction information can include a network protocol type used for the interaction.

At 2830, the process 2800 includes identifying the machine in the adjacency data structure. At 2840, the process 2800 includes generating an attack trajectory data structure. The attack trajectory data structure can be generated by determining one or more machines that are connected, either directly or indirectly, with the machine in the adjacency data structure.

At 2850, the process 2800 includes determining an attack trajectory path in the attack trajectory data structure. The attack trajectory path can include a path using the attack trajectory data structure from the machine to the one or more machines. The attack trajectory path can include a plurality of at least partially separate attack trajectory paths. The attack trajectory path can be determined by identifying a common network protocol type. In some examples, the common network protocol type can be Secure Shell or Telnet. In some examples, the attack trajectory path can be determined using a modified depth first search that searches the attack trajectory data structure for common network flow information. In some examples, the attack trajectory path can be determined based on the alert information. For example, the attack trajectory path can be determined by identifying a common username used for interactions of the one or more machines. In some examples, the alert information can be from one or more alerts. For example, if a machine has a plurality of alerts, each alert of a different type (e.g., from a deception mechanism, a firewall, an endpoint security product, an unusual file system, or the like), the machine can receive more weight in trajectory computations than a machine with less alerts.

Figure 29:
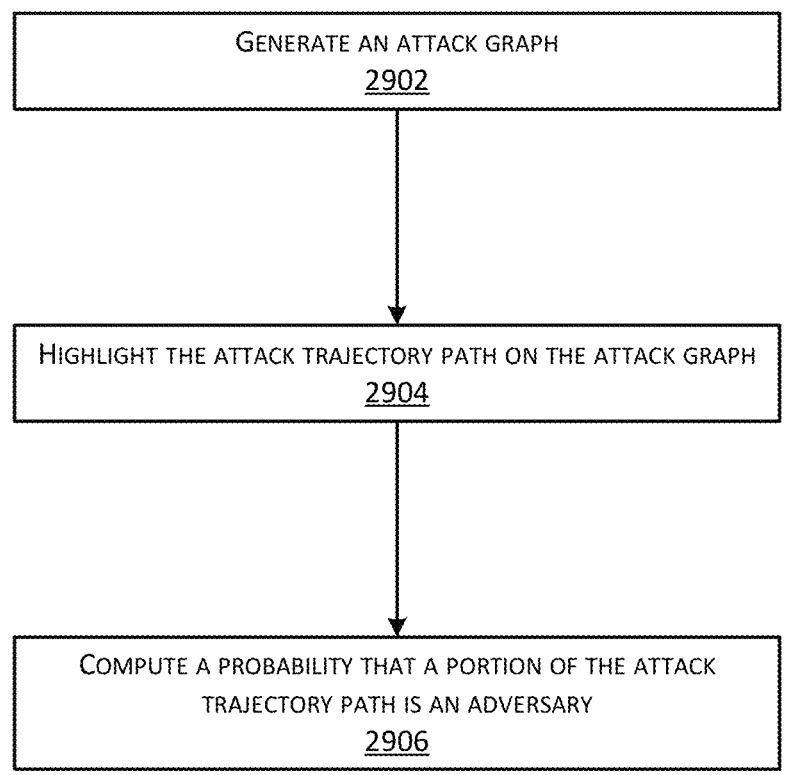
FIG. 29 is a flowchart illustrating an example of a process for analyzing an attack trajectory path.

FIG. 29 is a flowchart illustrating an example of a process for analyzing an attack trajectory path. In some aspects, the process 2900 may be performed by one or more machines or servers (e.g., of a deception control center). While specific examples may be given of a machine, one of ordinary skill in the art will appreciate that other devices may be included in the process 2900.

Process 2900 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 2900 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 2902, the process 2900 includes generating an attack graph. The attack graph can be a visual representation of the attack trajectory data structure. A node of the attack graph can be associated with a machine of the plurality of machines. A node can include an address of the associated machine. An edge of the attack graph can be an interaction between two machines of the plurality of machines. An edge can include the network protocol type and a time of the interaction. In some examples, the physical size of a pictorial representation of a particular node of the attack graph can be based on an importance of a particular machine associated with the particular node. In some examples, the importance of a particular machine can correspond to a number of failed login attempts for the particular machine. In other examples, the importance of the particular machine can be based on a weighted combination of one or more attributes. The one or more attributes can include number of file system changes, malware installations done by an adversary on the particular machine, or any combination thereof. The importance of the particular machine can correspond to a type of the particular machine. machine types can include a domain controller, an active directory, a server machine, an end-user machine, or any combination thereof.

At 2904, the process 2900 includes highlighting the attack trajectory path on the attack graph.

At 2906, the process 2900 includes computing a probability that a portion of the attack trajectory path is an adversary. Computing the probability can include using network flow information and authentication logs.

Specific details were given in the preceding description to provide a thorough understanding of various implementations of systems and components for network threat detection and analysis. It will be understood by one of ordinary skill in the art, however, that the implementations described above may be practiced without these specific details. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for network threat detection and analysis.

What is claimed is:

1. A method comprising:
    deploying a deception mechanism in a network;
    receiving a message from the deception mechanism, wherein the message indicates a communication between a device and the deception mechanism;
    identifying attack information associated with the device, wherein the attack information includes device information and interaction information corresponding to the device, and wherein the interaction information is related to the communication between the device and the deception mechanism;
    identifying the device in an adjacency data structure based on the device information, wherein the adjacency data structure indicates communications between devices in the network;
    generating an attack trajectory data structure from the adjacency data structure, wherein the attack trajectory data structure includes one or more suspect devices that are connected, either directly or indirectly, with the device in the adjacency data structure;
    determining an attack trajectory path in the attack trajectory data structure based on the attack information, wherein the attack trajectory path indicates another device in the network that is included in an attack; and
    removing, from the attack trajectory path, an at least partially separate trajectory path that has a probability below a threshold.

2. The method of claim 1, wherein the attack trajectory path is determined by identifying network flow information that is common between interactions.

3. The method of claim 1, wherein the attack trajectory path is determined by identifying a username that is common between interactions.

4. The method of claim 1, wherein the attack trajectory path includes a plurality of at least partially separate attack trajectory paths.

5. The method of claim 4, further comprising: computing a probability for each of the at least partially separate attack trajectory paths, wherein each of the computed probabilities indicates a likelihood that an at least partially separate trajectory path is associated with an attack.

6. The method of claim 1, wherein the deception mechanism emulates a service, and wherein the communication between the device and the deception mechanism is associated with the service.

7. A network apparatus, comprising:
    one or more processors; and
    a non-transitory computer-readable medium including instructions that, when executed by the one or more processors, cause the one or more processors to:
    deploy a deception mechanism in a network;
    receive a message from the deception mechanism, wherein the message indicates a communication between a device and the deception mechanism;
    identify attack information associated with the device, wherein the attack information includes device information and interaction information corresponding to the device, and wherein the interaction information is related to the communication between the device and the deception mechanism;
    identify the device in an adjacency data structure based on the device information, wherein the adjacency data structure indicates communications between devices in the network;
    generate an attack trajectory data structure from the adjacency data structure, wherein the attack trajectory data structure includes one or more suspect devices that are connected, either directly or indirectly, with the device in the adjacency data structure;
    determine an attack trajectory path in the attack trajectory data structure based on the attack information, wherein the attack trajectory path indicates another device in the network that is included in an attack; and remove, from the attack trajectory path, an at least partially separate attack trajectory path that has a probability below a threshold.

8. The network apparatus of claim 7, wherein the attack trajectory path is determined by identifying network flow information that is common between interactions.

9. The network apparatus of claim 7, wherein the attack trajectory path is determined by identifying a username that is common between interactions.

10. The network apparatus of claim 7, wherein the attack trajectory path includes a plurality of at least partially separate attack trajectory paths.

11. The network apparatus of claim 10, wherein the non-transitory computer-readable medium further includes instructions that, when executed by the one or more processors, cause the one or more processors to: compute a probability for each of the at least partially separate attack trajectory paths, wherein each of the computed probabilities indicates a likelihood that an at least partially separate trajectory path is associated with an attack.

12. The network apparatus of claim 7, wherein the deception mechanism emulates a service, and wherein the communication between the device and the deception mechanism is associated with the service.

13. A computer-program product tangibly embodied in a non-transitory machine-readable storage medium, including instructions that, when executed by one or more processors, cause the one or more processors to:

deploy a deception mechanism in a network;

receive a message from the deception mechanism, wherein the message indicates a communication between a device and the deception mechanism;

identify attack information associated with the device, wherein the attack information includes device information and interaction information corresponding to the device, and wherein the interaction information is related to the communication between the device and the deception mechanism;

identify the device in an adjacency data structure based on the device information, wherein the adjacency data structure indicates communications between devices in the network;

generate an attack trajectory data structure from the adjacency data structure, wherein the attack trajectory data structure includes one or more suspect devices that are connected, either directly or indirectly, with the device in the adjacency data structure;

determine an attack trajectory path in the attack trajectory data structure based on the attack information, wherein the attack trajectory path indicates another device in the network that is included in an attack; and remove, from the attack trajectory path, an at least partially separate attack trajectory path that has a probability below a threshold.

14. The computer-program product of claim 13, wherein the attack trajectory path is determined by identifying network flow information that is common between interactions.

15. The computer-program product of claim 13, wherein the attack trajectory path is determined by identifying a username that is common between interactions.

16. The computer-program product of claim 13, further including instructions that, when executed by the one or more processors, cause the one or more processors to: compute a probability for each of a plurality of at least partially separate attack trajectory paths, wherein the attack trajectory path includes the plurality of at least partially separate attack trajectory paths, and wherein each of the computed probabilities indicates a likelihood that an at least partially separate trajectory path is associated with an attack.

17. The computer-program product of claim 13, wherein the deception mechanism emulates a service, and wherein the communication between the device and the deception mechanism is associated with the service.

* * * * *